United States Patent [19]
Tatsumi et al.

[11] Patent Number: 5,155,996
[45] Date of Patent: Oct. 20, 1992

[54] HYDRAULIC DRIVE SYSTEM FOR CONSTRUCTION MACHINE

[75] Inventors: Akira Tatsumi, Kashiwa; Toichi Hirata, Ushiku; Masakazu Haga; Eiki Izumi, both of Ibaraki, all of Japan

[73] Assignee: Hitachi Construction Machinery Co., Ltd., Tokyo, Japan

[21] Appl. No.: 566,466

[22] PCT Filed: Jan. 18, 1990

[86] PCT No.: PCT/JP90/00048
  § 371 Date: Aug. 16, 1990
  § 102(e) Date: Aug. 16, 1990

[87] PCT Pub. No.: WO90/08263
  PCT Pub. Date: Jul. 26, 1990

[30] Foreign Application Priority Data
  Jan. 18, 1989 [JP] Japan .................................. 1-9278
  Jul. 19, 1989 [JP] Japan .................................. 1-187019

[51] Int. Cl.[5] .............................................. F16D 31/02
[52] U.S. Cl. ..................................... 60/431; 60/434; 60/452; 417/34
[58] Field of Search ........... 60/431, 433, 434, 445, 60/450, 449, 452; 417/34; 91/448, 531

[56] References Cited

U.S. PATENT DOCUMENTS

| | | | |
|---|---|---|---|
| 3,981,618 | 9/1976 | Nelson, Jr. | 417/34 |
| 3,987,624 | 10/1976 | Cooke et al. | 60/431 |
| 4,118,149 | 10/1978 | Hagberg | 60/431 |
| 4,330,238 | 5/1982 | Hoffman | 417/34 |
| 4,534,707 | 8/1985 | Mitchell | 417/34 |
| 4,617,854 | 10/1986 | Kropp | 91/517 |
| 4,635,440 | 1/1987 | Kropp | 60/431 |
| 4,742,676 | 5/1988 | Kropp et al. | 60/434 |
| 4,884,402 | 12/1989 | Strenzke et al. | 60/433 |

FOREIGN PATENT DOCUMENTS

| | | |
|---|---|---|
| 062072 | 10/1982 | European Pat. Off. |
| 214633 | 3/1987 | European Pat. Off. |
| 326150 | 8/1989 | European Pat. Off. |
| 353799 | 2/1990 | European Pat. Off. |
| 3422165 | 6/1984 | Fed. Rep. of Germany |
| 60-18604 | 1/1985 | Japan |
| 62-220703 | 9/1987 | Japan |

OTHER PUBLICATIONS
Patent Abstracts of Japan, vol. 10, No. 155; Jun. 4, 1986, (JP-A-61-11 429).

*Primary Examiner*—Thomas E. Denion
*Assistant Examiner*—Hoang Nguyen
*Attorney, Agent, or Firm*—Fay, Sharpe, Beall, Fagan, Minnich & McKee

[57] ABSTRACT

A hydraulic drive system for a construction machine comprising a prime mover (1), a hydraulic pump (2) of variable displacement type driven by the prime mover, at least one hydraulic actuator (6) driven by a hydraulic fluid delivered from the hydraulic pump, control valves connected between the hydraulic pump and the actuator for controlling a flow rate of the hydraulic fluid supplied to the actuator dependent on the operation amount of control apparatus, pump control apparatus for controlling a displacement volume of the hydraulic pump dependent on the operation amount of the control apparatus such that the delivery rate of the hydraulic pump is increased with an increase in the operation amount, and prime mover control apparatus (29) for controlling a revolution speed of the prime mover. The prime mover control apparatus (29) has a function (33, 36) to monitor saturation of the delivery rate of the hydraulic pump (2), and to raise up the revolution speed of the prime mover (1) to prevent the pump from the saturation when the hydraulic pump reaches a predetermined state concerned with the saturation.

38 Claims, 40 Drawing Sheets

HYDRAULIC DRIVE SYSTEM FOR CONSTRUCTION MACHINE

1. Technical Field

The present invention relates to a hydraulic drive system for construction machines such as represented by hydraulic excavators or loaders, and more particularly to a hydraulic drive system for a construction machine which is equipped with pump control means capable of controlling the delivery rate of a hydraulic pump driven by a prime mover dependent on the input amount of a control lever.

2. Background Art

In a hydraulic drive system for construction machines such as hydraulic excavators or cranes, pump control means is employed which controls the delivery rate of a hydraulic pump driven by a prime mover dependent on the input amount of a control lever. The pump control means is operated under a load sensing control system or a negative control system. The load sensing control is, as described in DE-A1-3422165 (corresponding to JP, A, 60-11760 or U.S. Pat. No. 4,617,854) by way of example, to detect a maximum load pressure among a plurality of hydraulic actuators and control the delivery rate of the hydraulic pump such that a delivery pressure of the hydraulic pump becomes higher a fixed value than the maximum load pressure. This permits to increase or decrease the delivery rate of the hydraulic pump dependent on respective load pressures of the hydraulic actuators for saving on energy and an improvement in operability.

The negative control is to detect a pilot pressure signal concerned with the input amount of the control lever for controlling the delivery rate of the hydraulic pump dependent on the pilot pressure signal. This control system also permits saving on energy and an improvement in operability.

However, the conventional hydraulic drive system equipped with either control system mentioned above has accompanied problems below.

The delivery rate of a variable displacement hydraulic pump is determined by the product of a displacement volume, i.e., the tilting amount of a swash plate for the swash plate type, and a revolution speed. The larger the tilting amount, the greater will be the delivery rate. The tilting amount of the swash plate has a maximum value determined by the pump structure, and the delivery rate of the hydraulic pump becomes maximum at the maximum tilting amount of the swash plate for a certain setting revolution speed of a prime mover. Furthermore, the prime mover is reduced in its revolution speed upon input torque of the hydraulic pump exceeding output torque of the prime mover, and may stall in the worst case. To avoid this, therefore, the hydraulic pump is generally subjected to input torque limiting control. The input torque limiting control limits a maximum value of the delivery rate so that the input torque of the hydraulic pump will not exceed the output torque of the prime mover.

Thus, the hydraulic pump has a limitation in the delivery rate, i.e., the available maximum delivery rate. Accordingly, when the hydraulic pump reaches the available maximum delivery rate during operation of (one or more) actuators, the pump delivery rate can no longer be increased beyond the available maximum delivery rate and hence undergoes saturation. Upon the pump delivery rate getting into saturation, the actuator can no longer be driven at a speed commanded by the control lever. In the load sensing control, particularly, because the delivery pressure of the hydraulic pump is reduced so as not to ensure a fixed differential pressure with respect to the maximum load pressure, a larger part of a hydraulic fluid delivered from the hydraulic pump is caused to flow into the actuator on the lower pressure side, which disables smooth combined operation.

One conceivable method of solving the above problem is to set the hydraulic pump so as to produce the higher capability, i.e., the larger capacity. But, this creates an increase in the cost of parts and is disadvantageous in economy. As an alternative, the foregoing problem could be alleviated if the prime mover for driving the hydraulic pump is set to a maximum revolution speed at all times. However, setting the prime mover to the maximum revolution speed at all times is not preferable in terms of fuel economy and noise, and also shortens the service life of equipment such as the prime mover and the pump.

An object of the present invention is to provide a hydraulic drive system for a construction machine which can automatically raise up a revolution speed of a prime mover upon the delivery rate of a hydraulic pump getting into saturation, for increasing the pump delivery rate to obtain a desired actuator speed.

DISCLOSURE OF THE INVENTION

To achieve the above object, the present invention provides a hydraulic drive system for a construction machine comprising a prime mover, a hydraulic pump of variable displacement type driven by the prime mover, at least one hydraulic actuator driven by a hydraulic fluid delivered from the hydraulic pump, control valve means connected between the hydraulic pump and the actuator for controlling a flow rate of the hydraulic fluid supplied to the actuator dependent on the input amount of operating means, pump control means for controlling a displacement volume of the hydraulic pump dependent on the input amount of the operating means such that the delivery rate of the hydraulic pump is increased with an increase in the said input amount, and prime mover control means for controlling a revolution speed of the prime mover, wherein the prime mover control means includes first control means for monitoring saturation of the delivery rate of the hydraulic pump, and increasing the revolution speed of the prime mover to avoid the saturation of the pump when the hydraulic pump reaches a predetermined state concerned with the saturation.

Preferably, the first control means includes means for detecting a differential pressure between the delivery pressure of the hydraulic pump and the load pressure of the actuator, whereby the first control means judges that the hydraulic pump has reached the predetermined state and increases the revolution speed of the prime mover when the differential pressure becomes smaller than a predetermined value.

The first control means may include means for detecting a displacement volume of the hydraulic pump, means for calculating a limit value of the displacement volume, and means for calculating a difference between the displacement volume and the limit value, whereby the first control means judges that the hydraulic pump has reached the predetermined state and increases the revolution speed of the prime mover when the differential pressure reaches a predetermined value.

Preferably, the means for calculating the limit value of the displacement volume comprises means for calculating a target displacement volume for the input torque limiting control from at least the delivery pressure of the hydraulic pump based on a predetermined input torque limiting function, and employs the target displacement volume as the limit value.

Preferably, the means for calculating the difference between the displacement volume and the limit value comprises means for calculating the difference by deducting the displacement volume from the limit value, whereby the first control means judges that the hydraulic pump has reached the predetermined state and increases the revolution speed of the prime mover when the difference becomes smaller than the predetermined value.

In this connection, preferably, the means for detecting the displacement volume of the hydraulic pump comprises means for detecting an actual displacement volume of the hydraulic pump, and the means for calculating the difference comprises means for calculating a difference of the actual displacement volume from the limit value. The first control means may further include means for calculating a target displacement volume of the hydraulic pump, the means for detecting the displacement volume of the hydraulic pump may comprise means for detecting the target displacement volume of the hydraulic pump, and the means for calculating the said difference may comprise means for calculating a difference of the target displacement volume from the limit value.

Preferably, the first control means further includes means for calculating a target displacement volume from a differential pressure between the delivery pressure of the hydraulic pump and the load pressure of the actuator to hold that differential pressure constant, the means for detecting the displacement volume of the hydraulic pump comprises means for calculating that target displacement volume, the means for calculating the limit value of the displacement volume comprises means for calculating a target displacement volume for the input torque limiting control from at least the delivery pressure of the hydraulic pump based on a predetermined input torque limiting function, the means for calculating the difference between the displacement volume and the limit value comprises means for calculating the difference by deducting the displacement volume from the limit value, whereby the first control means judges that the hydraulic pump is in the predetermined state and increases the revolution speed of the prime mover when the difference becomes larger than the predetermined value. In this connection, the predetermined value is preferably 0 (zero).

Preferably, the first control means includes means for detecting the input amount of the operating means, and raises up the revolution speed of the prime mover when the hydraulic pump reaches the said prescribed state and the input amount of the operating means exceeds a predetermined value.

Preferably, the prime mover control means further includes second control means for detecting the input amount of the operating means and raising up the revolution speed of the prime mover when the input amount exceeds a predetermined value.

BEST MODE FOR CARRYING OUT THE INVENTION

Hereinafter, preferred embodiments of the present invention will be described with reference to the accompanying drawings.

First Embodiment

A first embodiment of the present invention will be described with reference to FIGS. 1 through 4.

Hydraulic System and Pump Control Section

Figure 1:
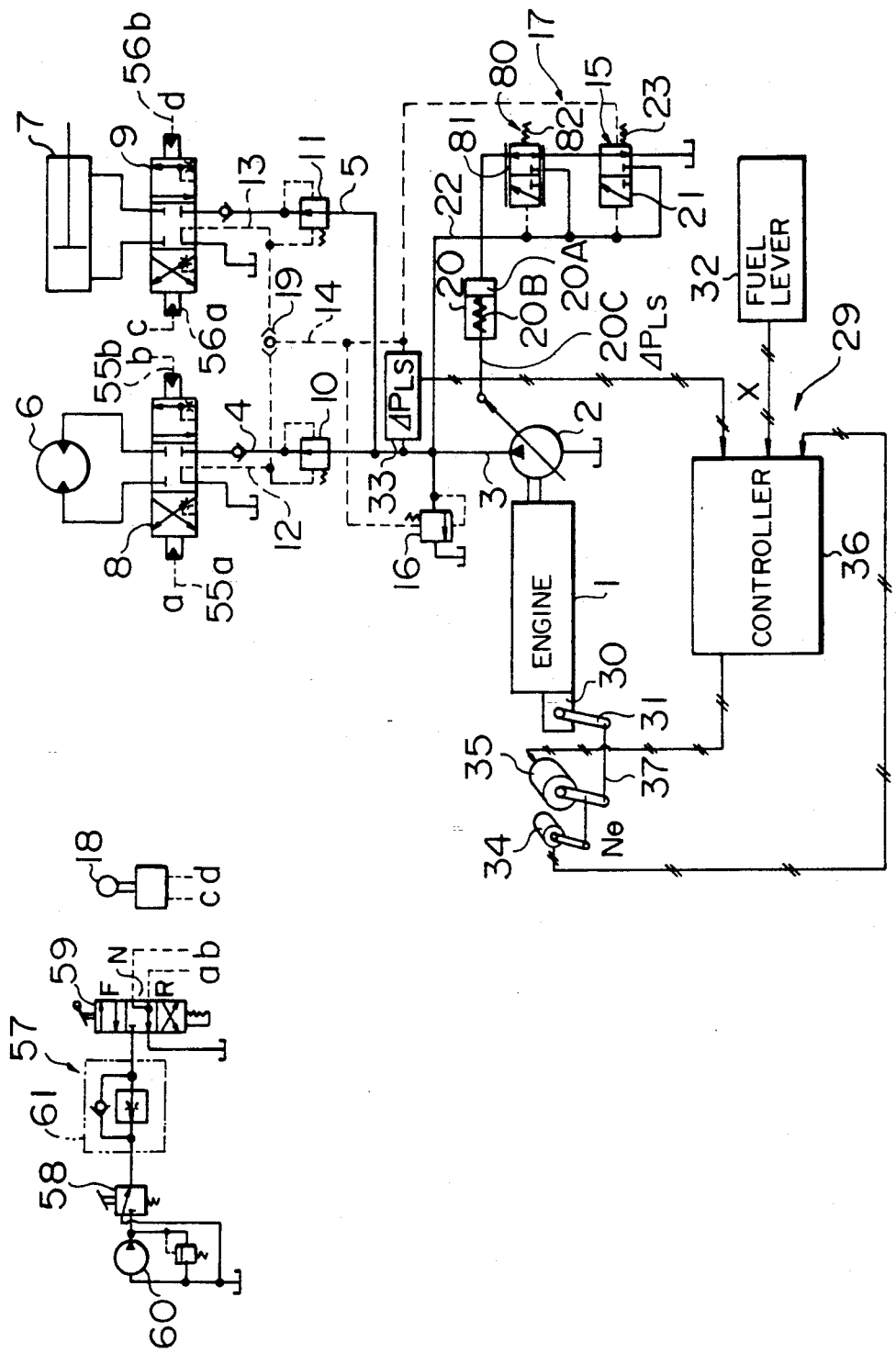
FIG. 1 is a diagrammatic view of a hydraulic drive system for a construction machine according to a first embodiment of the present invention.

In FIG. 1, a hydraulic system associated with a hydraulic drive system of this invention comprises a prime mover, i.e., an engine 1, a hydraulic pump 2 of variable displacement type driven by the engine 1, and a plurality of hydraulic actuators 6, 7 connected to the hydraulic pump 2 via a delivery line 3 and main circuit lines 4, 5 in parallel to each other and driven by a hydraulic fluid delivered from the hydraulic pump 2. Connected to the main circuit lines 4, 5 between the hydraulic pump 2 and the hydraulic actuators 6, 7 are control valves 8, 9 for controlling flow rates and directions of the hydraulic fluid supplied from the hydraulic pump 2 to the hydraulic actuators 6, 7, respectively. Pressure compensating valves 10, 11 are connected upstream of the control valves 8, 9, respectively.

Figure 2:
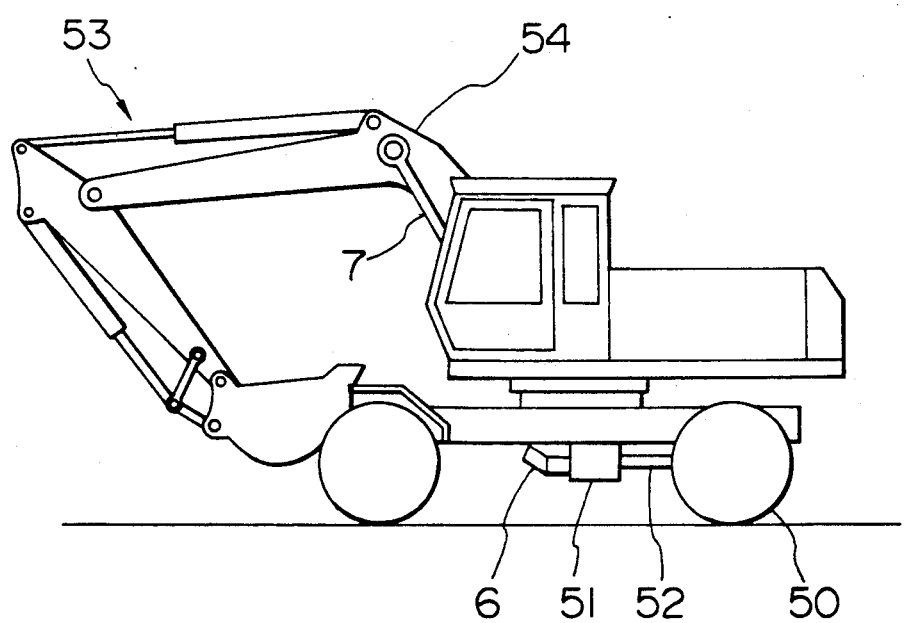
FIG. 2 is a side view of a hydraulic excavator of wheel type on which the hydraulic drive system is mounted.

In this embodiment, the hydraulic system is intended to drive a hydraulic excavator of wheel type shown in FIG. 2. To this end, the actuator 6 is a travel motor for driving rear wheels 50 via a transmission 51 and a drive shaft 52, for example, and the actuator 7 is a boom cylinder for vertically moving a boom 54 as part of a front attachment 53, for example.

In the illustrated embodiment, the control valves 8, 9 are hydraulic valves of pilot operated type which are controlled by pilot pressures transmitted to pilot lines 55a, 55b and 56a, 56b.

The pilot lines 55a, 55b are connected to a pilot circuit 57 for traveling. The pilot circuit 57 for traveling comprises a pilot reducing valve 58 of pedal operated type which instructs a traveling speed, and a directional control valve 59 of manually operated type which instructs the forward or backward traveling. When the pilot reducing valve 58 is trod on and the directional control valve 59 is shifted to either position, the pilot reducing valve 58 produces a pilot pressure from a hydraulic fluid from a pilot pump 60 dependent on the trod amount and this pilot pressure is transmitted to either one of the pilot lines 55a, 55b via a slow return valve 61 dependent on the shift position of the directional control valve 59, so that the control valve 8 is controlled in an opening and a shift position dependent on the trod amount of the pilot reducing valve 58 and the shift position of the directional control valve 59. Upon the pilot reducing valve 58 being released from its trod state, the pilot pressure is gradually reduced via the slow return valve 61 and the control valve 8 is also gradually returned to its neutral position.

The pilot lines 56a, 56b are connected to control means provided with a control lever 18 for commanding both a speed and a drive direction of the boom cylinder 7. Dependent on the amount and the direction of operation of the control lever 18, the control means produces a pilot pressure that is transmitted to the control valve 9 via the pilot lines 56a or 56b for controlling an opening and a shift position of the control valve 9.

The pressure compensating valves 10, 11 are operated in response to differential pressures across the control valves 8, 9, respectively, so that the differential pressures across the control valves 8, 9 can be held constant to ensure the flow rates corresponding to the openings of the control valves 8, 9 in spite of changes in the delivery pressure of the hydraulic pump 2 and the load pressures of the hydraulic actuators 6, 7.

Load lines 12, 13 for detecting the load pressures of the actuators 6, 7 are connected to the control valves 8, 9, respectively. The load lines 12, 13 are also connected to a load line 14 via a higher pressure select valve 19 so that the load pressure on the higher pressure side selected by the higher pressure select valve 19, i.e., the maximum load pressure, is introduced to the load line 14.

In the load lines 12, 13, 14, the load pressures detected in the input side load lines 12, 13 are transmitted to the pressure compensating valves 10, 11, respectively, while the maximum load pressure detected in the load line 14 is introduced to a load sensing regulator (abbreviated as LSR hereinafter) 15 of a pump control section 17 and an unload valve 16 connected to the delivery line 3.

The pump control section 17 comprises the LSR 15 and a torque control regulator 80 combined with each other.

More specifically, the pump control section 17 has a servo piston 20 for driving the swash plate of the hydraulic pump 2, and the LSR 15 comprises a load sensing compensating valve 21 (referred to as an LS compensating valve hereinafter) for controlling the supply of the hydraulic fluid to the servo piston 20. The delivery pressure of the hydraulic pump 2 and the maximum load pressure are introduced to the opposite ends of a valve spool of the LS compensating valve 21 via a branched line 22 from the delivery line 3 and the load line 14, respectively. As a result, a differential pressure between the delivery pressure and the maximum load pressure acts on one end of the valve spool, while a spring 23 for setting a target differential pressure is arranged at the other end of the valve spool.

If the differential pressure between the pump delivery pressure and the maximum load pressure is smaller than the setting target differential pressure of the spring 23, the valve spool of the LS compensating valve 15 is moved to a valve position as shown. In this valve position, a pressure receiving chamber 20A of the servo piston 20 is connected to a reservoir or tank and a piston rod 20C is pushed up via a spring force of a spring 20B for increasing a pump tilting angle (displacement volume). On the contrary, if the differential pressure exceeds the setting pressure, the valve spool of the LS compensating valve 21 is moved to a leftward position on the drawing. In this valve position, the pressure receiving chamber 20A is connected to the branched line 22 and the piston rod 20C is pushed down with the delivery pressure flowing into the pressure receiving chamber 20A, thereby to decrease the pump tilting angle. The pump tilting angle is controlled in accordance with a balance of the above two operations, so that the pump delivery pressure is held higher by a fixed differential pressure than the maximum load pressure.

A torque control regulator 80 has a torque control servo valve 81 serially connected between the LS compensating valve 21 and the servo piston 20. The delivery pressure of the hydraulic pump 2 is introduced to one end of a valve spool of the torque control servo valve 81 via the branched line 22 from the delivery line 3, while a spring 82 for setting limit torque is arranged at the other end of the valve spool.

If the delivery pressure of the hydraulic pump 2 is smaller than a setting pressure of the spring 82, the valve spool of the torque control servo valve 81 is moved to a valve position as shown. In this valve position, the pressure receiving chamber 20A of the servo piston 20 comes into the same condition as that when it is directly connected to the LS compensating valve 21, for permitting the above mentioned load sensing control through the LS compensating valve 21. If the delivery pressure of the hydraulic pump 2 exceeds the setting pressure of the spring 82, the valve spool of the servo valve 81 is moved to a leftward position on the drawing. In this valve position, the pressure receiving chamber 20A is connected to the branched line 22 and the piston rod 20C is pushed down with the delivery pressure flowing into the pressure receiving chamber 20A, thereby to decrease the pump tilting angle. The tilting angle of the hydraulic pump 2 is hence controlled so that the input torque of the hydraulic pump 2 is kept within the output torque of the engine 1. Thus, in the torque control regulator 80, an available maximum pump tilting characteristic with respect to the delivery pressure of the hydraulic pump 2 is determined by using the spring 82 dependent on characteristics of the engine 1.

As described above, the pump control section 17 of this embodiment serves to control the tilting angle of the hydraulic pump 2 through the LSR 15 so that the delivery pressure becomes higher by a fixed differential pressure than the maximum load pressure, thereby carrying out the load sensing control, and also the control of the tilting angle of the hydraulic pump 2 through the torque control regulator 80 so that the input torque of the hydraulic pump 2 is kept within the output torque of the engine 1, thereby carrying out the input torque limiting control.

The unload valve 16 is set so that the delivery pressure of the hydraulic pump 2 becomes slightly higher than the setting differential pressure of the LS compensating valve 21, when the control valves 8, 9 are in their neutral state. The pump tilting angle is thereby held at a minimum tilting angle by a self-pressure of the unload valve 16 in the neutral state.

The pressure compensating valves 10, 11 serve to surely maintain the actuators independent of each other when the actuators 6, 7 are concurrently driven for combined operation with the delivery rate of the hydraulic pump 1 controlled as mentioned above. More specifically, in the hydraulic system equipped with the LSR 15, although the LS compensating valve 21 is operated in accordance with the maximum load pressure when performing the combined operation, the pump delivery pressure is governed by the lesser load if the arrangement is of simple parallel connection. This would result in a disadvantage that the pump delivery rate is so concentrated to the actuator on the lesser load as to cause a condition of excessive flow rate, while the actuator requiring a higher pressure fails to operate or is driven only with the surplus flow rate. Such a disadvantage can be prevented in this embodiment by providing the pressure compensating valves 10, 11 for the control valves 8, 9, respectively, to maintain the differential pressures across the control valves 8, 9 constant as stated before.

Engine Control Section

Meanwhile, the engine 1 is preferably a diesel engine including a fuel injector 30 with an all-speed governor, the fuel injector 30 having a governor lever 31. The injected amount of fuel is adjusted by turning the governor lever 31. The governor lever 31 is associated with an engine control section 29 for setting a target revolution speed and turning the governor lever 31 to a position corresponding to the target revolution speed. The engine control section 29 comprises an operation unit having a fuel lever 32 which is manually operated by an operator and outputs an electric signal of a level corresponding to its moved amount, a differential pressure sensor 33 for detecting a differential pressure $\Delta PLS$ between the delivery pressure of the hydraulic pump 2 and the maximum load pressure of the hydraulic actuators 6, 7, a potentiometer 34 for detecting the turned amount, i.e., the moved amount, of the governor lever, and a controller 36 for receiving the operation signal of the fuel lever 32 as well as both detection signals of the differential pressure sensor 33 and the potentiometer 34, and issuing a drive signal to a pulse motor 35 after processing those signals as described later. The pulse motor 35 is rotated through an angle corresponding to the drive signal for turning the governor lever 31 via a linkage 37. Note that the fuel lever 32 may be replaced by other control means of dial type (rotary potentiometer) or push button type (up-and-down switch), for example.

Figure 3:
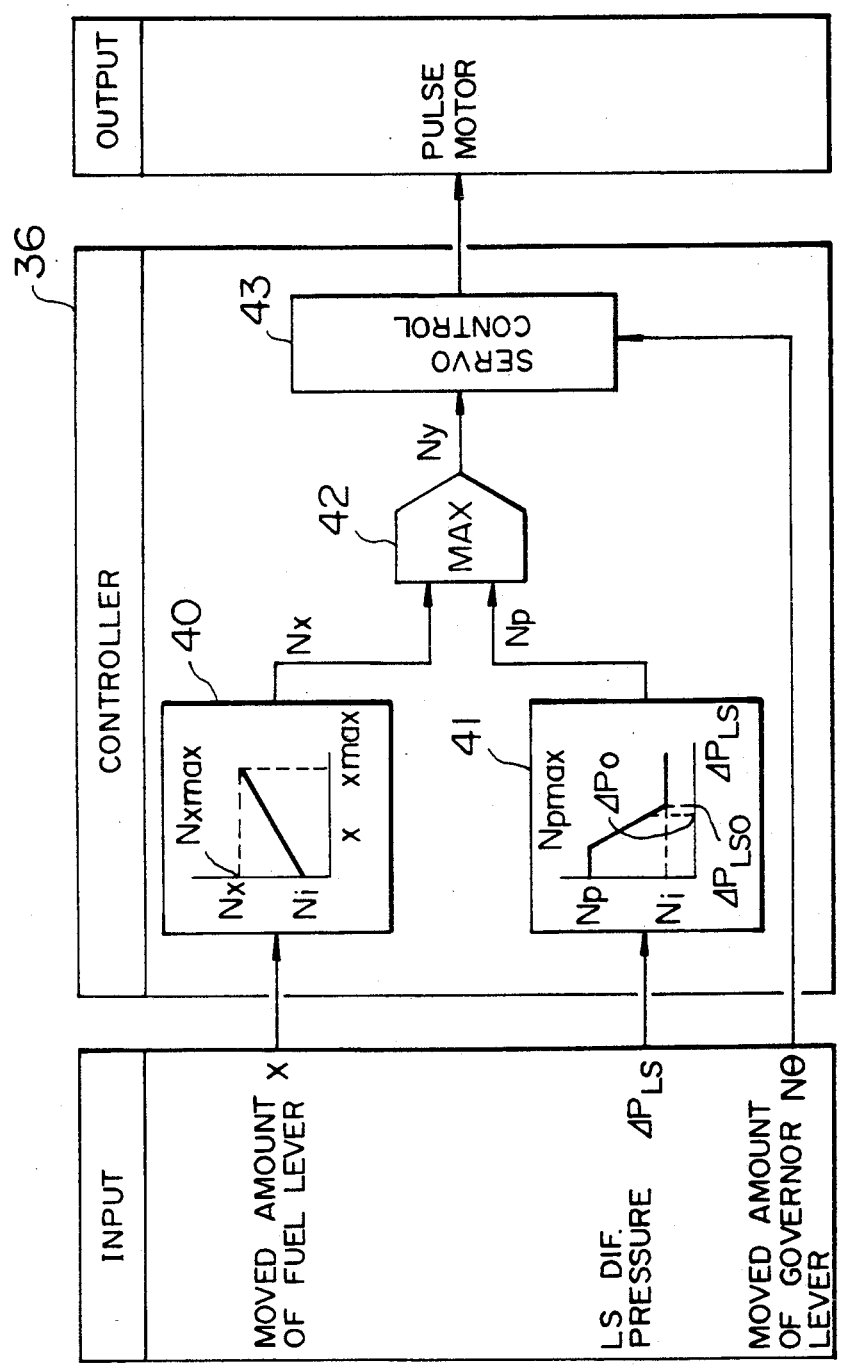
FIG. 3 is a block diagram showing a processing function of a controller in the hydraulic drive system.

The controller 36 comprises a microcomputer, etc. and has a control and arithmetic function as shown in a functional block diagram of FIG. 3. More specifically, the controller 36 comprises a first arithmetic section 40 for receiving the command signal from the fuel lever 32 and calculating a target revolution speed Nx corresponding to the moved amount x of the fuel lever indicated by the command signal, a second arithmetic section 41 for receiving the detection signal of the differential pressure sensor 33 and determining a target revolution speed Np which has the predetermined functional relationship with the LS differential pressure $\Delta$PLS indicated by that detection signal, a maximum value selector 42 for comparing the target revolution speeds Nx, Np respectively determined by the first and second arithmetic sections 40, 41 and selecting the maximum value of both the speeds to provide a target revolution speed as a command value, i.e., a revolution speed command value Ny, and a servo control section 43 for calculating the driven amount of the pulse motor 35 from the revolution speed command value Ny selected by the maximum value select 42 and the moved amount N$\theta$ of the governor lever 31 indicated by the detection signal of the potentiometer 34. A drive signal corresponding to the above driven amount is then output from the servo control section 43 to the pulse motor 35.

In the first arithmetic section 40, the functional relationship between the moved amount x of the fuel lever and the target revolution speed Nx is set such that as the moved amount x increases, the target revolution speed Nx is linearly increased from an idling revolution speed Ni.

In the second arithmetic section 41, the functional relationship between the LS differential pressure $\Delta$PLS and the target revolution speed Np is set such that letting $\Delta$Po be a target differential pressure to be held by the LSR 15, the target revolution speed Np is given by the idling revolution speed Ni when the LS differential pressure $\Delta$PLS detected by the differential pressure sensor 52 is higher than a predetermined value $\Delta$PLSO in the vicinity of the target differential pressure $\Delta$Po, and the target revolution speed Np is increased with a decrease in the differential pressure $\Delta$PLS when the differential pressure $\Delta$PLS becomes smaller than the predetermined value $\Delta$PLSO.

In this connection, a maximum value Nxmax of the target revolution speed Nx as set by the first arithmetic section 40 when the moved amount x of the fuel lever is maximized, is set lower than the highest revolution speed available with the engine 1, while a maximum value Npmax of the target revolution speed Np as set by the second arithmetic section 41 dependent on the LS differential pressure $\Delta$PLS is set nearly equal to the highest revolution speed of the engine 1. Consequently, the maximum value Npmax of the target revolution speed Np is set higher than the maximum value Nxmax of the target revolution speed Nx.

Figure 4:
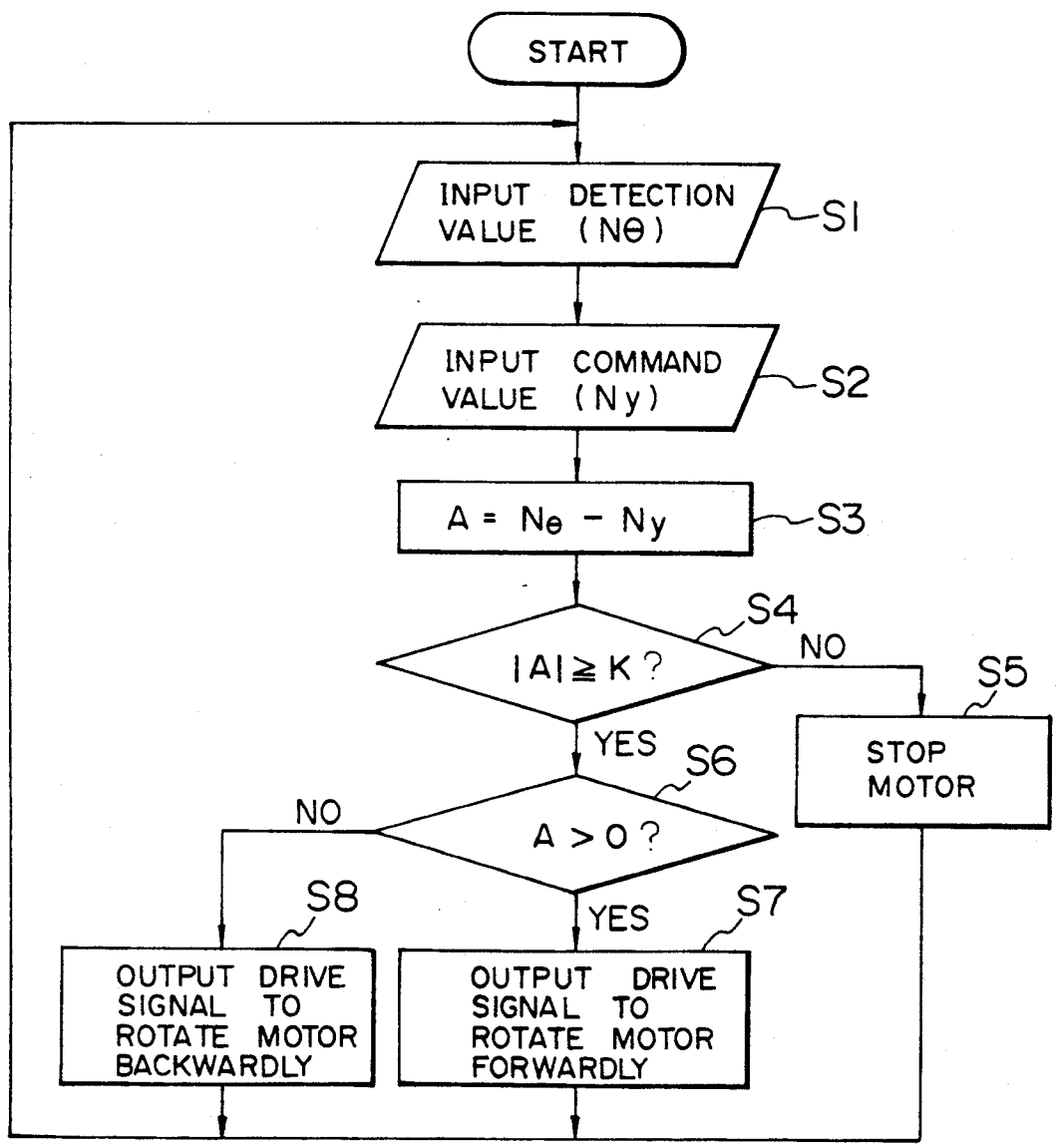
FIG. 4 is a flowchart showing the process sequence of the processing function in a servo control section.

The servo control section 43 is arranged to carry out the control process shown in a flowchart of FIG. 4. More specifically, the detection value N$\theta$ of the potentiometer 34 and the command value Ny of the maximum value selector 42 are input in step S1 and S2, respectively. Step S3 compares the detection value N$\theta$ with the command value Ny to calculate a difference A therebetween, i.e., A=N$\theta$−Ny. Then, step S4 determines whether or not an absolute value of the difference A is equal to or larger than a predetermined value K. The predetermined value K is given by a very small value on the order corresponding to control errors due to backlash, etc. in the linkage 37 and other mechanisms for coupling the pulse motor 35 and the governor lever 31. Then, if the absolute value of the difference A is smaller than the predetermined value K, the pulse motor 35 is stopped in step S5. If it is equal to or larger than the predetermined value K, a signal for driving the pulse motor 35 to rotate forwardly or backwardly dependent on whether the difference A is positive or negative, respectively, is output through steps S6, S7, S8. In other words, a drive signal is output for turning the governor lever 31 in such a direction as to make the difference A smaller. Afterward, the control flow returns to step S1, followed by repeating the above process.

Thus, by detecting the moved amount N$\theta$ of the governor lever 31 and feeding-back it as mentioned above, the pulse motor 35 is driven when the revolution speed command value Ny has changed, until the moved amount N$\theta$ of the governor lever 31 becomes coincident with the revolution speed command value Ny. As a result, the governor lever 31 is turned to a position corresponding to the revolution speed command value Ny.

Operation and Effect

Next, operation and effect of the hydraulic drive system of this embodiment will be described.

During operation under the low load as encountered when traveling on a flat road at a constant speed or descending a sloped road, for instance, the fuel lever 32 is operated to the moved amount less than its full stroke for setting the target revolution speed Nx to a relatively low speed in the first arithmetic section 40 of the controller 36 by way of example. At this time, because the torque control regulator 80 will not start its function under such an operating condition and hence the differential pressure $\Delta$PLS is in the vicinity of the target differential pressure $\Delta$Po, a relatively small value is calculated as the target revolution speed Np in the second arithmetic section 41 of the controller 36. Therefore, when the aforesaid target revolution speed Nx is larger than the calculated target revolution speed Np, the maximum value selector 42 selects the target revolution speed Nx as the revolution speed command value Ny. The engine 1 is thereby controlled to the target revolution speed Nx set by the fuel lever 32, so that the vehicle cruises on a flat road or descends a sloped road at that engine revolution speed.

When the operating condition is changed from the above one to another one wherein the load or the demanded flow rate of the actuator(s) is increased and the torque control regulator 80 is brought to function to such an extent that the pump delivery rate undergoes saturation, e.g., when entering a sloped road to ascend or starting to travel at an accelerated speed, the differential pressure between the pump delivery pressure and the maximum load pressure is reduced from the fixed value and the differential pressure $\Delta$LS falls below the target differential pressure $\Delta$Po, whereby a relatively large value is calculated as the target revolution speed Np in the second arithmetic section 41 of the controller 36. Therefore, the maximum value selector 42 selects the target revolution speed Np as the revolution speed command value Ny, and the engine 1 is controlled to the target revolution speed Np for increasing the engine revolution speed. As a result, even though the tilting angle $\theta$s of the hydraulic pump 2 is limited in its increase by the regulator 80, the delivery rate of the hydraulic pump 2 is increased with the increase in revolution speed. The desired traveling speed can thus be obtained since the pump delivery rate will not get into saturation.

Accordingly, the intended traveling can be performed at a lower engine revolution speed by setting the target revolution speed Nx to a low value less than its maximum value Nxmax, making it possible to improve fuel consumption, achieve economic operation, and lower an engine sound for reduced noise.

Then, during sole traveling under the high load such as encountered when starting to travel or ascending a sloped road, or under the operating condition that the delivery pressure or delivery rate of the hydraulic pump 2 is increased frequently, such as encountered in the combined operation of traveling and boom-up where the actuators require the large flow rate, the fuel lever 32 is set to the moved amount corresponding to its full stroke for setting the maximum target revolution speed Nxmax in the first arithmetic section 40 of the controller 36 by way of example. At this time, when the torque control regulator 80 is brought to function to such an extent that the pump delivery rate undergoes saturation, the differential pressure between the pump delivery pressure and the maximum load pressure is reduced from the fixed value and hence a relatively large value is calculated as the target revolution speed Np in the second arithmetic section 41 of the controller 36. Then, since Npmax > Nxmax holds as stated above, the maximum value selector 42 selects the target revolution speed Np as the revolution speed command value Ny for raising up the engine revolution speed. As a result, the delivery rate of the hydraulic pump 2 is increased, namely, saturation of the pump delivery rate is resolved or avoided to provide the desired speeds of the actuators. In addition, during the combined operation, it is possible to maintain the speed ratio of the actuators constant and improve operability.

Furthermore, when the load is so reduced as to cause transition into an operating condition that the torque control regulator 80 stops its function, for instance, the LS differential pressure ΔLS becomes large and a relatively small value is calculated in the second arithmetic section 41 as the target revolution speed Np, whereby the target revolution speed Nx is given as the revolution speed command value Ny and the engine 1 is controlled to the target revolution speed set by the fuel lever 32 and lower than Npmax. This permits prevention of excessive rotation of the engine, and hence achieves a reduction in both fuel consumption and noise. In addition, the revolution speed command value Ny will not fall down from the maximum value Nxmax set by the control lever 32, whereby the engine revolution speed is fluctuated with less frequency due to fluctuations in the target revolution speed. This also enables a reduction in both fuel consumption and noise incidental to frequent fluctuations in the engine revolution speed.

With this embodiment, as described above, since the revolution speed of the engine 1 is automatically raised up to increase the delivery rate of the hydraulic pump 2 when the pump delivery rate gets into saturation, the target revolution speed Nx dependent on the fuel lever 32 can be set to a lower value for reducing fuel consumption and noise, while improving durability of the equipment. It is also possible to prevent a decrease in the actuator speed and a deterioration in operability during the combined operation which would otherwise be caused by saturation of the pump delivery rate, and hence to ensure excellent operability at all times is ensured. Further, under the operating condition that the flow rate demanded by the actuator(s) or the delivery pressure of the hydraulic pump is increased frequently, it becomes possible to suppress frequent fluctuations in the engine revolution speed and hence achieve a reduction in both fuel consumption and noise, by setting the target revolution speed Nx dependent on the fuel lever 32 to a high value.

Modification of First Embodiment

A modification of the first embodiment will now be described with reference to FIG. 5.

The foregoing first embodiment is arranged to select a larger value between the target revolution speed Nx from the first arithmetic section 40 and the target revolution speed Np from the second arithmetic section 41 for setting it as the revolution speed command value Ny. This process is modified in this embodiment. More specifically, a second arithmetic section 44 previously sets therein the functional relationship between the LS differential pressure $\Delta PLS$ and an increment value $\Delta \alpha$ of a modifying revolution speed $\alpha$ such that the increment value $\Delta \alpha$ of the modifying revolution speed $\alpha$ is negative in a range where the LS differential pressure $\Delta PLS$ is larger than a predetermined differential pressure $\Delta Po$ as the target differential pressure, while the increment value $\Delta \alpha$ of the modifying revolution speed $\alpha$ is positive in a range where the LS differential pressure $\Delta PLS$ is smaller than the predetermined value $\Delta Po$, and the increment value $\Delta \alpha$ is then increased as the LS differential pressure $\Delta PLS$ decreases. The increment value $\Delta \alpha$ of the modifying revolution speed $\alpha$ determined by the second arithmetic section 44 is added in an adder 45 to the modifying revolution speed $\alpha$ determined in the last control cycle for setting the resultant sum as a new modifying revolution speed $\alpha$.

Further, in this embodiment, an adder 46 for adding the modifying revolution speed $\alpha$ to the target revolution speed Nx from the first arithmetic section 40 is provided in place of the maximum value selector 42.

With this embodiment thus arranged, when the LS differential pressure $\Delta PLS$ is held at the predetermined value $\Delta Po$ in a condition that the target revolution speed Nx dependent on the fuel lever 23 is set to a certain value, the modifying revolution speed $\alpha$ is equal to zero and the revolution speed command value Ny is given by the target revolution speed Nx commanded by the fuel lever 32. When the LS differential pressure $\Delta PLS$ falls below the predetermined value $\Delta Po$, the modifying revolution speed $\alpha$ is determined through the second arithmetic section 44 and the adder 45, followed by addition to the target revolution speed Nx for increasing the revolution speed command value Ny. Note that why the increment value $\Delta \alpha$ of the modifying revolution speed $\alpha$ is first determined and then added to the last modifying revolution speed $\alpha$ for determining a new modified revolution speed $\alpha$, is to prevent the occurrence of hunting.

With this embodiment thus arranged, since the target revolution speed higher than the target revolution speed Nx is given as the revolution speed command value Ny when the LS differential pressure $\Delta PLS$ becomes smaller than the predetermined value $\Delta Po$, the revolution speed of the engine 1 is automatically raised up to increase the delivery rate of the hydraulic pump 2 upon the pump delivery rate getting into saturation, as with the foregoing first embodiment. Consequently, this embodiment can also provide the similar advantageous effect to that of the first embodiment.

Second Embodiment

Figure 6:
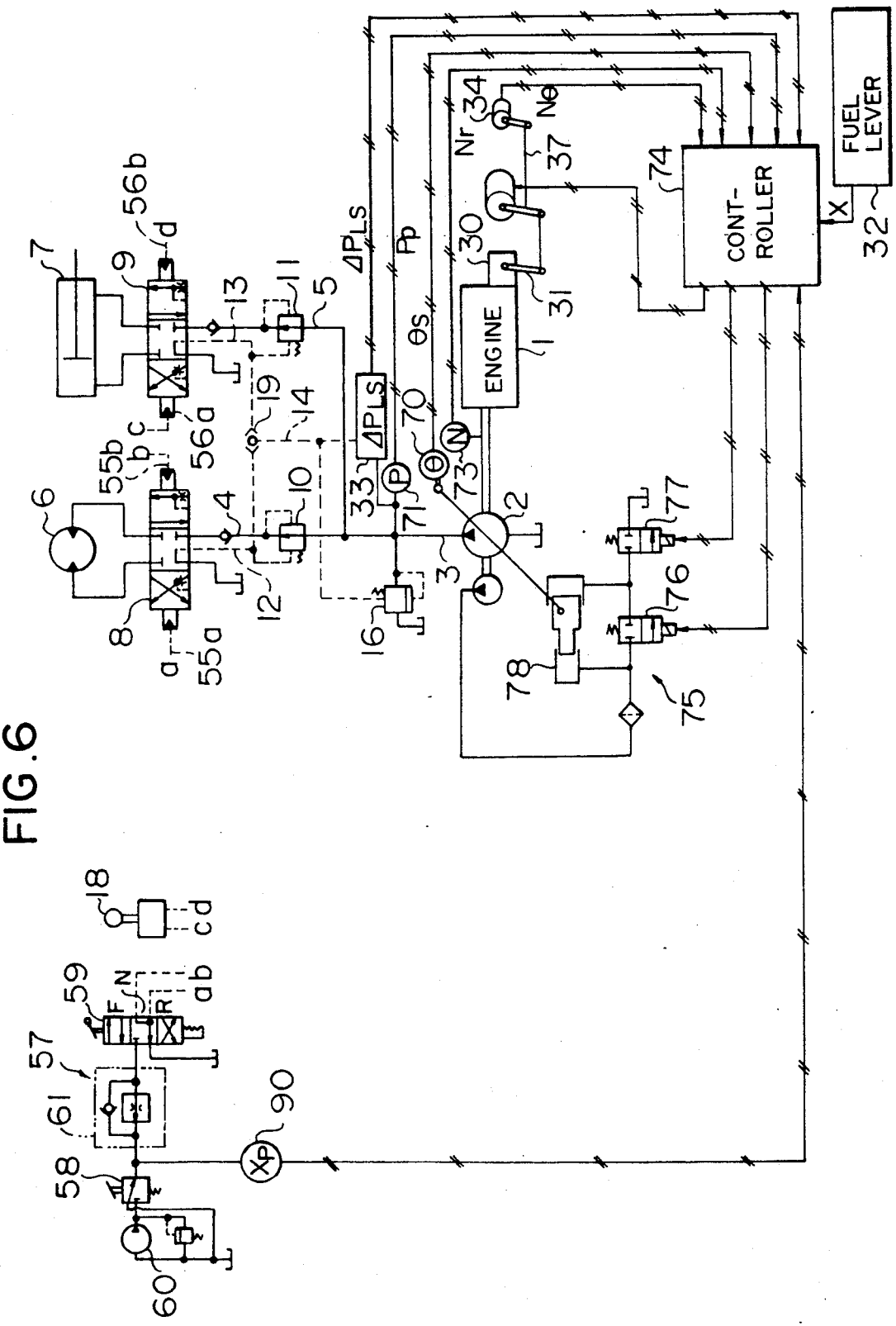
FIG. 6 is a diagrammatic view of a hydraulic drive system according to a second embodiment of the present invention.

A second embodiment of the present invention will be described with reference to FIGS. 6 through 8. In FIG. 6, the same members as those in FIG. 1 are designated by the same reference numerals.

One difference of this embodiment from the first embodiment shown in FIG. 1 is in that while the LSR 15 is hydraulically arranged for carrying out the load sensing control in the first embodiment shown in FIG. 1, the similar control is electronically implemented in this embodiment.

More specifically, the hydraulic system shown in FIG. 6 includes not the LSR 15, but a group of sensors comprised of a tilting angle sensor 70 for detecting a swash plate tilting angle (displacement volume) $\theta s$ of the hydraulic pump 2, a pressure sensor 71 for detecting the delivery pressure Pp of the hydraulic pump 2, a differential pressure sensor 33 for detecting the differential pressure $\Delta PLS$ between the delivery pressure of the hydraulic pump 2 and the maximum load pressure of the actuators 6, 7, and a revolution sensor 73 for detecting the revolution speed of the engine 1, a controller 74 equipped with a pump control section 74A (see FIG. 7) adapted to receive and process respective detection signals from the group of those sensors, and a tilting angle control device 75 driven in response to an electric signal output from the controller 74.

The tilting angle control device 75 comprises two solenoid valves 76, 77, and a servo cylinder 78 which is controlled in supply and discharge of the hydraulic fluid thereto and hence in its position upon shifting of those solenoid valves. Then, with the servo cylinder 78 being controlled in its position, the tilting angle of the hydraulic pump 2 is controlled.

The controller 74 also includes an engine control section 74B (see FIG. 8) as described later.

Figure 7:
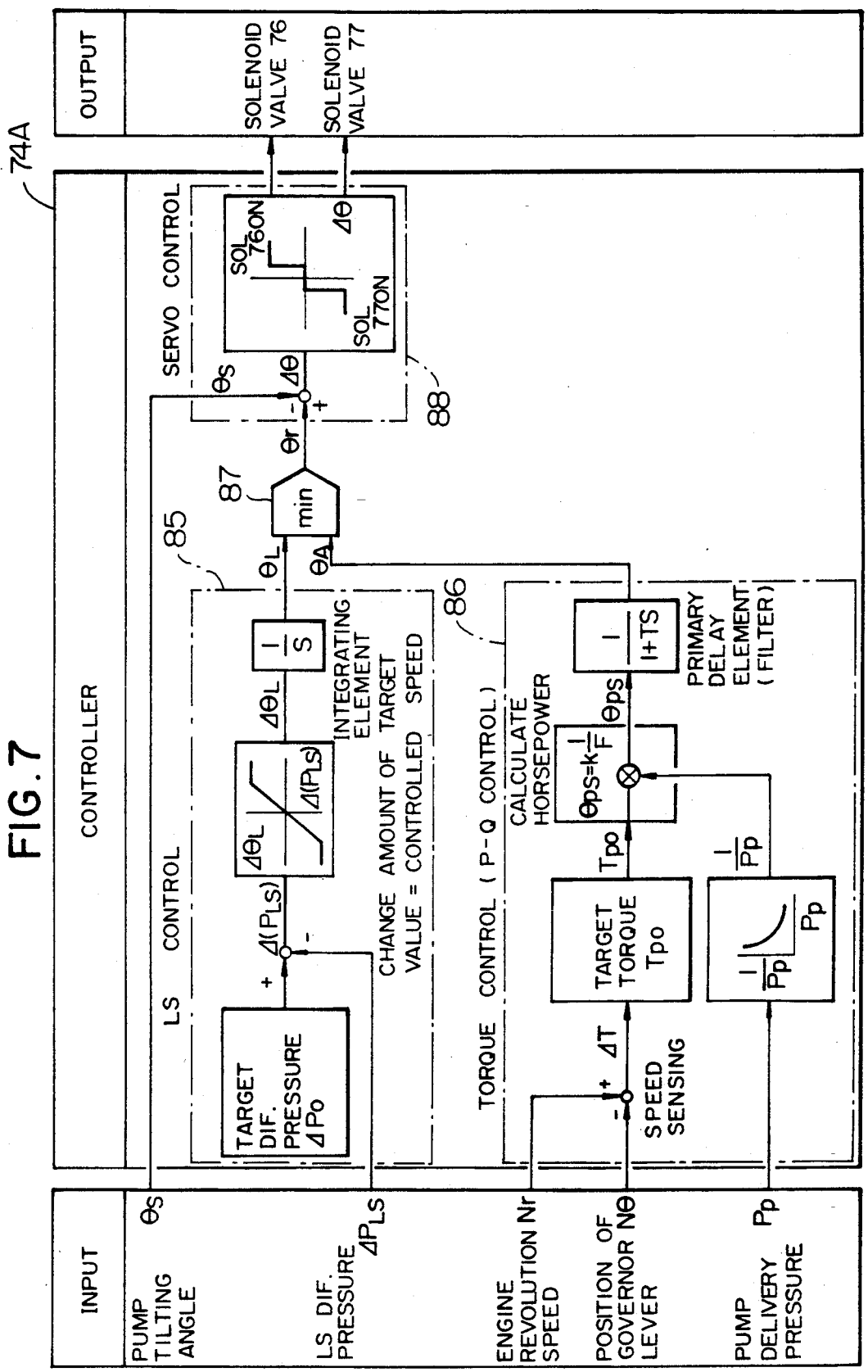
FIG. 7 is a block diagram showing a processing function in a pump control section of a controller in the hydraulic drive system of FIG. 6.

The pump control section 74A of the controller 74 has an arithmetic processing function as shown in a functional block diagram of FIG. 7. Thus, the pump control section 74A of the controller 74 comprises an LS control section 85, a torque control section 86, a minimum value selector 87 and a servo control section 88.

The LS control section 85 calculates a deviation $\Delta(PLS)$ between the target differential pressure $\Delta Po$ and a fed-back value of the actual differential pressure $\Delta PLS$ detected by the differential pressure sensor 33, then calculates a change amount $\Delta\theta L$ of the target value (=controlled speed) from that deviation $\Delta(PLS)$, and thereafter integrates it to determine a target pump tilting angle $\theta L$ for the LS control.

The torque control section 86 calculates a deviation $\Delta T$ between the engine revolution speed Nx detected by the revolution sensor 73 and the moved amount $N\theta$ of the governor lever detected by the potentiometer 34 for speed sensing. From this difference, it then calculates target torque Tpo aiming to prevent engine stall. The target torque Tpo is multiplied by the reciprocal 1/Pp of the pump delivery pressure Pp detected by the pressure sensor 71 for calculation of the horsepower, and the resulting value $\theta ps$ is subjected to a filter as a primary delay element to determine a target pump tilting angle $\theta A$ for the input torque limiting control.

The minimum value selector 87 selects a minimum value of both the target pump tilting angles $\theta L$, $\theta A$ as a tilting angle command value $\theta r$. The servo control section 88 calculates a difference or deviation $\Delta\theta$ between the tilting angle command value $\theta r$ and a fed-back value $\theta s$ of the actual tilting angle detected by the tilting angle sensor 70. If the difference $\Delta\theta$ is in excess of a predetermined value defining the dead zone, a drive signal is output from the section 88 for driving a solenoid valve 76 or 77.

With the above arrangement, when the target pump tilting angle $\theta L$ for the LS control is selected in the minimum value selector 87, the load sensing control is carried out to hold the pump delivery pressure higher by the fixed differential pressure $\Delta Po$ than the maximum load pressure, as with the LSR 15 in the first embodiment. When the target pump tilting angle $\theta A$ for the torque control is selected, the pump tilting angle is controlled so that the input torque of the hydraulic pump 2 becomes coincident with the target torque Tpo, thereby carrying out the input torque limiting control to keep the input torque of the hydraulic pump 2 from exceeding the output torque of the engine 1, as with the torque control regulator 80 in the first embodiment.

This embodiment is also different from the first embodiment of FIG. 1 in the arithmetic processing function for the revolution speed command value Ny to be effected in an engine control section 74b of the controller 74. More specifically, a pressure sensor 90 is connected to the output side of the pilot reducing valve 58. The pressure sensor 90 detects a pilot pressure corresponding to the trod amount, i.e., the input amount xp, of the pilot reducing valve 58 and outputs a signal corresponding to the pilot pressure to the controller 74.

Figure 8:
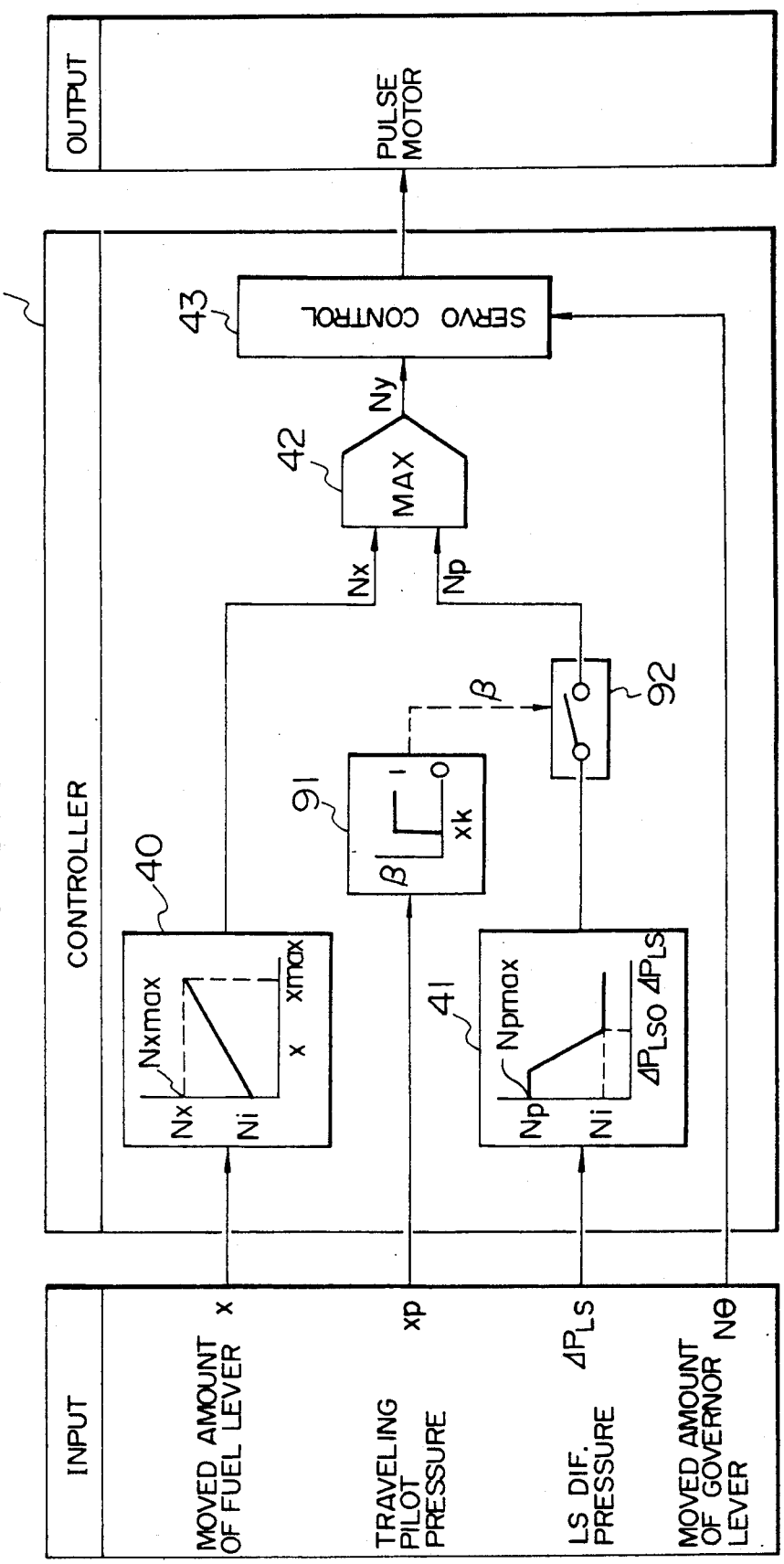
FIG. 8 is a block diagram showing a processing function in an engine control section of the controller.

The engine control section 74B of the controller 74 has an arithmetic processing function as shown in a functional block diagram of FIG. 8. In this drawing, the identical functional blocks to those in FIG. 3 are designated by the same reference numerals.

Referring to FIG. 8, a block 91 outputs, based on a detection signal of the pressure sensor 90, a signal $\beta$ of level 0 when the input amount xp of the pilot reducing valve 58 indicated by that detection signal is smaller than a predetermined value xk, and a signal $\beta$ of level 1 when it becomes equal to or larger than the predetermined value xk. The signal $\beta$ is sent to a switch 92 which is opened when the signal $\beta$ is at a level 0, for interrupting transmission of the target revolution speed Np from the second arithmetic section 41 to the maximum value selector 42, and which is closed when the signal $\beta$ takes a level 1, for transmitting the target revolution speed Np to the maximum value selector 42.

With this embodiment thus arranged, in a range where the pilot pressure, i.e., the input amount xp, of the pilot reducing valve 58 is not smaller than the predetermined value xk, the switch 92 is closed to provide the same block arrangement as that of the first embodiment shown in FIG. 3, allowing this embodiment to operate in a like manner to the first embodiment. When the input amount xp is smaller than the predetermined value xk, the switch 92 is opened to bring forth the block arrangement devoid of the second arithmetic section 41. Therefore, the revolution speed command value Ny is determined by only the target revolution speed Nx from the first arithmetic section 40, and the target revolution speed dependent on the moved amount x of the fuel lever 32 is obtained irrespective of fluctuations in the LS differential pressure $\Delta PLS$. In other words, the engine revolution speed will not fluctuate so long as the fuel lever 32 is not operated.

Accordingly, in addition to obtain substantially the same advantageous effect as that in the first embodiment, this embodiment can prevent fluctuations in the engine revolution speed and improve operability when the vehicle is traveling at a very low speed with the pilot reducing valve 58 kept at the small input amount, because the engine revolution speed will not be raised up even if the load is temporarily increased and hence the hydraulic pump 2 is temporarily subjected to the input torque limiting control through the torque control section 86. Also, since the engine revolution speed will not be fluctuated while traveling at a very low speed, the operation is not noisy or offensive to the ear and fuel consumption can be prevented from increasing due to frequent fluctuations in the engine revolution speed. Furthermore, when the input amount xp exceeds the predetermined value xk, the engine is subjected to the revolution speed increasing control so that the driven state of the engine is made to match with the intention of an operator, allowing the operator to have a good feeling in operation.

Figure 5:
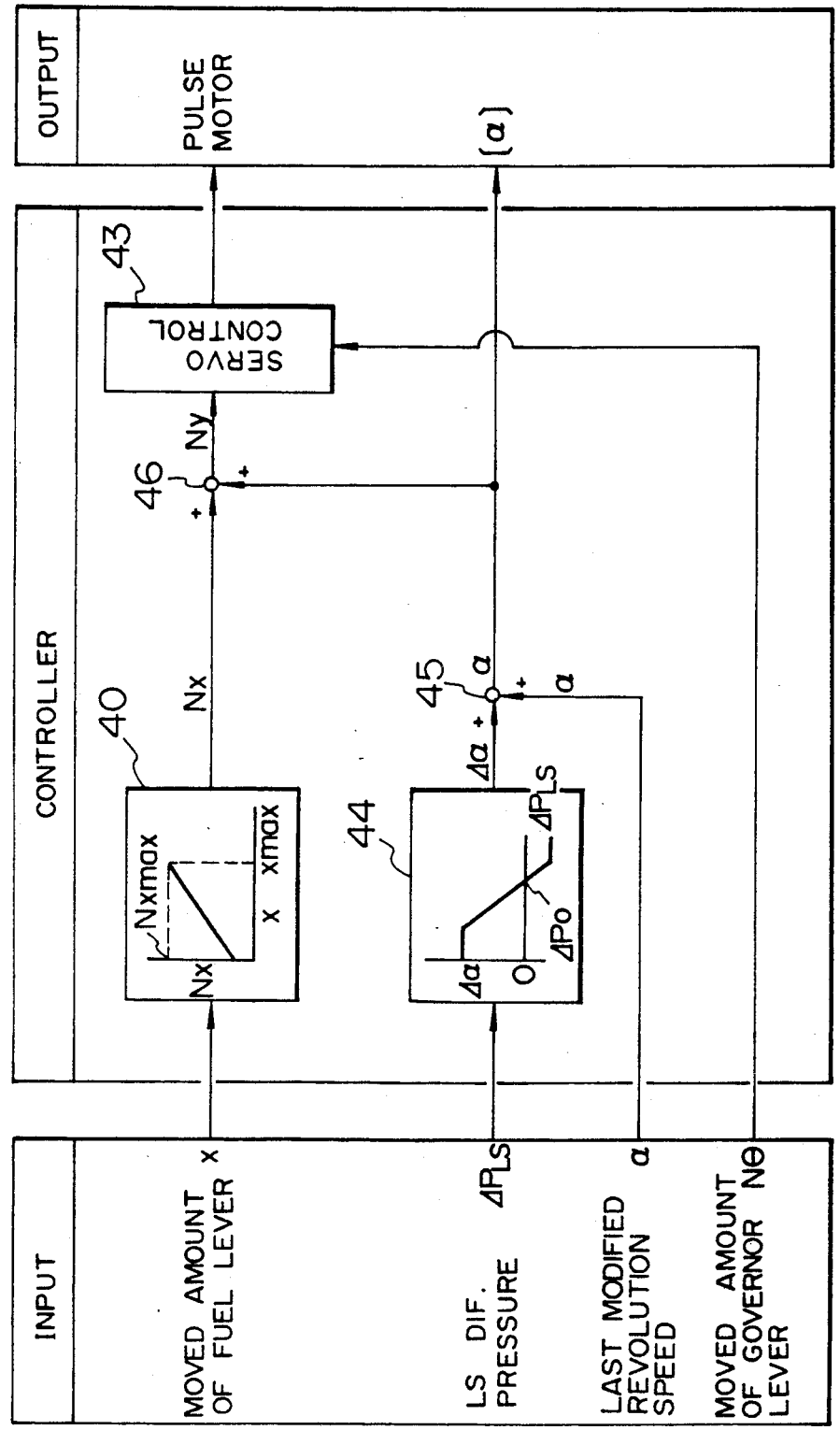
FIG. 5 is a block diagram showing a processing function of the controller according to a modification of the first embodiment.
Figure 9:
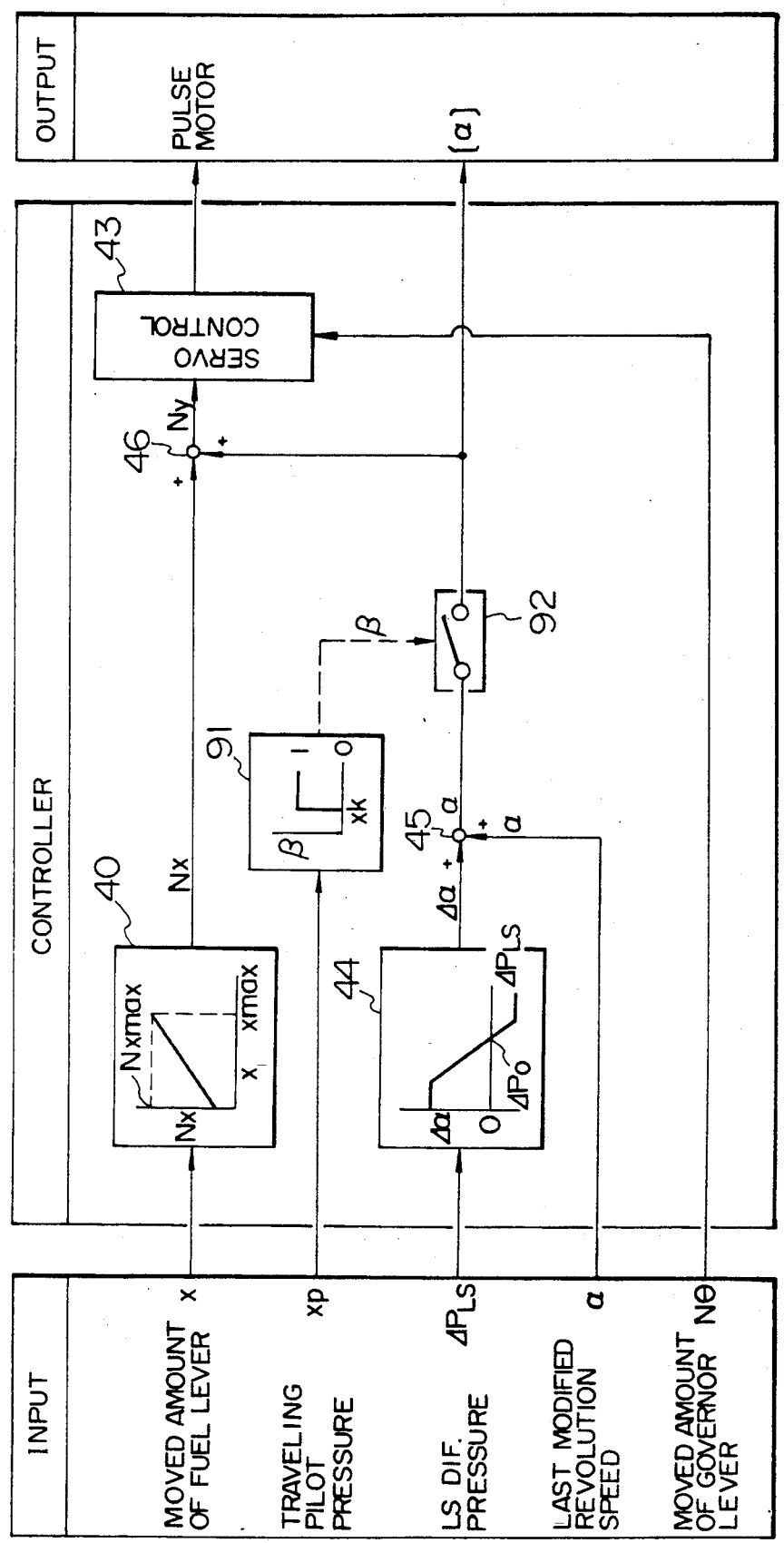
FIG. 9 is a block diagram showing a processing function of the controller according to a modification of the second embodiment.

Note that the concept of this embodiment can similarly be applied to the embodiment shown in FIG. 5 as well. FIG. 9 shows a block diagram of the case of implementing that application. In FIG. 9, the identical components to those in FIGS. 5 and 8 are designated by the same reference numerals. In the embodiment of FIG. 9 too, when the input amount xp is not in excess of the predetermined value xk, the switch 92 is opened and the modifying revolution speed α is not added to the target revolution speed Nx. Thus, the target revolution speed Nx remains unchanged and the engine revolution speed will not fluctuate. Consequently, the similar advantageous effect to that in the second embodiment can be provided.

Third Embodiment

A third embodiment of the present invention will be described below with reference to FIG. 10. In the drawing, the identical components to those in FIG. 8 are designated by the same reference numerals. This embodiment adopts the hardware structure of the second embodiment shown in FIG. 6, but is different from it in the arithmetic processing function to be effected by the engine control section of the controller 74.

Figure 10:
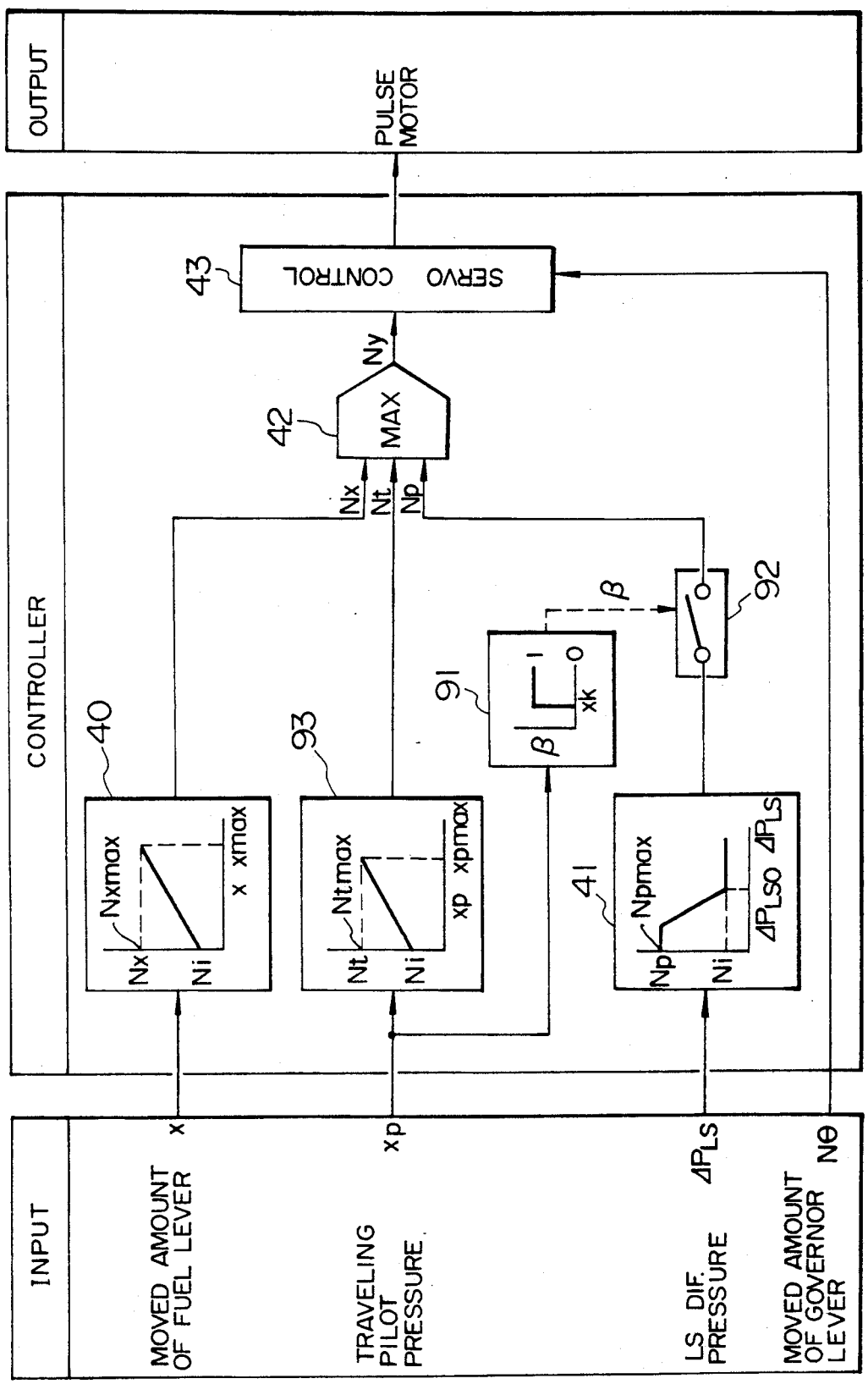
FIG. 10 is a block diagram showing a processing function of the controller according to a third embodiment.

In FIG. 10, a block 93 designates a third arithmetic section. This third arithmetic section 93 calculates a target revolution speed Nt which increases dependent on the input amount xp of the pilot reducing valve 58 indicated by the detection signal of the pressure sensor 90, based on the function $Nt = f(xp)$. This target revolution speed Nt is sent to the maximum value selector 42 together with the other two target revolution speeds Nx, Np. The maximum value selector 42 selects a maximum value among those three speeds as the revolution speed command value Ny.

As explained in connection with the first embodiment, the maximum value Nxmax of the target revolution speed Nx set by the first arithmetic section 41 is set lower than the highest revolution speed of the engine 1, while the maximum value Npmax of the target revolution speed Np set by the second arithmetic section 41 is set nearly equal to the highest revolution speed of the engine 1. Then, as with Nxmax, a maximum value Ntmax of the target revolution speed Nt set by the third arithmetic section 93 is set lower than the highest revolution speed of the engine 1. Consequently, the maximum value Npmax of the target revolution speed Np is set larger than both the maximum value Nxmax of the target revolution speed Nx and the maximum value Ntmax of the target revolution speed Nt.

With this embodiment thus arranged, in a range where the pilot pressure, i.e., the input amount xp, of the pilot reducing valve 58 is not smaller than the predetermined value xk, the switch 92 is closed so that the maximum value among the target revolution speeds Nx, Np, Nt is given as the revolution speed command value Ny. Accordingly, when the delivery rate of the hydraulic pump 2 gets into saturation and the LS differential pressure ΔPLS becomes smaller beyond a certain value than the predetermined value ΔPLSO, the target revolution speed Np is selected as the revolution speed command value Ny, whereby the revolution speed of the engine 1 is automatically raised up to increase the pump delivery rate. The above process equally applies to the cases where the maximum target revolution speeds Nxmax, Ntmax are set by the first and third arithmetic sections 40, 93, because of the relationships Npmax > Nxmax and Npmax > Ntmax.

When the delivery rate of the hydraulic pump 2 is not subjected to saturation and the LS differential pressure ΔPLS is in excess of the predetermined value ΔPLSO, a larger value between the target revolution speed Nx and the target revolution speed Nt is selected as the revolution speed command value Ny. Therefore, even if the target revolution speed Nx is set at a value lower than Nxmax, the revolution speed command value Ny increases when the trod amount, i.e., the input amount xp, of the pilot reducing valve 58 is so increased that the target revolution speed Nt becomes larger than the target revolution speed Nx, and therefore the engine revolution speed is raised up with an increase in the revolution speed command value Ny. Stated otherwise, in a range where the target revolution speed Nt exceeds the target revolution speed Nx, the engine revolution speed is controlled dependent on the trod amount of the pilot reducing valve 58.

When the input amount xp is smaller than the predetermined value xk, the switch 92 is opened to bring forth the block arrangement devoid of the second arithmetic section 41. Therefore, the engine revolution speed will not fluctuate even if the hydraulic pump gets into saturation and ΔPLS is reduced. In addition, by setting the target revolution speed Nx to a relatively larger value so that the target revolution speed Nt becomes smaller than the target revolution speed Nx, the revolution speed command value Ny is now determined by only the target revolution speed Nx from the first arithmetic section 40, with the result that the engine revolution speed will not fluctuate with a decrease in ΔPLS. In other words, this case also permits the satisfactory traveling at a very low speed as with the third embodiment.

Accordingly, in addition to obtain substantially the same advantageous effect as that in the second embodiment, this embodiment can set the target revolution speed Nx to a lower value for reducing fuel consumption, give the operator a powerful operating feeling sensible proportionally to the input amount of the pilot reducing valve 58, and improve operability, as with the invention disclosed in JP, A, 63-239327 which has been previously filed by the applicant and made open to the public in Japan, under the operating condition that the input amount of the pilot reducing valve 58 is equal to or larger than the predetermined value xk and the delivery rate of the hydraulic pump 2 is not subjected to saturation, because the engine revolution speed is controlled dependent on the trod amount of the pilot reducing valve 58 in a range where the target revolution speed Nt is in excess of the target revolution speed Nx.

Figure 11:
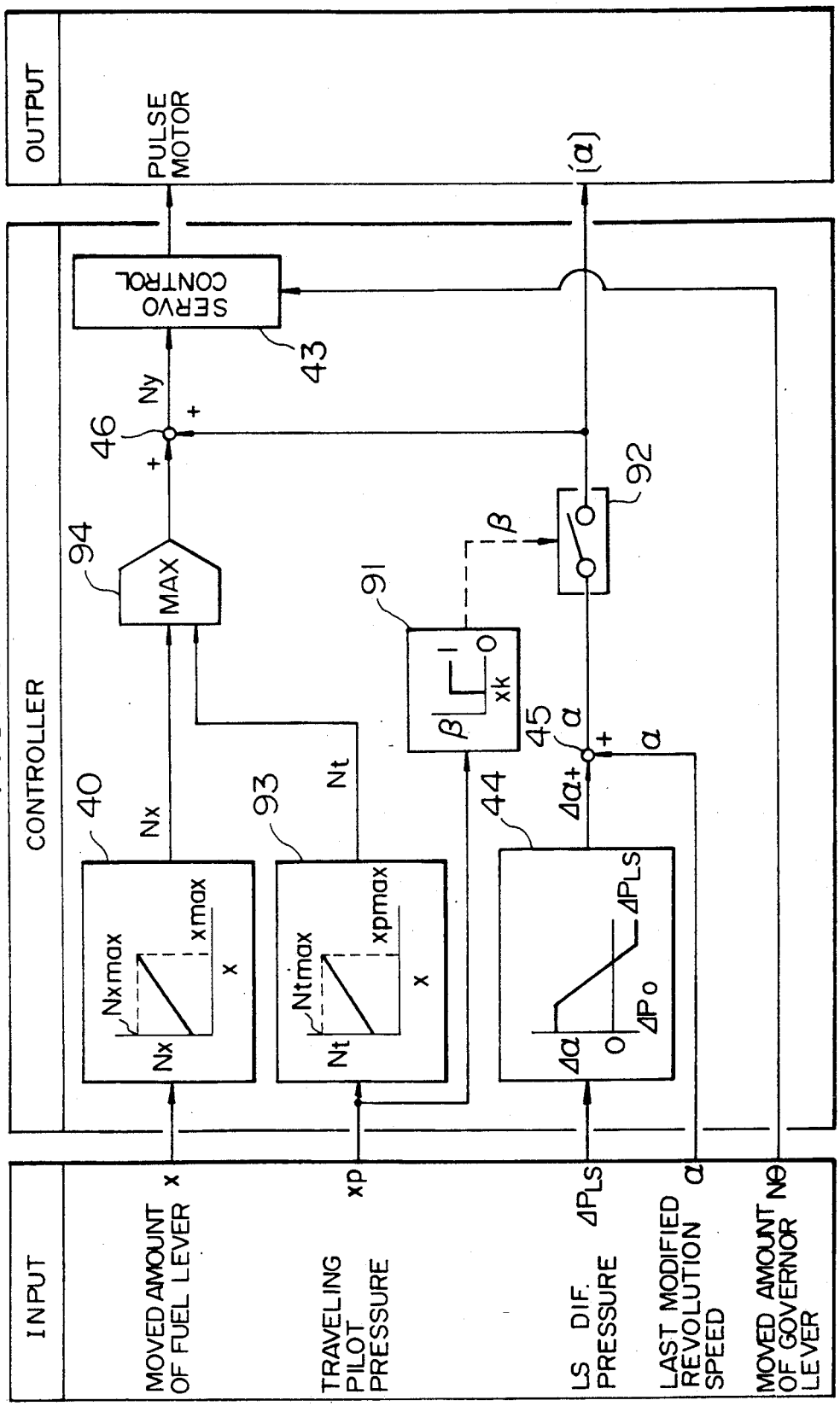
FIG. 11 is. a block diagram showing a processing function of the controller according to a modification of the third embodiment.

Note that the concept of this embodiment can similarly be applied to the embodiment shown in FIG. 5 too, as with the embodiment shown in FIG. 9. FIG. 11 shows a block diagram of the case of implementing that application. In FIG. 11, the identical components to those in FIGS. 5 and 10 are designated by the same reference numerals. This embodiment includes a maximum value selector 94 for selecting a larger value between the two target revolution speeds Nx and Nt. When the switch 92 is closed, the modifying revolution speed α is added to a larger one of the target values Nx, Nt selected by the maximum value selector 94 for obtaining that revolution speed command Ny.

In this embodiment too, under the operating condition that the input amount of the pilot reducing valve 58 is equal to or larger than the predetermined value xk and the delivery rate of the hydraulic pump 2 is not subjected to saturation, the engine revolution speed is controlled dependent on the trod amount of the pilot reducing valve 58 in a range where the target revolution speed Nt is in excess of the target revolution speed Nx. Consequently, the similar advantageous effect to that in the third embodiment can be provided.

Fourth Embodiment

A fourth embodiment of the present invention will be described below with reference to FIGS. 12 and 13. In the drawings, the same components as those in FIGS. 1 and 3 are designated by the same reference numerals.

Figure 12:
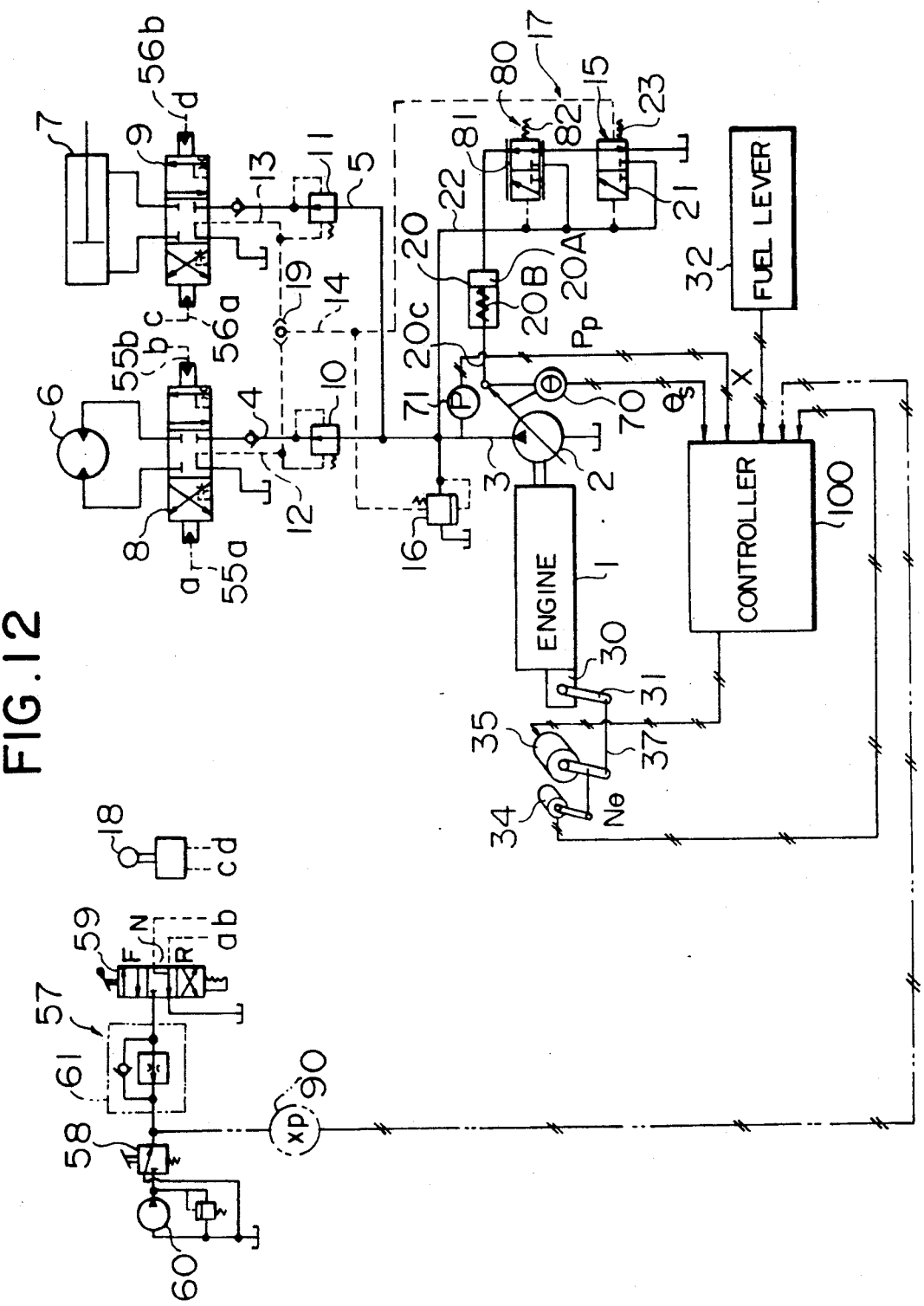
FIG. 12 is a diagrammatic view of a hydraulic drive system according to a fourth embodiment of the present invention.

Referring to FIG. 12, in this embodiment, the differential pressure sensor 33 used in the first embodiment shown in FIG. 1 is omitted, while the tilting angle sensor 70 and the pressure sensor 71 both used in the third embodiment shown in FIG. 6 are provided instead. The remaining hardware structure is similar to that of the first embodiment shown in FIG. 1.

Designated by 100 is a controller. The controller 100 has an arithmetic processing function shown in a functional block of FIG. 13.

More specifically, as with the controller of the first embodiment shown in FIG. 3, the controller 100 comprises the first arithmetic section 40, the maximum value selector 42 and the servo control section 43. The controller 100 also comprises a second arithmetic section 101 for previously setting therein a characteristic of the available maximum tilting with respect to the delivery pressure of the hydraulic pump 2 dependent on characteristics of the engine 1, receiving a detection signal of the pressure sensor 71 and determining a limit value $\theta p$ of the available maximum tilting characteristic corresponding to the pump delivery pressure indicated by that detection signal, an adder 102 for determining a difference $\Delta\theta$ between the pump tilting angle $\theta s$ detected by the tilting angle sensor 70 and the limit value $\theta p$ determined by the second arithmetic section 101, and a third arithmetic section 103 for receiving the difference $\Delta\theta$ in the tilting angle determined by the adder 102 and determining a target revolution speed Nq that has the predetermined functional relationship relative to the difference $\Delta\theta$. A larger value between the target revolution angle Nq determined by the second arithmetic section 103 and the target tilting angle Nx determined by the first section 40 is selected by the maximum value selector 42 as the revolution speed command value Ny.

With the available maximum tilting characteristic of the hydraulic pump 2 preset in the second arithmetic section 101, the functional relationship between the delivery pressure Pp and the limit value $\theta p$ is set such that the product of the pump delivery pressure Pp and the limit value $\theta p$ will not exceed the output torque of the engine 1. That characteristic coincides with that of the torque control regulator 80.

In the third arithmetic section 103, the functional relationship between the tilting angle difference $\Delta\theta$ and the target revolution speed Nq is set such that the target revolution speed Nq is given by the idling revolution speed Ni when the tilting angle difference $\Delta\theta$ determined by the adder 102 is larger than a predetermined value $\Delta\theta o$, and it is increased as the tilting angle difference $\Delta\theta$ decreases, when the difference $\Delta\theta$ falls down from the predetermined value $\Delta\theta o$.

The maximum value Nxmax of the target revolution speed Nx set by the first arithmetic section 40 is set to be lower than the highest revolution speed of the engine 1, while a maximum value Nqmax of the target revolution speed Np set by the third arithmetic section 103 is set nearly equal to the highest revolution speed of the engine 1. Consequently, the maximum value Nqmax of the target revolution speed Nq is set to be higher than the maximum value Nxmax of the target revolution speed Nx.

Next, operation and effect of the hydraulic drive system of this embodiment will be described.

During operation under the low load as encountered when traveling on a flat road at a constant speed or descending a sloped road, for instance, the fuel lever 32 is operated to the moved amount less than its full stroke for setting the target revolution speed Nx to a relatively low speed in the first arithmetic section 40 of the controller 100 by way of example. At this time, the limit value $\theta p$ is determined from the pump delivery pressure Pp in the second arithmetic section 101 of the controller 100, and the difference $\Delta\theta$ from the pump tilting angle $\theta s$ is determined in the adder 102. But, because the torque control regulator 80 will not start its function under such an operating condition, the tilting angle $\theta s$ of the hydraulic pump 1 is controlled through the LSR 15 and is so sufficiently smaller than the limit value $\theta p$ that the relatively large difference $\Delta\theta$ is determined in the adder 102. In the third arithmetic section 103, the idling revolution speed or another relatively small value is hence calculated as the target revolution speed Nq. Therefore, when the target revolution speed Nx is larger than the target revolution speed Nq, the maximum value selector 42 selects the target revolution speed Nx as the revolution speed command value Ny. The engine 1 is thereby controlled to the target revolution speed Nx set by the fuel lever 32, so that the vehicle cruises on a flat road or descends a sloped road at that engine revolution speed.

When the operating condition is changed from the above one to another one that the load or the demanded flow rate of the actuator(s) is increased and the torque control regulator 80 is brought to function beyond a certain extent, e.g., when entering a sloped road to ascend or starting to travel at an accelerated speed, the tilting angle $\theta s$ of the hydraulic pump 1 approaches the limit value $\theta p$ determined from the pump delivery pressure Pp in the second arithmetic section 101 of the controller 100, whereby the difference between the tilting angle $\theta s$ and the limit value $\theta p$ determined in the adder 102 is reduced. When the difference $\Delta\theta$ becomes smaller than the predetermined value $\Delta\theta o$, the third arithmetic section 103 calculates a relatively large value as the target revolution value Nq. Therefore, the maximum value selector 42 selects the target revolution speed Nq as the revolution speed command value Ny, and the engine 1 is controlled to the target revolution speed Nq for raising up the engine revolution speed. As a result, even though the tilting angle $\theta s$ of the hydraulic pump 2 is limited in its increase by the regulator 80, the delivery rate of the hydraulic pump 2 is increased with the revolution speed rising. The desired traveling speed can thus be obtained since the pump delivery rate will not get into saturation.

Accordingly, the intended traveling can be performed at a lower engine revolution speed by setting the target revolution speed Nx to a low value less than its maximum value Nxmax, making it possible to improve fuel consumption, achieve economic operation, and lower an engine sound for reduced noise.

Then, during sole traveling under the high load such as encountered when starting to travel or ascending a sloped road, or under the operating condition that the delivery pressure or delivery rate of the hydraulic pump 2 is increased frequently, such as encountered in the combined operation of traveling and boom-up where the actuators require the large flow rate, the fuel lever 32 is set to the moved amount corresponding to its full stroke for setting the maximum target revolution speed Nxmax in the first arithmetic section 40 of the controller 100 by way of example. At this time, when the torque control regulator 80 is brought to function beyond a certain extent, the tilting angle $\theta s$ of the hydraulic pump 1 approaches the limit value $\theta p$ determined in the second arithmetic section 101 of the controller 100 and the difference $\Delta \theta$ determined in the adder 102 is reduced so that a relatively large value is selected as the target revolution value Nq in the third arithmetic section 103 upon the difference $\Delta \theta$ becoming smaller than the predetermined value $\Delta \theta o$. Then, since Nqmax>Nxmax holds as stated above, the maximum value selector 42 selects the target revolution speed Nq as the revolution speed command value Ny for raising up the engine revolution speed. As a result, the delivery rate of the hydraulic pump 2 is increased, namely, saturation of the pump delivery rate is resolved or avoided to provide the desired speeds of the actuators. In addition, during the combined operation, it is possible to maintain the speed ratio of the actuators constant and improve operability.

Furthermore, when the operating condition is changed to another one wherein the torque control regulator 80 stops its function, the difference $\Delta \theta$ determined in the adder 102 becomes large and a relatively small value is calculated in the third arithmetic section 103 as the target revolution speed Nq, whereby the target revolution speed Nx is given as the revolution speed command value Ny and the engine 1 is controlled to the target revolution speed set by the fuel lever 32 and lower than Nqmax. This prevents the excessive rotation of the engine, and hence to achieve a reduction in both fuel consumption and noise. In addition, the revolution speed command value Ny will not fall down from the maximum value Nxmax set by the control lever 32, whereby the engine revolution speed is fluctuated at the lower frequency due to fluctuations in the target revolution speed. This also enables a reduction in both fuel consumption and noise incidental to frequent fluctuations in the engine revolution speed.

Accordingly, this embodiment can also provide the similar advantageous effect to that of the first embodiment.

From the standpoint of solving saturation of the pump delivery rate, it is preferable in this embodiment for the predetermined value $\Delta \theta o$ set in the third arithmetic section 103 of the controller 100 to meet the relationship that the target revolution speed Nq is increased immediately before the pump tilting set through the load sensing control by the LSR 15 becomes larger than the pump tilting set through the input torque limiting control by the torque control regulator 80.

Modification of Fourth Embodiment

A modification of the fourth embodiment will now be described with reference to FIG. 14. In the drawing, the identical components to those in FIGS. 5 and 13 are designated by the same reference numerals. This embodiment is featured in applying the concept of using the modifying revolution speed $\alpha$ in the embodiment of FIG. 5 to the foregoing fourth embodiment.

Figure 14:
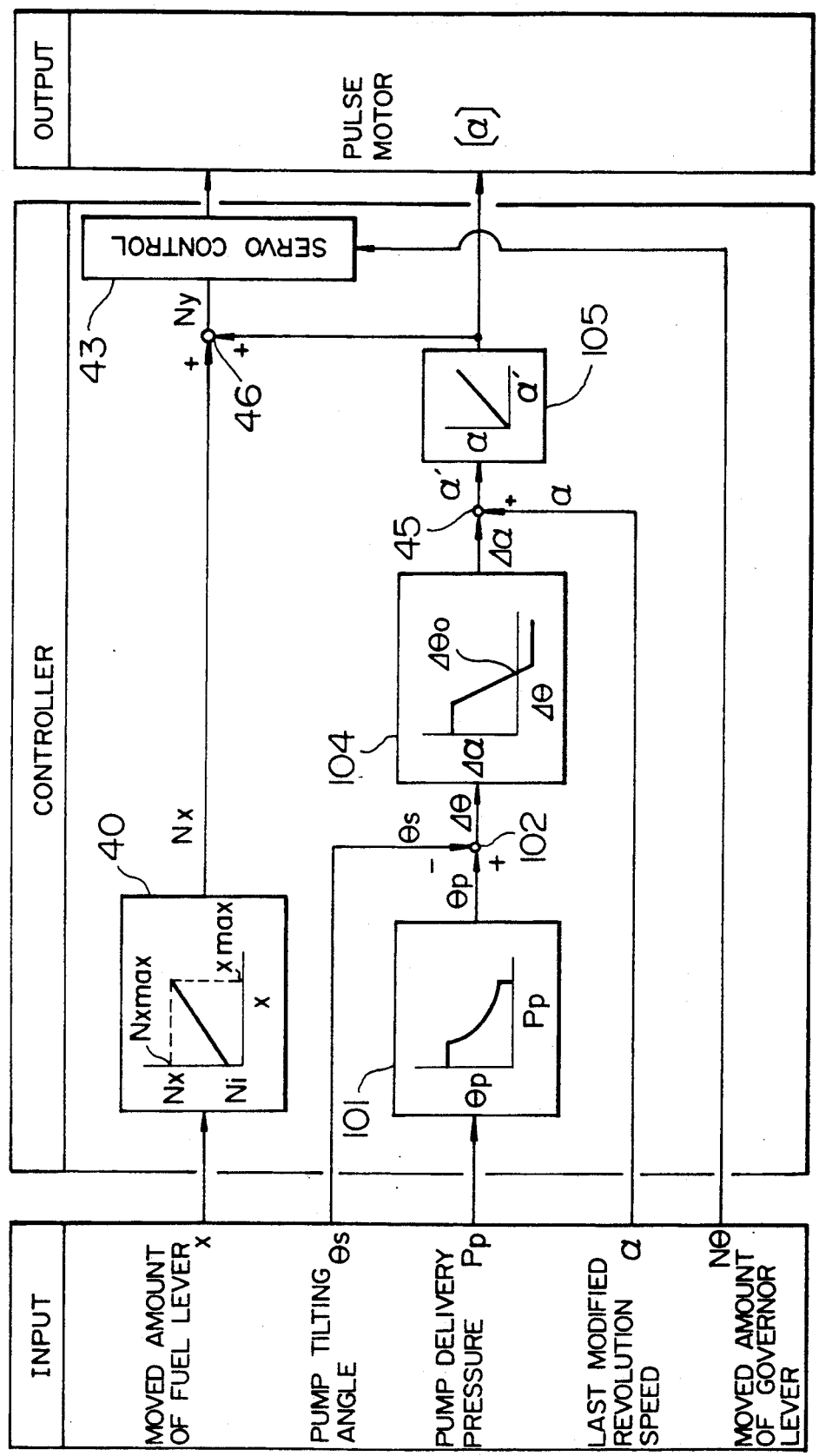
FIGS. 14 through 19 are block diagrams showing respective processing functions of the controller according to several modifications of the fourth embodiment.

In FIG. 14, a third arithmetic section 104 previously sets therein the functional relationship between the tilting angle difference $\Delta \theta$ and the increment value $\Delta \alpha$ of the modifying revolution speed $\alpha$ such that the increment value $\Delta \alpha$ of the modifying revolution speed $\alpha$ is negative in a range where the tilting angle difference $\Delta \theta$ is larger than a predetermined value $\Delta \theta o$, while the increment value $\Delta \alpha$ of the modifying revolution speed $\alpha$ is positive in a range where the tilting angle difference $\Delta \theta$ is smaller than the predetermined value $\Delta \theta o$, and the increment value $\Delta \alpha$ is then increased as the tilting angle difference $\Delta \theta$ decreases. The increment value $\Delta \alpha$ of the modifying revolution speed $\alpha$ determined by the third arithmetic section 104 is added in the adder 45 to the modifying revolution speed $\alpha$ determined in the last control cycle. The resulting sum is cut off in its negative value by a limiter 105 and then set as a new modifying revolution speed $\alpha$ which is added to the target revolution speed Nx from the first arithmetic section 40 in the adder 46.

With this embodiment thus arranged, when the tilting angle difference $\Delta \theta$ is larger than the predetermined value $\Delta \theta o$ in a condition that the target revolution speed Nx dependent on the fuel lever 23 is set to a certain value, the modifying revolution speed $\alpha$ is negative and the revolution speed command value Ny is given by the target revolution speed Nx commanded by the fuel lever 32. When the tilting angle difference $\Delta \theta$ falls below the predetermined value $\Delta \theta o$, the modifying revolution speed $\alpha$ is determined through the third arithmetic section 104 and the adder 45, followed by addition to the target revolution speed Nx for increasing the revolution speed command value Ny.

Consequently, this embodiment can also provide the similar advantageous effect to that of the first embodiment.

Other Modifications of Fourth Embodiment

Other several modifications of the fourth embodiment will be described with reference to FIGS. 15 through 18. These modified embodiments correspond to the embodiments shown in FIGS. 8 through 11, respectively, but are based on the foregoing concept of using the tilting angle difference $\Delta \theta$ in place of the LS differential pressure $\Delta PLS$.

Figure 13:
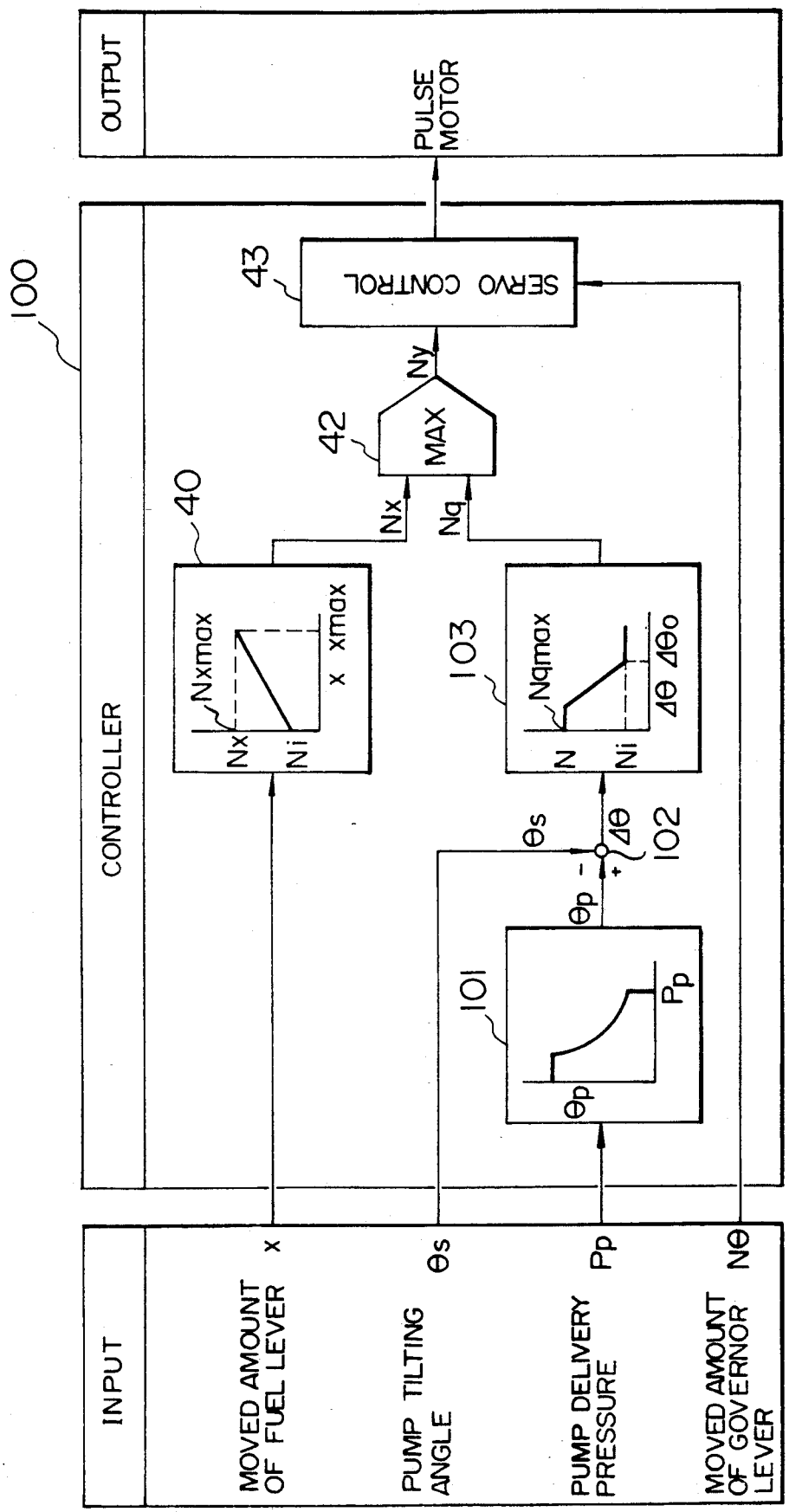
FIG. 13 is a block diagram showing a processing function in an engine control section of a controller in the hydraulic drive system of FIG. 12.
Figure 15:
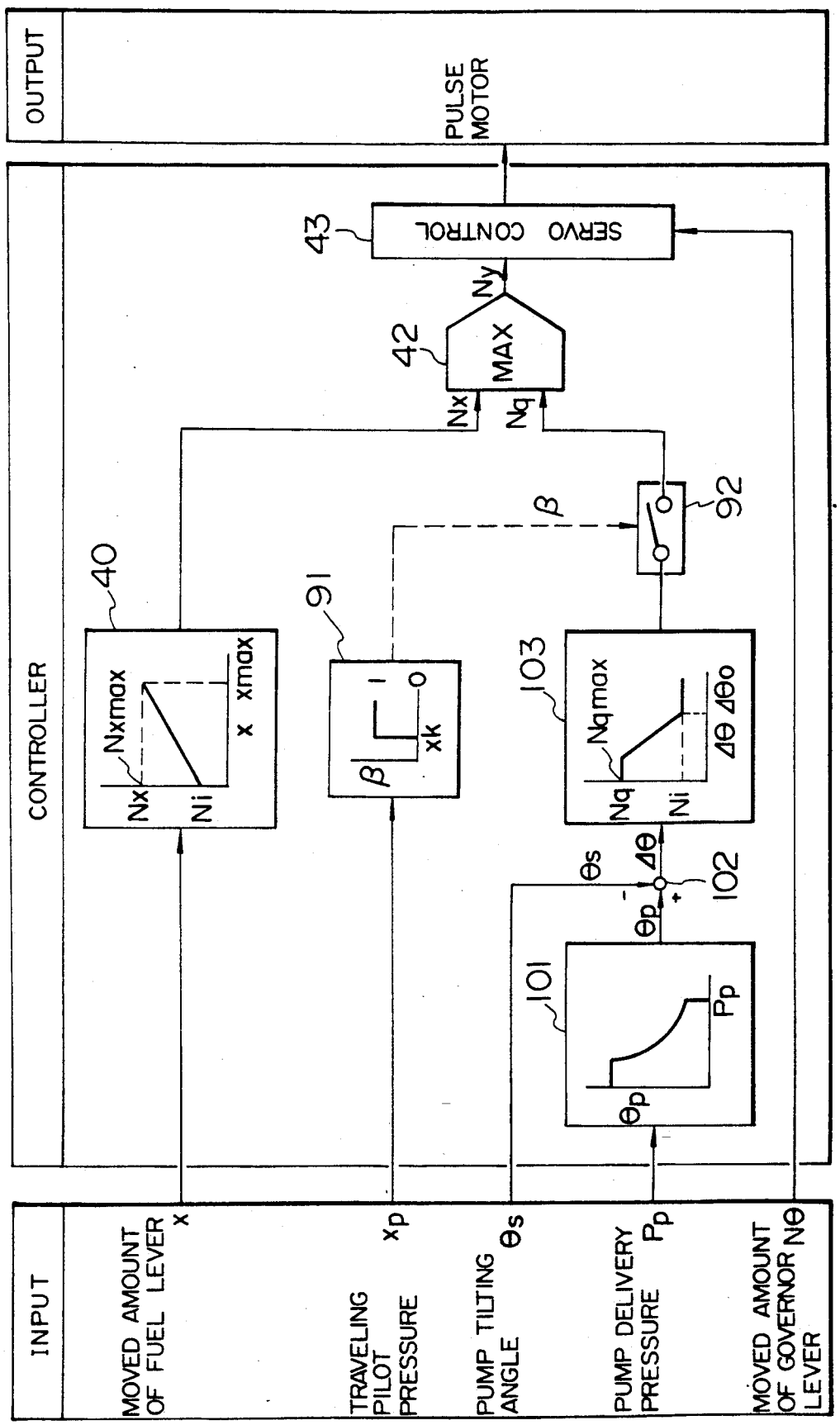
Figure 16:
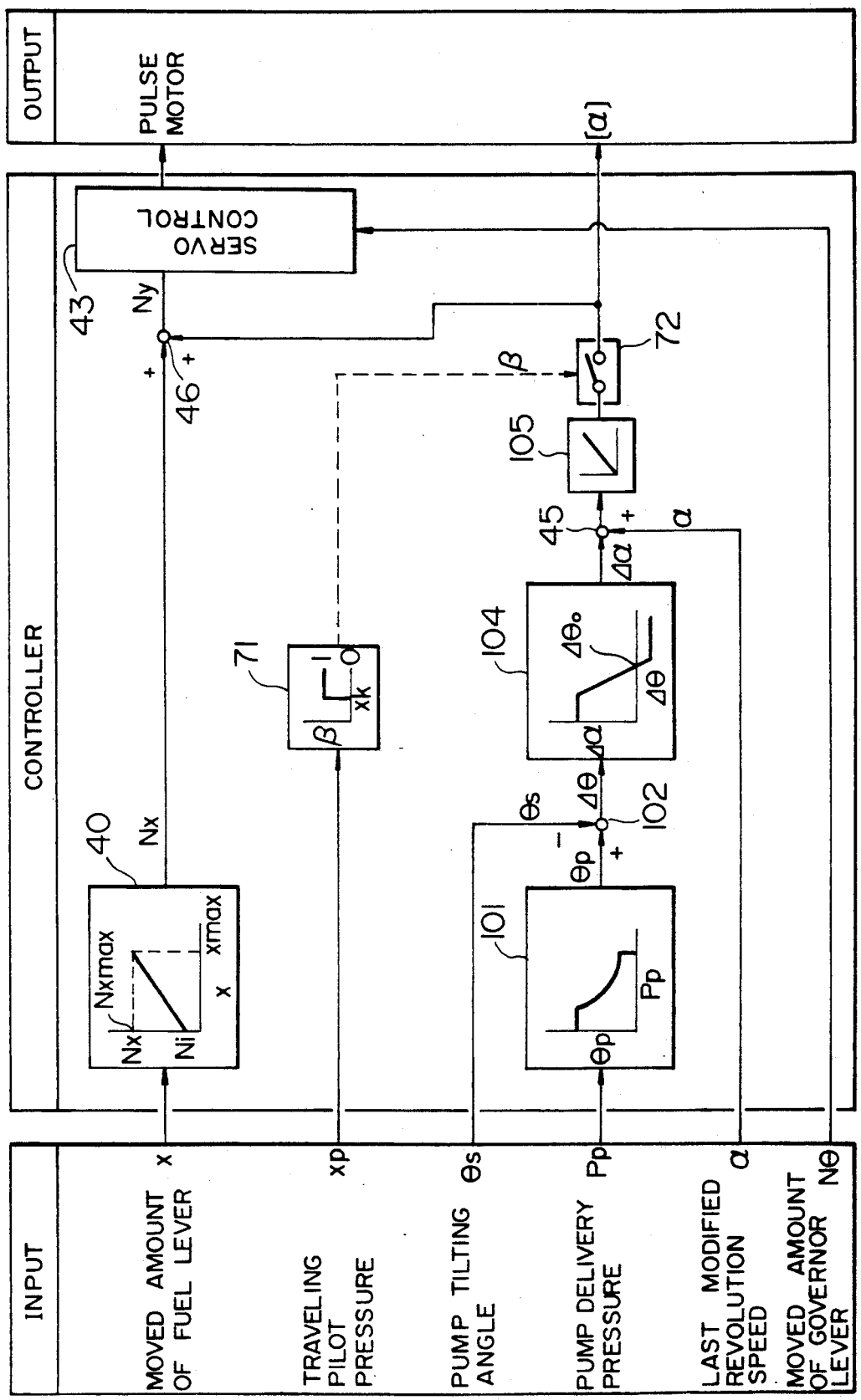
Figure 17:
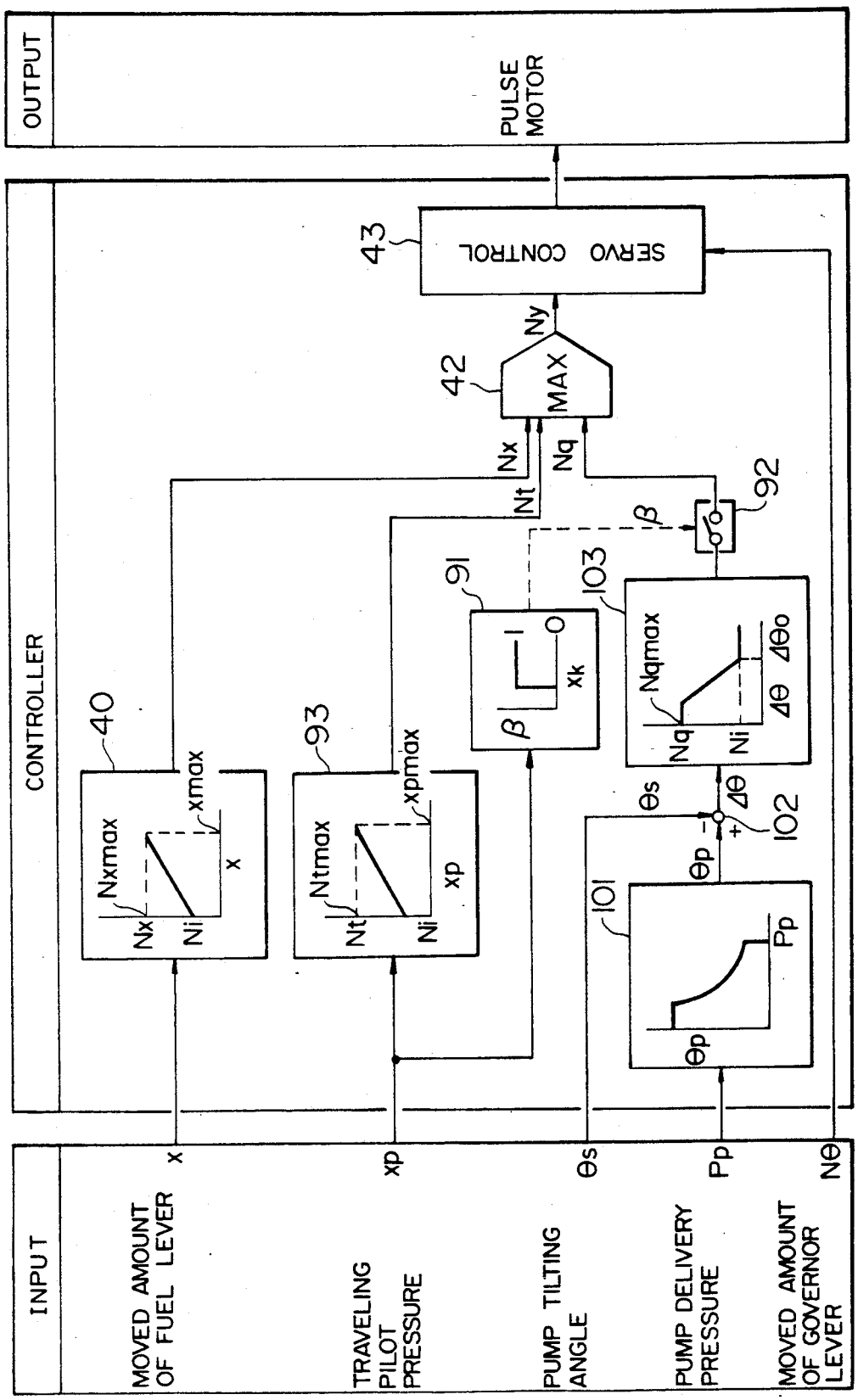
Figure 18:
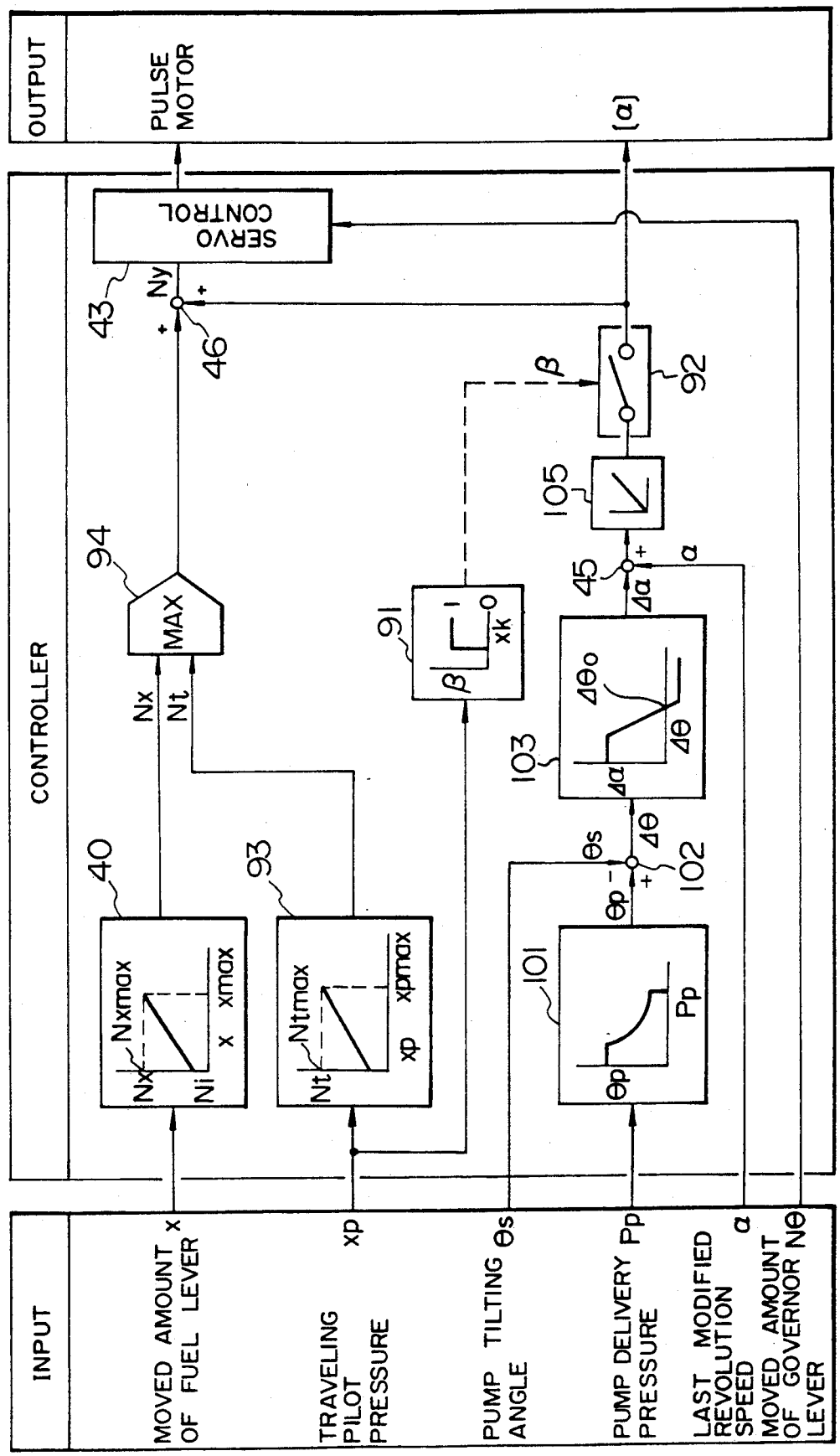
Figure 19:
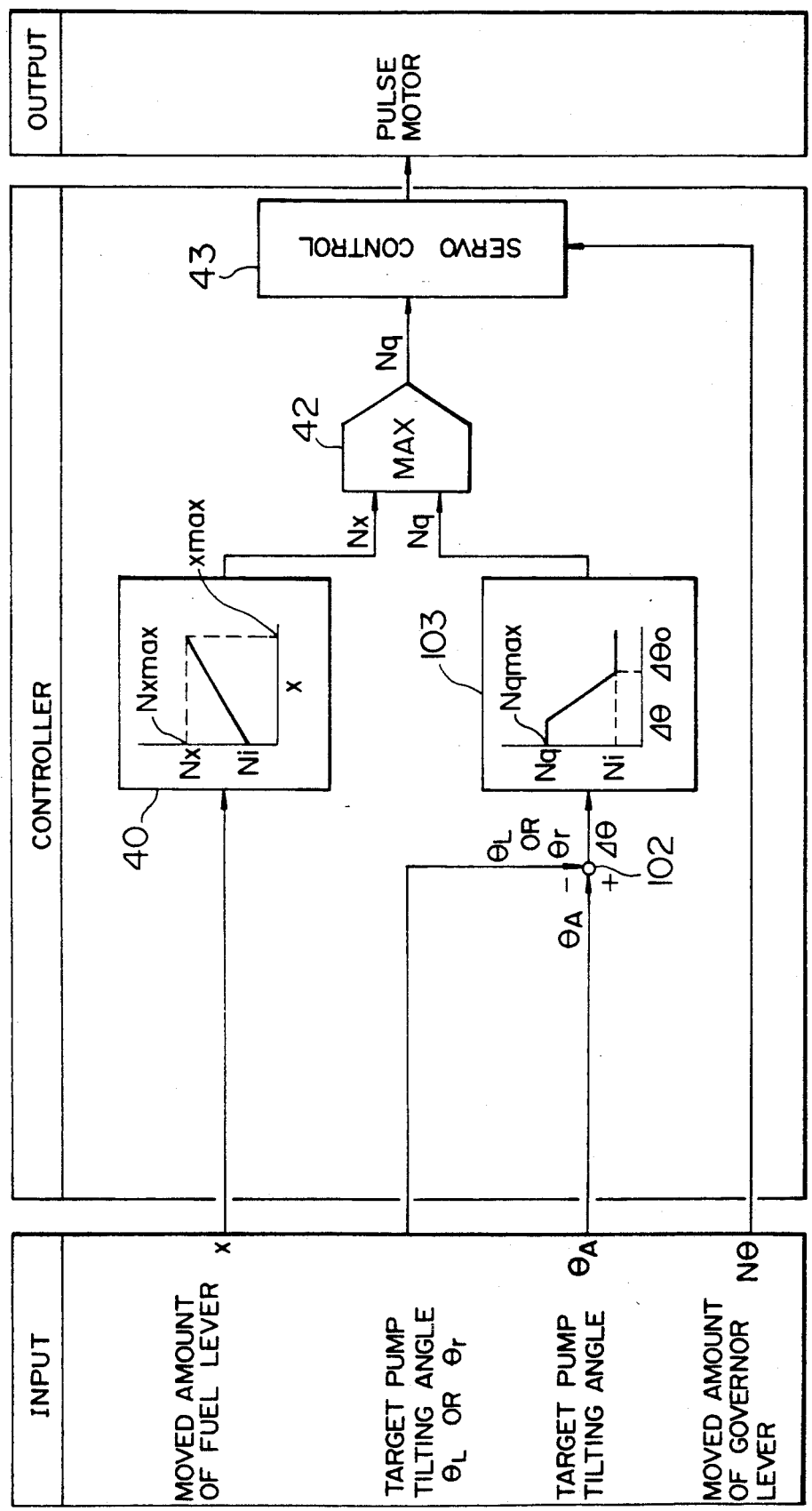

More specifically, the modified embodiment shown in FIG. 15 is arranged by applying the concept of the block 91 and the switch 92 shown in FIG. 8 to the embodiment shown in FIG. 13. The modified embodiment shown in FIG. 16 is arranged by applying the concept of the block 91 and the switch 92 shown in FIG. 8 to the embodiment shown in FIG. 14. The modified embodiment shown in FIG. 17 is arranged by applying the concept of the block 91, the switch 92 and the third arithmetic section 93 shown in FIG. 10 to the embodiment shown in FIG. 13. The modified embodiment shown in FIG. 18 is arranged by applying the concept of the block 91, the switch 92 and the third arithmetic section 93 shown in FIG. 10 to the embodiment shown in FIG. 14.

In addition to the similar advantageous effect to that of the first embodiment obtainable with use of the tilting angle difference $\Delta\theta$, those modified embodiments can also provide the similar advantageous effect to that of the second embodiment, e.g., an improvement in operability while traveling at a very slow speed, because the provision of the block 91 and the switch 92 interrupts transmission of the target revolution speed Nq when the input amount xp of the pilot reducing valve 58 is not in excess of the predetermined value xk. Further, in the modified embodiments using the third arithmetic section 93, the engine revolution speed can be controlled dependent on the trod amount of the pilot reducing valve 58, thereby providing the similar advantageous effect to that of the third embodiment, e.g., a powerful operating feeling that is sensed proportionally to the input amount of the pilot reducing valve 58.

Still Another Modification of Fourth Embodiment

In the foregoing fourth embodiment and the modified embodiments thereof, the actual tilting angle $\theta$s of the hydraulic pump 2 is detected and so is its difference from the limit value $\theta$p of the pump tilting angle. However, in the case of the pump control section being electronically arranged like the second embodiment shown in FIG. 7, the target pump tilting angle $\theta$L or $\theta$r calculated by the pump control section 74 can be used in place of the actual tilting angle $\theta$s, and the target pump tilting angle $\theta$A for the input torque limiting control can be used in place of the limit value $\theta$p of the pump tilting angle. FIG. 9 shows a block diagram of this case. The thus-modified embodiment can also provide substantially the same advantageous effect as that of the foregoing embodiments.

Fifth Embodiment

A fifth embodiment of the present invention will be described with reference to FIG. 20. In the drawing, the same components as those in FIG. 12 are designated by the same reference numerals.

In the fourth embodiment shown in FIG. 12, the LSR, i.e., the load-sensing regulator, 15 has been adopted as the practical arrangement of the pump control section for controlling the pump tilting angle such that the tilting angle of the hydraulic pump is increased with an increase in the input amount of the pilot reducing valve 58. In contrast, this embodiment employs a negative control system as pump control means.

Figure 20:
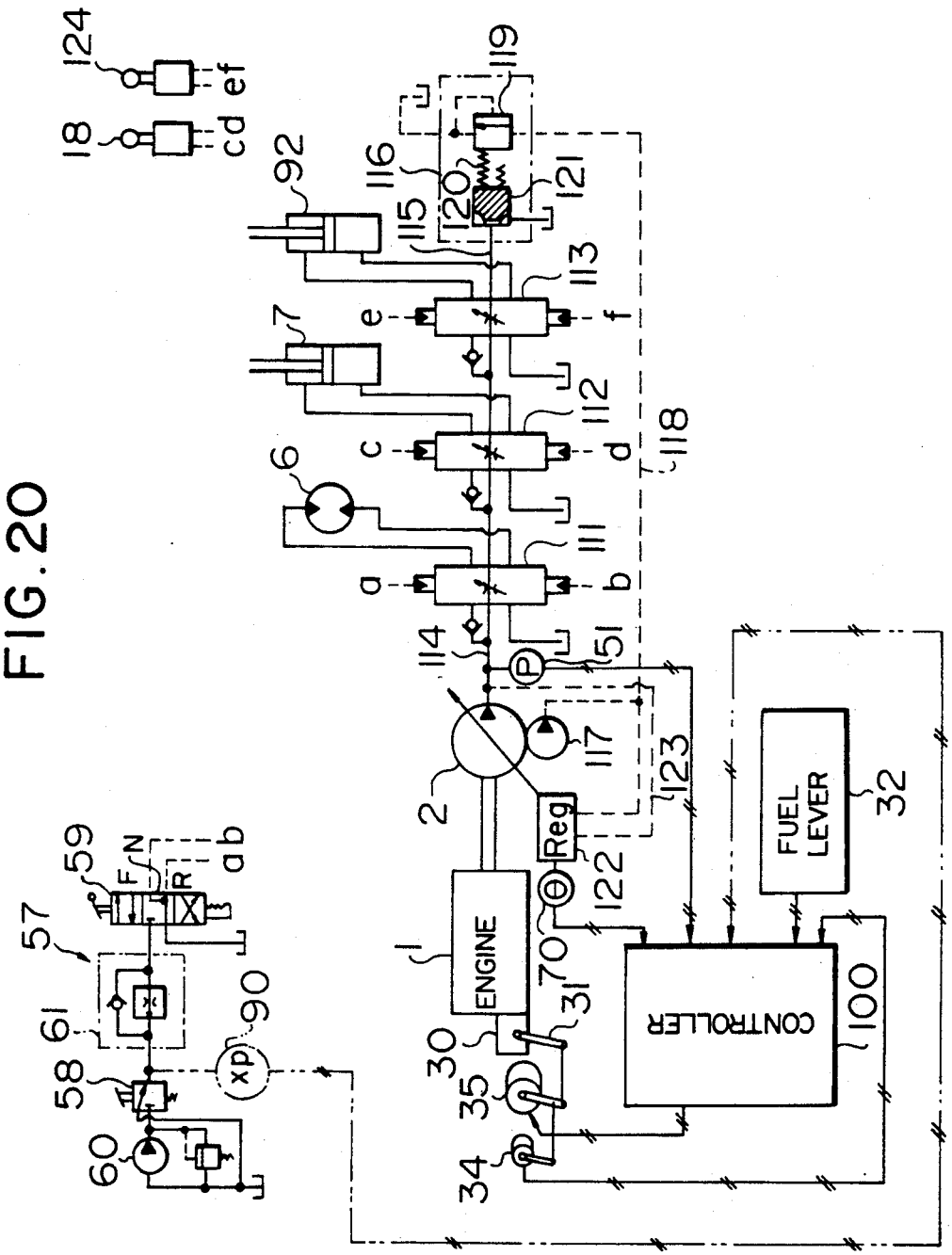
FIG. 20 is a diagrammatic view of a hydraulic drive system according to a fifth embodiment of the present invention.

More specifically, in FIG. 20, a hydraulic system of this embodiment comprises an engine 1, a hydraulic pump 2 of variable displacement type driven by the engine 1, a plurality of hydraulic actuators 6, 7, 92 driven by a hydraulic fluid delivered from the hydraulic pump 2, and control valves 111, 112, 113 for controlling the flow rates and directions of the hydraulic fluid supplied from the hydraulic pump 2 to the respective hydraulic actuators. A center bypass line 115 connected to a delivery line 114 of the hydraulic pump 2 penetrates through each of the control valves 111-113. The control valves 111-113 are each arranged such that a flow passage defined by the center bypass line 115 is fully opened at its neutral position and gradually restricted as the control valve is shifted from the neutral position to the operative position.

The negative control valve 116 is connected to the most downstream end of the center bypass line 115. The negative control valve 116 comprises a relief valve 119 for producing a negative control pressure in a pilot line 118 connected to a pilot pump 117 which is also driven by the engine 1, and a pressure adjusting valve 121 acting on a spring 120 of the relief valve 119 to adjust a setting pressure.

With the negative control valve 16 thus arranged, when the pressure is present in the center bypass line 115, the adjusting valve 121 sets the relief pressure of the relief valve 119 to a maximum and the negative control pressure of the pilot line 118 is also maintained at a maximum. As the pressure in the center bypass line 115 decreases, the reducing valve 121 makes the setting pressure of the relief valve 119 smaller to reduce the negative control pressure of the pilot line 118 correspondingly.

A tilting angle of the hydraulic pump 2 is regulated by a pump regulator 122. The pump regulator 122 includes a torque control section similar to the above-mentioned torque control regulator 80 (see FIG. 1). The delivery pressure of the hydraulic pump 2 is introduced to the torque control section via a pilot line 123 branched from the delivery line 114 of the hydraulic pump 2 for torque control, thereby to carry out the input torque limiting control such that the input torque of the hydraulic pump 2 is kept within the output torque of the engine 1, as with the torque control regulator. The pump regulator 122 also includes a negative control section. The negative control pressure produced in the valve 116 is introduced to the negative control section via the pilot line 118 for controlling the pump tilting angle such that the pump tilting angle is held minimum at the maximum negative control pressure and, as the negative control pressure decreases, the pump tilting angle is increased.

The control valve 111 is pilot-controlled by an operation unit 57 equipped with a pilot reducing valve 58, while the control valves 112, 113 are pilot-controlled by respective operation units equipped with control levers 18, 124.

In the hydraulic drive system thus arranged, the center bypass line 115, the valve 116, the pilot line 118, and the negative control section of the pump regulator 122 jointly constitute the negative control system.

When neither the pilot reducing valve 58 nor the control levers 18, 124 are operated and the control valves 111-113 are all at their netural positions, the center bypass line 115 is fully opened and the delivery pressure of the hydraulic pump 2 at the minimum tilting position is established in the center bypass line 115. Therefore, the valve 116 maintains the negative control pressure in the pilot line 118 at a maximum, as mentioned above, so that the tilting angle of the hydraulic pump 2 controlled by the negative control section of the pump regulator 122 is held at a minimum.

When any of the control means for the control valves 111-113 is operated, the associated control valve is moved from its neutral position, the center bypass line 115 is restricted in its opening by degrees correspondingly. As a result, the pressure in the center bypass line 115 is reduced and hence the setting pressure of the valve 116 is also reduced so as to gradually lower the negative control pressure in the pilot line 118. Accordingly, the pump tilting angle controlled by the negative control section of the pump regulator 122 is gradually increased.

In this way, the tilting angle of the hydraulic pump is controlled by the negative control section of the pump regulator 122 dependent on the input amount of the control means such that the pump tilting angle is increased with the input amount increasing.

An engine control section in the hydraulic drive system arranged as mentioned above has the same arrangement as that of the fourth embodiment shown in FIG. 13. It should be understood that the engine control section may be arranged in a like manner to any of the embodiments shown in FIGS. 14 through 18.

With this embodiment, therefore, while adopting the pump control means equipped with the negative control section which controls the tilting angle of the hydraulic pump dependent on the input amount of the control means such that the pump tilting angle is increased with the input amount increasing, it becomes possible to automatically raise up the engine revolution speed when the pump delivery rate is about to get into saturation, thereby providing the similar advantageous effect to that of the first embodiment.

Incidentally, the pump control means for controlling the tilting angle of the hydraulic pump dependent on the input amount of the control means such that the pump tilting angle is increased with the input amount increasing, is not limited to the LSR or the negative control system as mentioned above. Namely, the similar advantageous effect can also be provided in cases where other suitable means, such as a so-called externally compensating control system in which in an operating technique of transmitting the input amount of the control means to the control valve via a rod, the pump tilting angle is controlled following movement of the rod, for example, are adopted.

Sixth Embodiment

A sixth embodiment of the present invention will be described with reference to FIGS. 21 through 31.

Arrangement

Figure 21:
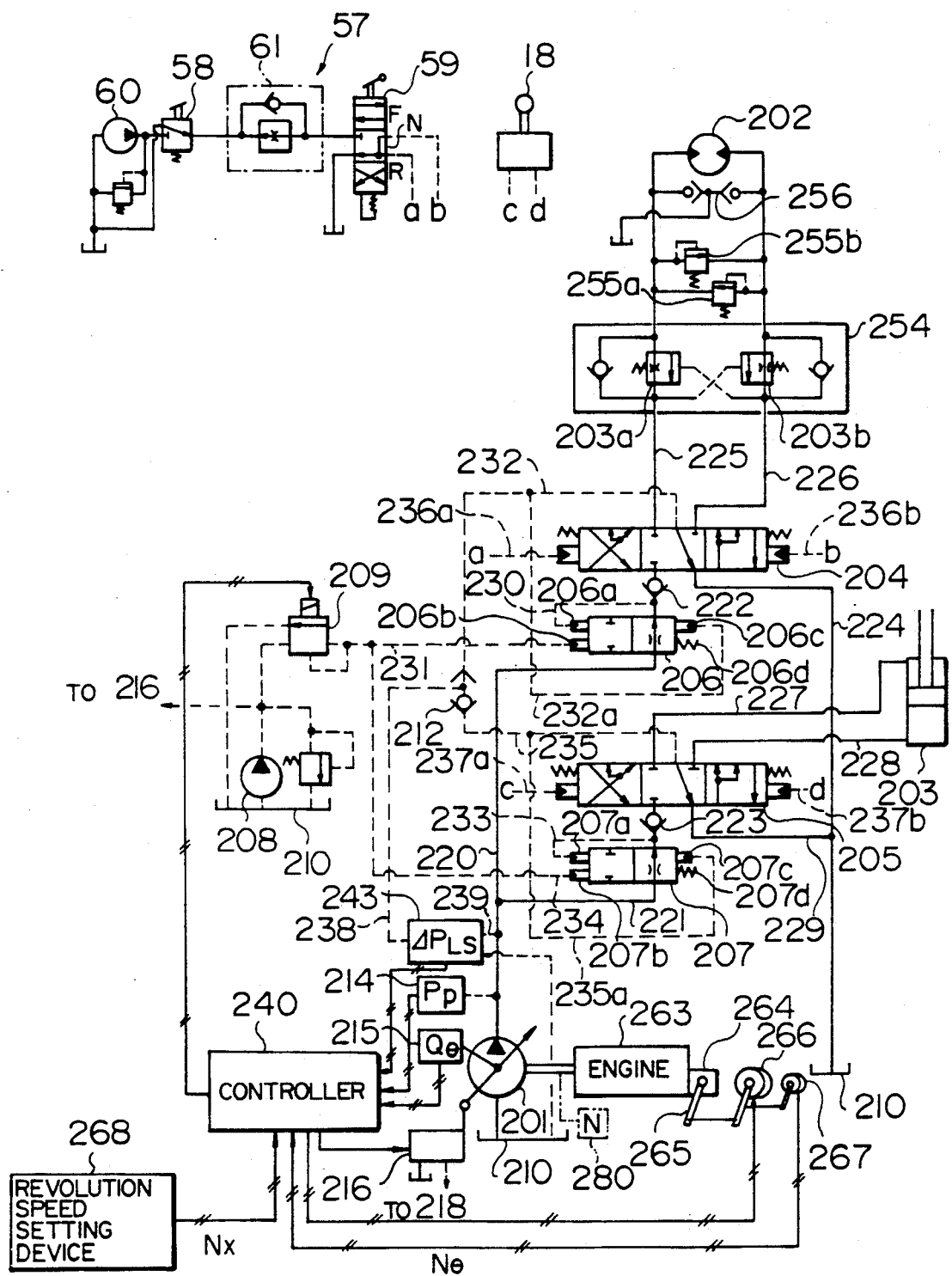
FIG. 21 is a diagrammatic view of a hydraulic drive system according to a sixth embodiment of the present invention.

In FIG. 21, a hydraulic drive system of this embodiment comprises a variable displacement hydraulic pump 201 of swash plate type, for example, hydraulic actuators 202, 203 driven by a hydraulic fluid from the hydraulic pump 201, a control valve 204 and a pressure compensating valve 206 both disposed between the hydraulic pump 201 and the actuator 202 for controlling the flow rate and direction of the hydraulic fluid supplied from the hydraulic pump 201 to the actuator 202, and a control valve 205 and a pressure compensating valve 207 both disposed between the hydraulic pump 201 and the actuator 203 for controlling the flow rate and direction of the hydraulic fluid supplied from the hydraulic pump 201 to the actuator 203.

In this embodiment, the hydraulic drive system is mounted on the hydraulic excavator of wheel type shown in FIG. 2, as with the first embodiment. Specifically, the actuator 202 is a travel motor for driving rear wheels 50, for example, and the actuator 203 is a boom cylinder for driving the boom 53, for example.

The pressure compensating valve 206 is connected at its inlet side to the hydraulic pump 201 via a delivery line 220, and at its outlet side to the control valve 204 via a check valve 222. The control valve 204 is connected at its inlet side to the pressure compensating valve 206 and to a reservoir or tank 210 via a return line 224, and at its outlet side to the actuator 202 via main lines 225, 226. With the actuator 202 being the travel motor, a counterbalance valve 254, relief valves 255a, 255b and a make-up circuit 256 are connected to the main lines 225, 226.

The pressure compensating valve 207 is connected at its inlet side to the hydraulic pump 201 via a line 221 and the delivery line 220, and at its outlet side to the control valve 205 via a check valve 223. The control valve 205 is connected at its inlet side to the pressure compensating valve 207 and to the reservoir 210 via a return line 229, and at its outlet side to the actuator 203 via main lines 227, 228.

The pressure compensating valve 206 is of the hydraulic pilot operated type comprising two pilot pressure chambers 206a, 206b acting in the valve-closing direction, and one pilot chamber 206c disposed in opposite relation to the chambers 206a, 206b and acting in the valve-opening direction. An inlet pressure of the control valve 204 is applied to one 206a of the two pilot pressure chambers 206a, 206b acting in the valve-closing direction via a line 230, a control pressure from a solenoid proportional valve 209 described later is applied to the other pressure chamber 206b via a line 231, and a pressure between the control 204 and the actuator 202 described later in detail is applied to the pilot pressure chamber 206c acting in the valve-opening direction via a line 232a. The pressure compensating valve 206 is also provided with a spring 206d urging the valve 206 in the valve-opening direction at all times.

The pressure compensating valve 207 is constructed in a like manner. Specifically, the pressure compensating valve 207 is of the hydraulic pilot operated type comprising two pilot pressure chambers 207a, 207b acting in the valve-closing direction, and one pilot chamber 207c disposed in opposite relation to the chambers 207a, 207b and acting in the valve-opening direction. An inlet pressure of the control valve 205 is applied to one 207a of the two pilot pressure chambers 207a, 207b acting in the valve-closing direction via a line 233, the output pressure of the solenoid proportional valve 209 is applied to the other pressure chamber 207b via a line 234, and a pressure between the control 205 described later in detail and the actuator 203 is applied to the pilot pressure chamber 207c acting in the valve-opening direction via a line 235a. The pressure compensating valve 207 is also provided with a spring 207d urging the valve 207 in the valve-opening direction at all times.

Operation of the pressure compensating valve 206 will now be described briefly. When the control pressure from the solenoid proportional valve 209 is 0 (zero), the inlet pressure of the control valve 204 introduced to the pilot chamber 206a via the line 230 acts on the pressure compensating valve 206 in the valve-closing direction, while the outlet pressure of the control valve 204 introduced to the pilot chamber 206c via the line 232a and biasing force of the spring 206d act on the valve 206 in the opposite direction. Therefore, the pressure compensating valve 206 controls the difference pressure between the inlet and outlet pressures of the control valve 204 so as to become constant at a level corresponding to the biasing force of the spring 206d. As a result, the flow rate of the hydraulic fluid passing through the control valve 204 is subjected to the pressure compensating control such that the flow rate remains unchanged irrespective of pressure changes in the main lines 225 or 226 of the hydraulic actuator 202, supposing the stroke amount to be held constant. The pressure compensating valve 207 also operates in a like manner.

When the control pressure is output from the solenoid proportional valve 209, that pressure is applied to the pressure chambers 206b, 207b via the lines 231, 234 in the direction to counter the biasing forces of the opposite springs 206d, 207d. The differential pressures between the inlet and outlet pressures of the control valves 204, 205 are thereby controlled to be made smaller proportionally to a rise in the control pressure. As a result, the flow rates of the hydraulic fluid passing through the control valves 204, 205 are reduced to carry out the total consumable flow rate compensating control in which the total flow rate of the hydraulic fluid consumed by the actuators 202, 203 is limited without changing the distribution ratio of the hydraulic fluid to both the actuators.

The control valves 204, 205 are of the hydraulic pilot operated type in the illustrated embodiment and have pilot chambers connected to pilot lines 236a, 236b and 237a, 237b so that they are controlled with pilot pressures transmitted through the respective pilot lines.

The pilot lines 236a, 236b are connected to a pilot circuit 57 for traveling. The pilot circuit 57 for traveling is arranged similarly to the embodiment shown in FIG. 1 and hence not explained here. The pilot lines 237a, 237b are also connected to an operation unit having a control lever 18, as with the embodiment shown in FIG. 1.

The control valve 204 and the pressure compensating valve 206 are combined together to constitute a single pressure compensated flow control valve. Likewise, the control valve 205 and the pressure compensating valve 207 are combined together to constitute a single pressure compensated flow control valve.

The pilot lines 232, 235 for detecting load pressures of the hydraulic actuators 202, 203 are connected to the control valves 204, 205 on one side, respectively, and to a line 238 via a higher pressure select valve 212 on the other side. The load pressure on the higher pressure side (referred to as a maximum load pressure hereinafter) selected by the higher pressure select valve 212 is introduced to a differential pressure sensor 243 via the line 238. The delivery pressure of the hydraulic pump 201 is also introduced to the differential pressure sensor 243 via a line 239. The differential pressure sensor 243 detects a differential pressure $\Delta PLS$ between the delivery pressure of the hydraulic pump 201 and the maximum load pressure, and outputs a differential pressure signal.

Connected to the delivery line 220 of the hydraulic pump 201 is a pressure sensor 214 for detecting the delivery pressure of the hydraulic pump 201 and outputting a pressure signal Pp. The hydraulic pump 201 is provided with a tilting angle sensor 215 for detecting a tilting angle of a swash plate of the hydraulic pump 201 and outputting a tilting angle signal $Q\theta$.

The delivery rate of the hydraulic pump 201 is controlled by a tilting angle control device 216 in interlock relation with its swash plate 216b. The tilting angle control device 216 is arranged into a control device of electro-hydraulic servo type as shown in FIG. 22 by way of example.

More specifically, the tilting angle control device 216 has a servo piston 216b for driving the swash plate 216a, the servo piston 216b being housed in a servo cylinder 216c. A cylinder chamber of the servo cylinder 216c is divided into a left-hand chamber 216d and a right-hand chamber 216e, the left-hand chamber 216d being formed to have the cross-sectional area D larger than the cross-sectional area d of the right-hand chamber 216e.

The left-hand chamber 216d and the right-hand chamber 216e of the servo cylinder 216c are connected to each other via lines 216f, 216i. A pilot pump 208 is connected to the line 216i, a solenoid valve 216 is interposed between the line 216f and the line 216i, and the line 216f is communicated with a reservoir or tank 210 via a line 216j including a solenoid valve 216h. The solenoid valves 216g, 216h are each a normally closed valve (with a function of returning to its closed state when deenergized), and energized (turned on) by a control signal from a controller 240 described later for shifting in position.

Figure 22:
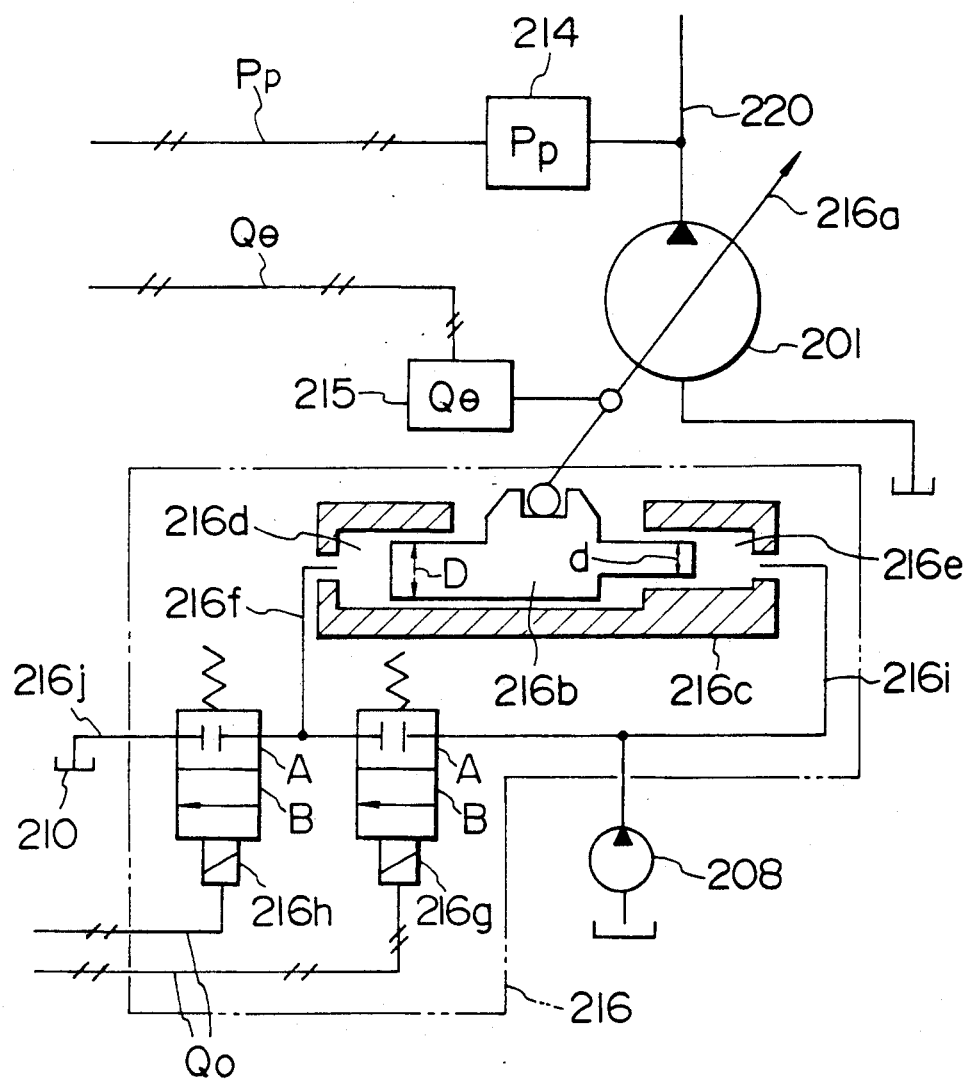
FIG. 22 is a view showing the configuration of a tilting angle control device in the pump control section.

When the solenoid valve 216g is energized (turned on) for switching to a shift position B, the left-hand chamber 216d of the servo cylinder 216c is communicated with the pilot pump 208 and the servo piston 216b is moved rightward as viewed on FIG. 22 due to the area difference between the left-hand chamber 216d and the right-hand chamber 216e. The tilting angle of the swash plate 216a is thereby made larger to increase the pump delivery rate. When the solenoid valves 216g and 216h are both deenergized (turned off) to return to their shift positions A, the fluid passage communicating with the left-hand chamber 216a is interrupted and the servo piston 216b is kept in a still or rest state at the position. This holds the tilting angle of the swash plate 216a and hence the pump delivery rate constant. When the solenoid valve 216h is energized (turned on) for switching to its shift position B, the left-hand chamber 216d is communicated with the reservoir 210 to reduce the pressure in the left-hand chamber 216d, whereupon the servo piston 216b is moved leftward in FIG. 22 with the pressure in the right-hand chamber 216e. This reduces the tilting angle of the swash plate 216a and hence the pump delivery rate. In this way, the pump tilting angle is controlled to be coincident with a tilting angle command value Qo calculated by the controller 240 as described later, and the pump delivery rate is also controlled correspondingly.

Returning to FIG. 21 again, the hydraulic pump 201 is driven by an engine 263. The engine 263 is preferably a diesel engine including a fuel injector 264 with an allspeed governor, the fuel injector 264 having a governor lever 265. The injected amount of fuel is adjusted by turning the governor lever 265. The governor lever 265 is driven by a pulse motor 266. The rotated amount of the pulse motor 266, i.e., the moved amount of the governor lever 265, is detected as a revolution speed of the engine 263 by a potentiometer 267 which outputs a revolution speed signal $N\theta$.

The engine 263 is also provided with a revolution speed setting device 268 which includes a fuel lever manually operated by the operator for setting a target revolution speed of the engine 263, and outputs a target revolution speed signal Nx. The revolution speed setting device 268 is preferably arranged such that a maximum value of the target revolution speed set by the device 268 is less than the highest revolution speed of the engine 263. Note that the fuel lever may be replaced by other control means of dial type (rotary potentiometer) or push button type (up-and-down switch), for example.

The pressure signal Pp from the pressure sensor 214, the tilting angle signal $Q\theta$ from the tilting angle sensor 215, the differential pressure signal ΔPLS from the differential pressure sensor 243, the revolution speed signal Nθ from the potentiometer 267, and the target revolution speed signal Nx from the revolution speed setting device 268 are all input to the controller 240. Based on these input signals, the controller 240 creates a control signal for the hydraulic pump 201, a control signal for the engine 263, and control signals for the pressure compensating valves 206, 207 for outputting them to the tilting angle control device 216, the pulse motor 266 and the solenoid proportional valve 209.

Figure 23:
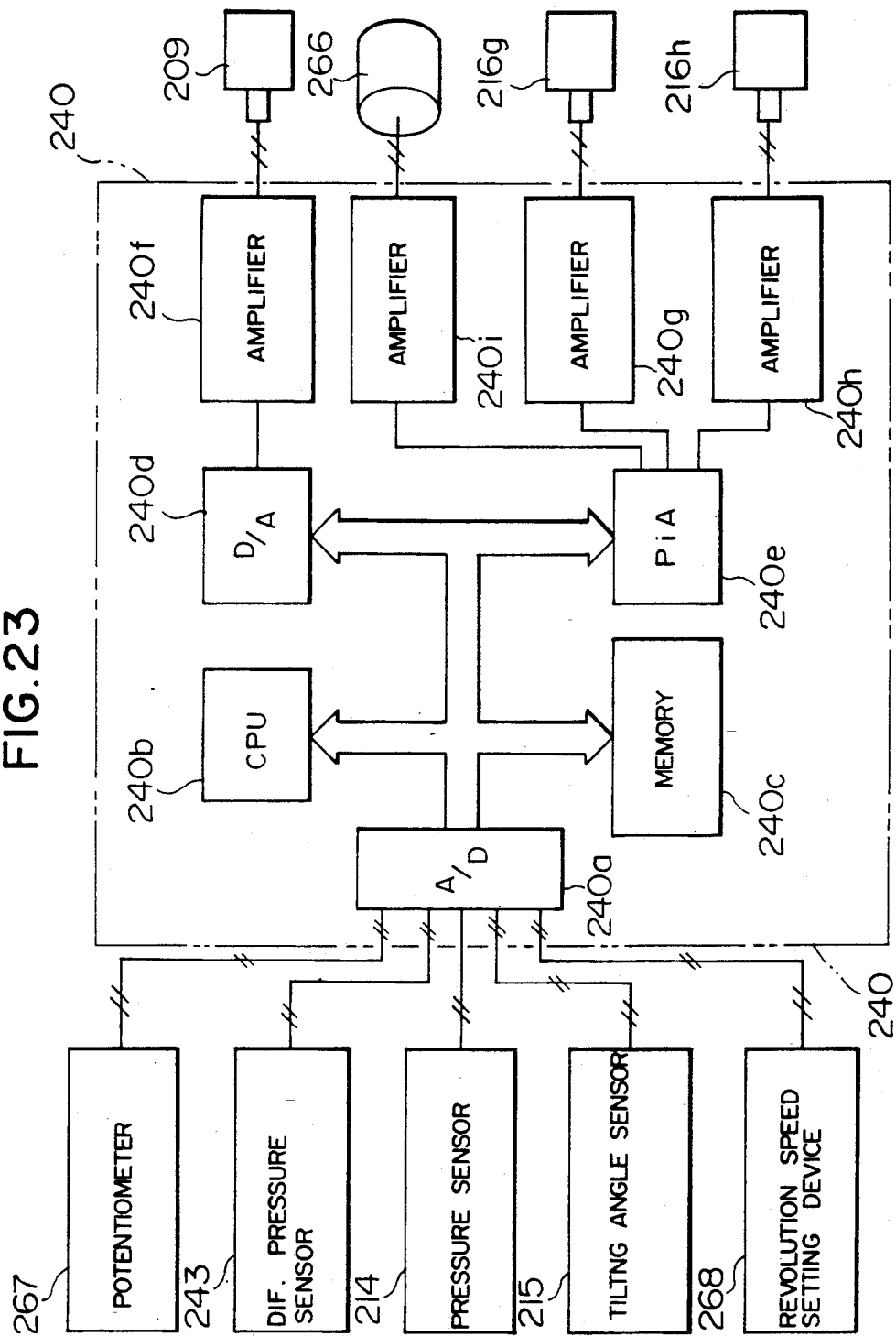
FIG. 23 is a block diagram showing the configuration of a controller.

The controller 240 comprises a microcomputer and has the configuration as outlined in FIG. 23. More specifically, the controller 240 comprises an A/D converter 240a for converting the pressure signal Pp, the tilting angle signal Qθ, the differential pressure signal ΔPLS, the revolution speed signal Nθ, and the target revolution speed signal Nx to respective digital signals, a central processing unit (CPU) 240b, a memory 240c for storing a program of the control sequence, a D/A converter 240d for outputting, an I/O interface 240e for outputting, an amplifier 240f connected to the solenoid proportional valve 209, amplifiers 240g, 240h respectively connected to the solenoid valves 216g, 216h, and an amplifier 240i connected to the pulse motor 266.

Next, details of the operation procedure performed by the controller 240 will be explained with reference to a flowchart shown in FIG. 24.

First, in step S100, the controller 240 reads and stores the pressure signal Pp from the pressure sensor 214, the tilting angle signal Qθ from the tilting angle sensor 215, the differential pressure signal ΔPLS from the differential pressure sensor 243, the revolution speed signal Nθ from the potentiometer 267, and the target revolution speed signal Nx from the revolution speed setting device 268.

Figure 25:
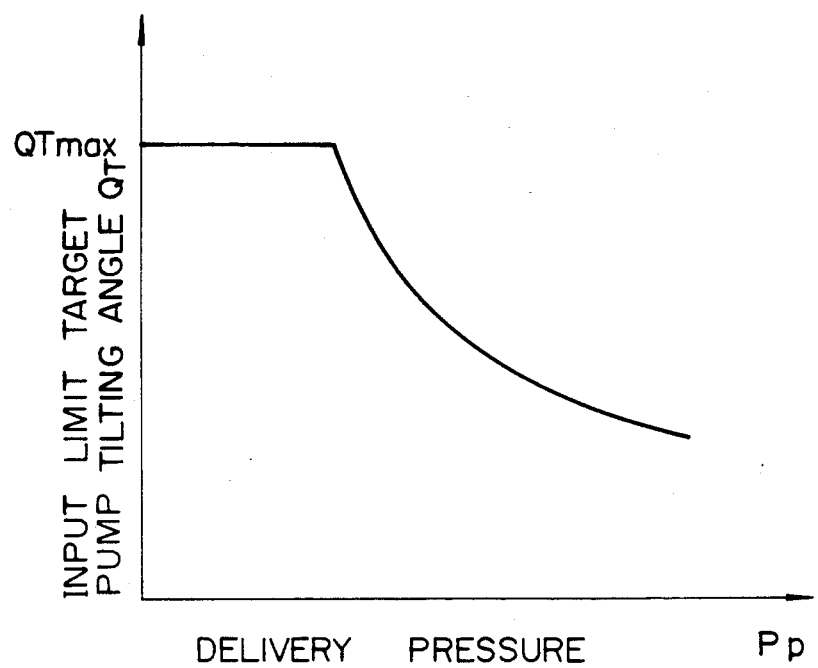
FIG. 25 is a graph showing an input torque limiting function.

Then, step S101 determines the target tilting angle for the input torque limiting control, i.e., the limit target tilting angle QT, from the pressure signal Pp and an input torque limiting function f(Pp) stored in advance. FIG. 25 shows the input torque limiting function. In FIG. 25, the horizontal axis represents the delivery pressure P and the vertical axis represents the limit target tilting angle QT based on the input torque limiting function f(Pp). The input torque of the hydraulic pump 201 is proportional to the product of the tilting angle Qθ of the swash plate (i.e., the displacement volume) and the delivery pressure Pp. Accordingly, the input torque limiting function f(Pp) is given by a hyperbolic curve or an approximate hyperbolic curve. That is to say, f(Pp) is a function represented by the following equation.

$$QT = \kappa \frac{TP}{Pp} \quad (1)$$

where
TP: limited input torque
κ: proportional constant

Thus, the limit target tilting angle QT can be determined from the input torque limiting function f(Pp) and the delivery pressure Pp.

Figure 26:
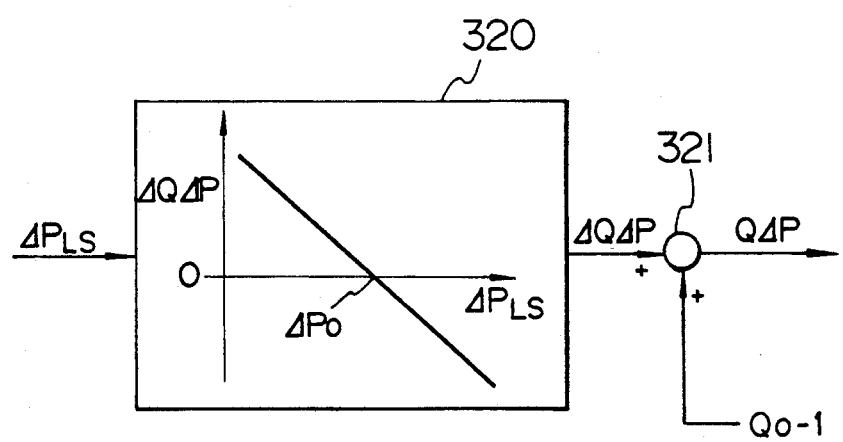
FIG. 26 is a block diagram showing the manner of determining a differential pressure target tilting angle.

Returning to FIG. 24 again, next step S102 determines the target tilting angle for holding constant the differential pressure between the delivery pressure of the hydraulic pump 201 and the maximum load pressure of the actuators 202, 203, namely, the differential pressure target tilting angle QΔp, from the differential pressure signal ΔPLS. One example of how to determine QΔp will now be explained with reference to FIG. 26. FIG. 26 is a block diagram showing the manner of determining the differential pressure target tilting angle QΔp from the differential pressure signal ΔLS of the differential pressure sensor 243. In this example, the differential pressure target tilting angle QΔp is determined based on the following equation:

$$\begin{aligned} Q\Delta p &= g(\Delta PLS) = \Sigma KI(\Delta Po - \Delta PLS) \\ &= KI(\Delta Po - \Delta PLS) + Qo - 1 \\ &= \Delta Q\Delta p + Qo - 1 \end{aligned} \quad (2)$$

where
KI: integral gain
ΔPo: target differential pressure
Qo−1: tilting angle command value issued in the last control cycle
ΔQΔp: increment value of differential pressure tilting angle per one control cycle time In the above example, the differential pressure target tilting angle QΔp is calculated from the deviation between the target differential pressure ΔPo and the actual differential pressure in accordance with the integral control process. FIG. 26 shows this process in the form of a block diagram. More specifically, a block 320 calculates KI(ΔPo−ΔPLS) from the differential pressure ΔPLS to determine an increment value ΔQΔp of the differential pressure target tilting angle per one control cycle time. A block 321 adds ΔQΔp and the tilting angle command value Qo−1 issued in the last or preceding control cycle to obtain the sum of Equation (2).

Although in this embodiment QΔp is determined using the integral control process applied to ΔPo−ΔPLS, it may be determined using others such as the proportional control process represented by;

$$Q\Delta p = Kp(\Delta Po - \Delta PLS) \quad (3)$$

where Kp: proportional gain or the proportional/integral process given by adding Equations (2) and (3), for example.

Returning to FIG. 24 once again, step S103 determines the difference ΔQ between the limit target tilting angle QT and the differential pressure target tilting angle QΔp respectively determined in steps S101, S102. In next step S104, it is judged whether the difference ΔQ is positive or negative. If the difference is positive, the control flow goes to step S105 where QT is selected as the tilting angle target value Qo. If the difference is negative, it goes to step S106 where QΔp is selected as the tilting angle target value Qo. In other words, the lesser one of the differential pressure target tilting angle QΔp and the limit target tilting angle QT is selected as the tilting angle target value Qo so that the tilting angle target value Qo will not exceed the limit target tilting angle QT determined by the input torque limiting function f(Pp).

Figure 27:
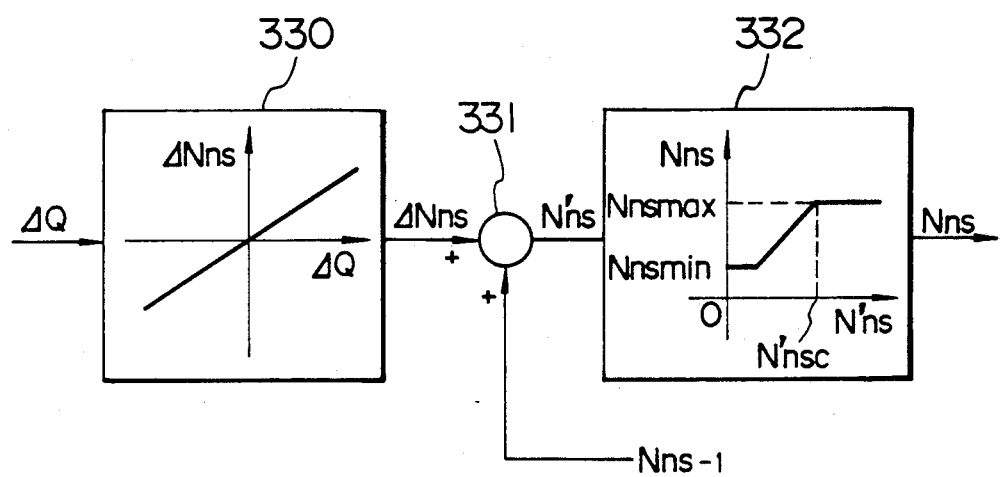
FIG. 27 is a block diagram showing the manner of determining a target revolution speed from a target tilting angle difference.

The control flow then goes to step S107. In step S107, the target revolution speed Nns of the engine 263 is calculated from the difference ΔQ determined in step S103. One example of how to determine Nns will now be explained with reference to FIG. 27. FIG. 27 is a block diagram showing the manner of calculating the target revolution speed Nns from the difference ΔQ. In this example, the target revolution speed Nns is determined using the integral control process based on the following equation:

$$Nns = h(\Delta Q) = \Sigma KIns^* \Delta Q \quad (4)$$
$$= KIns^* \Delta Q + Nns - 1$$
$$= \Delta Nns + Nns - 1$$

where
  KIns: integral gain
  Nns−1: target revolution speed Nns issued in the last control cycle
  ΔNns: increment value of target revolution speed per one control cycle time More specifically, in FIG. 27, a block 330 first determines an increment value ΔNns of the target revolution speed per one control cycle time, i.e., KIns*ΔQ from the difference ΔQ determined in step S103. Then, an adder 331 adds the increment value ΔNns and the target revolution speed Nns−1 issued in the last control cycle to determine an intermediate value N'ns. The intermediate value N'ns is applied to a limiter 332 for determining the target revolution speed Nns such that it sets Nns=Nnsmin if N'ns<0 holds, outputs the target revolution speed Nns which is increased proportionally to an increase in N'ns if N'ns≧0 holds, and sets Nns=Nnsmax if N'ns≧N'nsc holds. Here, the maximum value Nnsmax of the target revolution number Nns is set nearly equal to the highest revolution speed available with the engine 263 and larger than the maximum value Nxmax of the aforesaid target revolution speed Nx.

It is to be noted that although in this embodiment the target revolution speed Nns is determined in accordance with the integral control process, the relationship between Nns and ΔQ may be determined in accordance with the proportional control process or the proportional/integral control process as with the above case of calculating the differential pressure target tilting angle QΔp.

Then, step S108 judges which one of the two target revolution speeds Nns and Nx is larger. If Nns≧Nx holds, the control flow goes to step S109 where Nns is selected as the final target revolution speed Ny. If Nns<Nx holds, it goes to step S110 where Nx is selected as the revolution speed command value Ny. That is, the larger one of Nns and Nx is selected.

Figure 28:
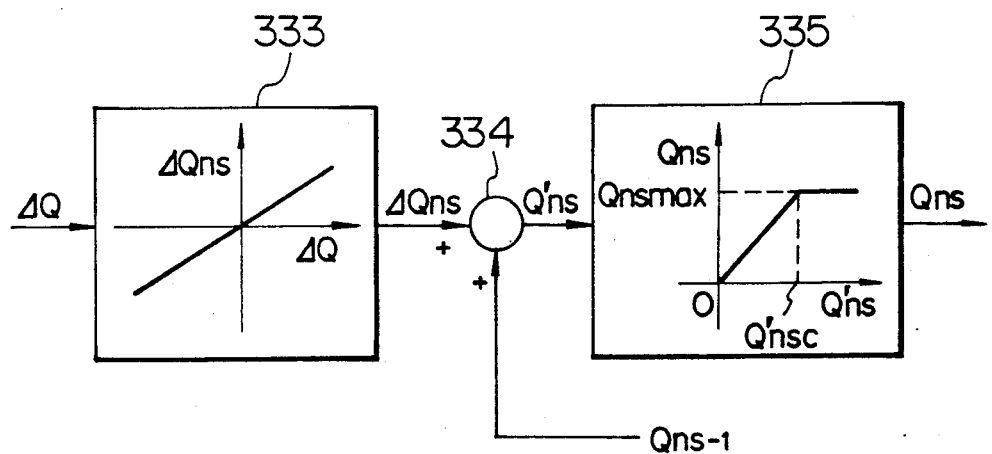
FIG. 28 is a block diagram showing the manner of determining a modification value for total consumable rate compensating control.

Then, the control flow goes to step S111. In step S111, the value of a control signal for controlling the solenoid proportional valve 209, i.e., the total consumable flow modification value Qns, is calculated from the difference ΔQ determined in step S103. One example of how to determine Qns will now be explained with reference to FIG. 28. FIG. 28 shows the manner of calculating the total consumable flow modification value Qns from the difference ΔQ in the form of a block diagram. As will be seen from FIG. 28, the modification value Qns is determined in accordance with the integral control process by employing a block 333, an adder 334 and a limiter 335 in this embodiment, as with the case of the target revolution speed Nns. The modification value Qns in this case may also be determined in accordance with the proportional control process or the proportional/integral control process.

Returning to FIG. 24 again, step S112 creates a control signal from both the tilting angle signal Qθ as an output of the tilting angle sensor 215 and the tilting angle command value Qo of the hydraulic pump 201 determined in step S105 or S106, and outputs the control signal to the tilting angle control device 216 via the I/O interface 240e and the amplifiers 240g, 240h of the controller 240 shown in FIG. 23, for controlling the pump tilting angle Qθ to be coincident with the command value Qo.

Figure 29:
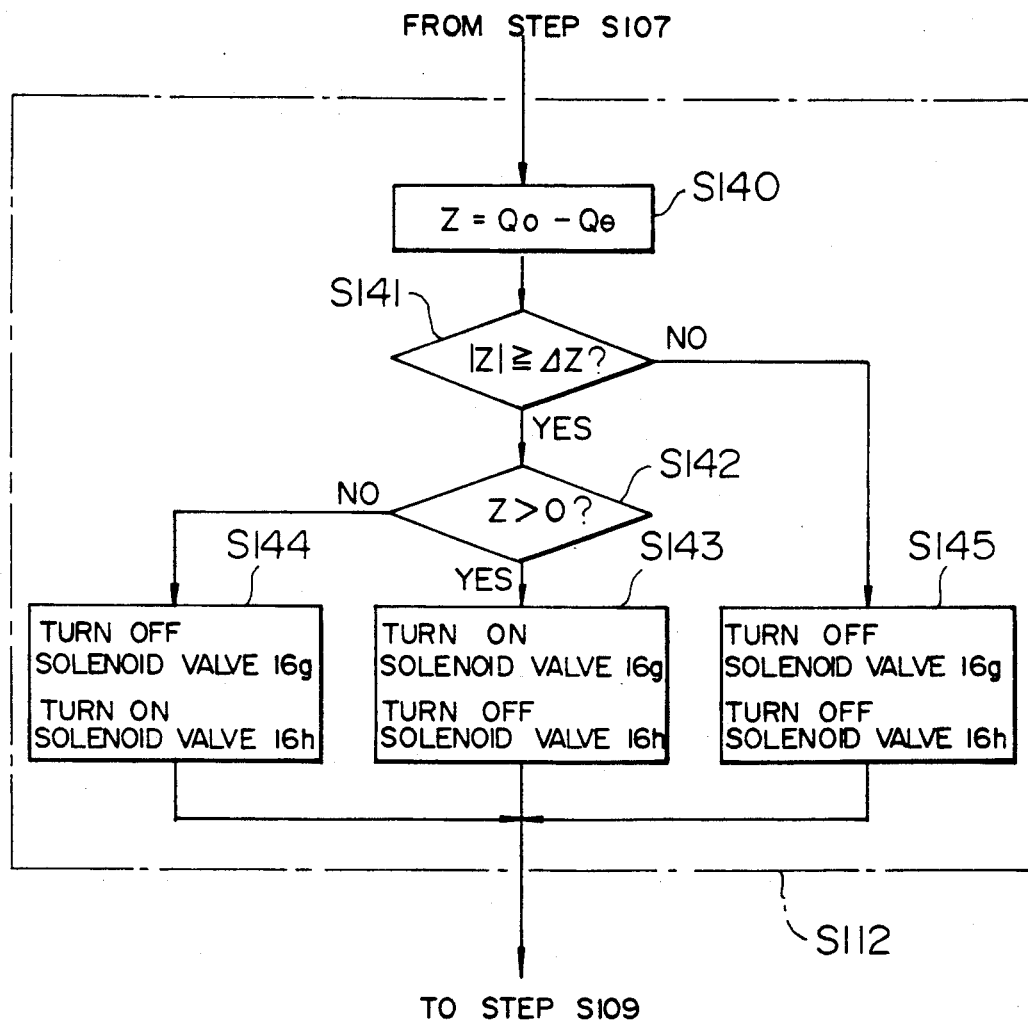
FIG. 29 is a flowchart of the sequence for controlling the tilting angle control device from both a tilting angle command value and an actual tilting angle signal.

FIG. 29 is a flowchart showing the processing sequence carried out in above step S112. First, step S140 calculates the equation of Z=Qo−Qθ to determine a deviation Z between the tilting angle command value Qo and the actual tilting angle Qθ. In next step S141, an absolute value of the deviation Z is compared with a value ΔZ preset for defining a dead zone to judge which one is larger. If the absolute value of the deviation Z is equal to or larger than the setting value ΔZ, the control flow goes to step S142 to judge whether the deviation Z is positive or negative. Here, if the deviation Z is positive, it goes to step S143 where a control signal is output to turn on the solenoid valve 216g and turn off the solenoid valve 216h of the tilting angle control device 216. The tilting angle of the hydraulic pump 201 is thereby increased so that the actual tilting angle Qθ is controlled to be coincident with the command value Qo as mentioned above. If the deviation Z is negative, it goes to step S144 where a control signal is output to turn off the solenoid valve 216g and turn on the solenoid valve 216h of the tilting angle control device 216. The tilting angle of the hydraulic pump 201 is thereby decreased so that the actual tilting angle Qθ is controlled to be coincident with the command value Qo.

If the absolute value of the deviation Z is smaller than the setting value ΔZ in step S141, the control flow goes to step S145 for turning off both the solenoid valves 216g and 216h. The tilting angle of the hydraulic pump 201 is thereby controlled to be constant.

As a result of that the tilting angle of the hydraulic pump 201 is controlled as explained before, when the differential pressure target tilting angle QΔp is selected as the command value Qo in step S106, the tilting angle of the hydraulic pump 201 is controlled to become the differential pressure target tilting angle QΔp for implementing the load sensing control so as to hold the differential pressure between the pump delivery pressure and the maximum load pressure constant. On the other hand, when the limit target tilting angle QT is selected as the command value Qo in step S105, the tilting angle is subjected to the input torque limiting control so that it will not exceed the limit target tilting angle QT.

Returning to FIG. 24 again, step S113 creates a control signal from the actual revolution speed signal Nθ as an output of the potentiometer 257 and the revolution speed command value Ny determined in step S109 or S110, and outputs the control signal to the pulse motor 266 via the I/O interface 240e and the amplifiers 240i of the controller 240 shown in FIG. 23, for controlling the actual revolution speed Nθ to be coincident with the revolution speed command value Ny.

Figure 30:
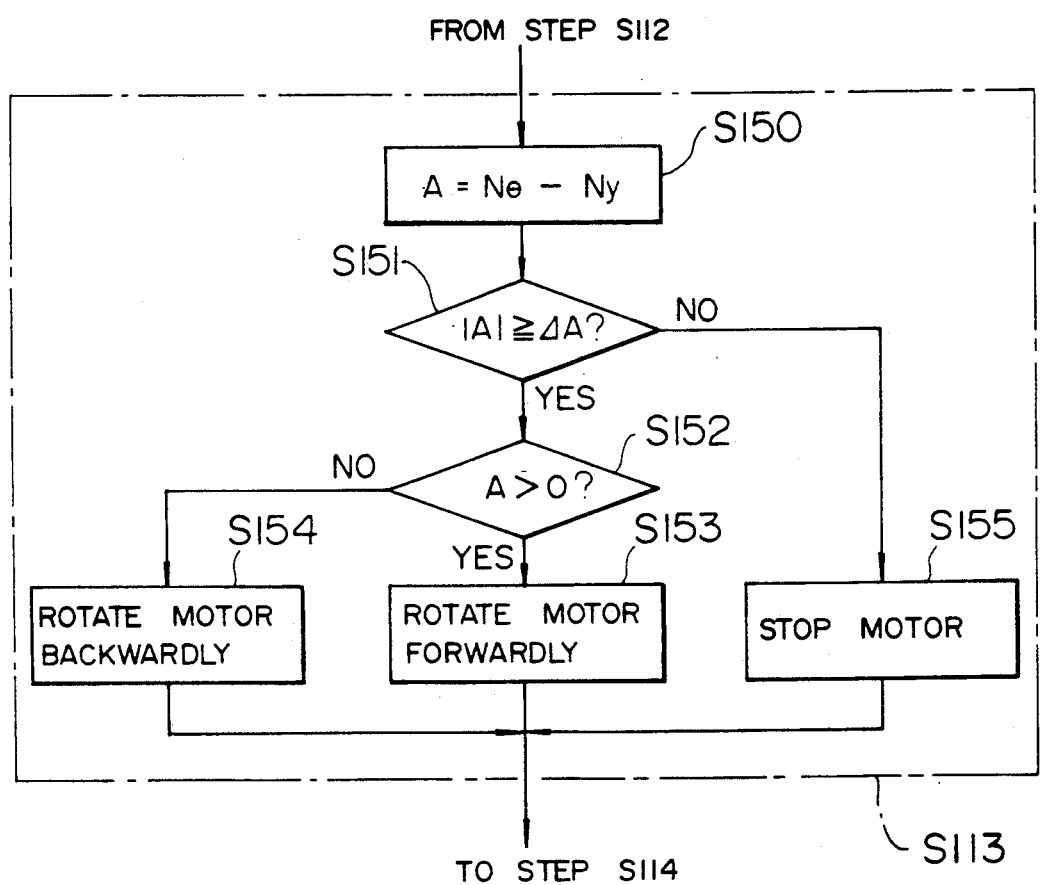
FIG. 30 is a flowchart of the sequence for controlling a pulse motor based on both a revolution speed command value and an actual revolution speed signal.

FIG. 30 is a flowchart showing the processing sequence carried out in above step S113. First, step S150 calculates the equation of A=Nθ−Ny to determine a deviation A between the actual revolution speed Nθ and the revolution command value Ny. In next step S151, an absolute value of the deviation A is compared with a value ΔA preset for defining a dead zone to judge which one is larger. If the absolute value of the deviation A is equal to or larger than the setting value ΔA, the control flow goes to step S152 to judge whether the deviation A is positive or negative. Here, if the deviation A is positive, it goes to step S153 where a control signal is output to drive the pulse motor 266 forwardly. The injected amount of fuel from the fuel injector 264 is thereby increased so that the actual revolution speed Nθ is controlled to be coincident with the revolution speed command value Ny. If the deviation A is negative, it goes to step S154 where a control signal is output to drive the pulse motor backwardly. The injected amount of fuel from the fuel injector 264 is thereby decreased so that the actual revolution speed Nθ is controlled to be coincident with the revolution speed command value Ny.

If the absolute value of the deviation A is smaller than the setting value ΔA in step S151, the control flow goes to step S155 for stopping issuance of the control signal. The rotation of the pulse motor 266 is thereby stopped to hold the engine revolution speed constant.

Returning to FIG. 24 again, in step S114, the modification value Qns is output as a control signal to the solenoid proportional valve 209 via the D/A converter 240 and the amplifier 240f of the controller 240 shown in FIG. 23, for controlling the pressure compensating valves 206, 207 shown in FIG. 21. As a result, when the differential pressure target tilting angle QΔp is smaller than the limit target tilting angle QT, the modification value Qns is set to 0 in the block 335 (FIG. 28) of step S111 so that the pressure compensating valves 206, 207 perform the pressure compensating control as set by the springs 206d, 207d, respectively. When the differential pressure target tilting angle QΔp becomes larger than the limit target tilting angle QT, the modification value Qns is set in step S111 to increase proportionally to an increase in the difference ΔQ with Qnsmax being as its maximum value, so that the springs 206d, 207d of the pressure compensating valves 206, 207 are lessened in their control forces acting in the valve-opening direction. The setting differential pressures of the pressure compensating valves 206, 207 are thereby reduced to achieve the total consumable flow modifying control.

Figure 31:
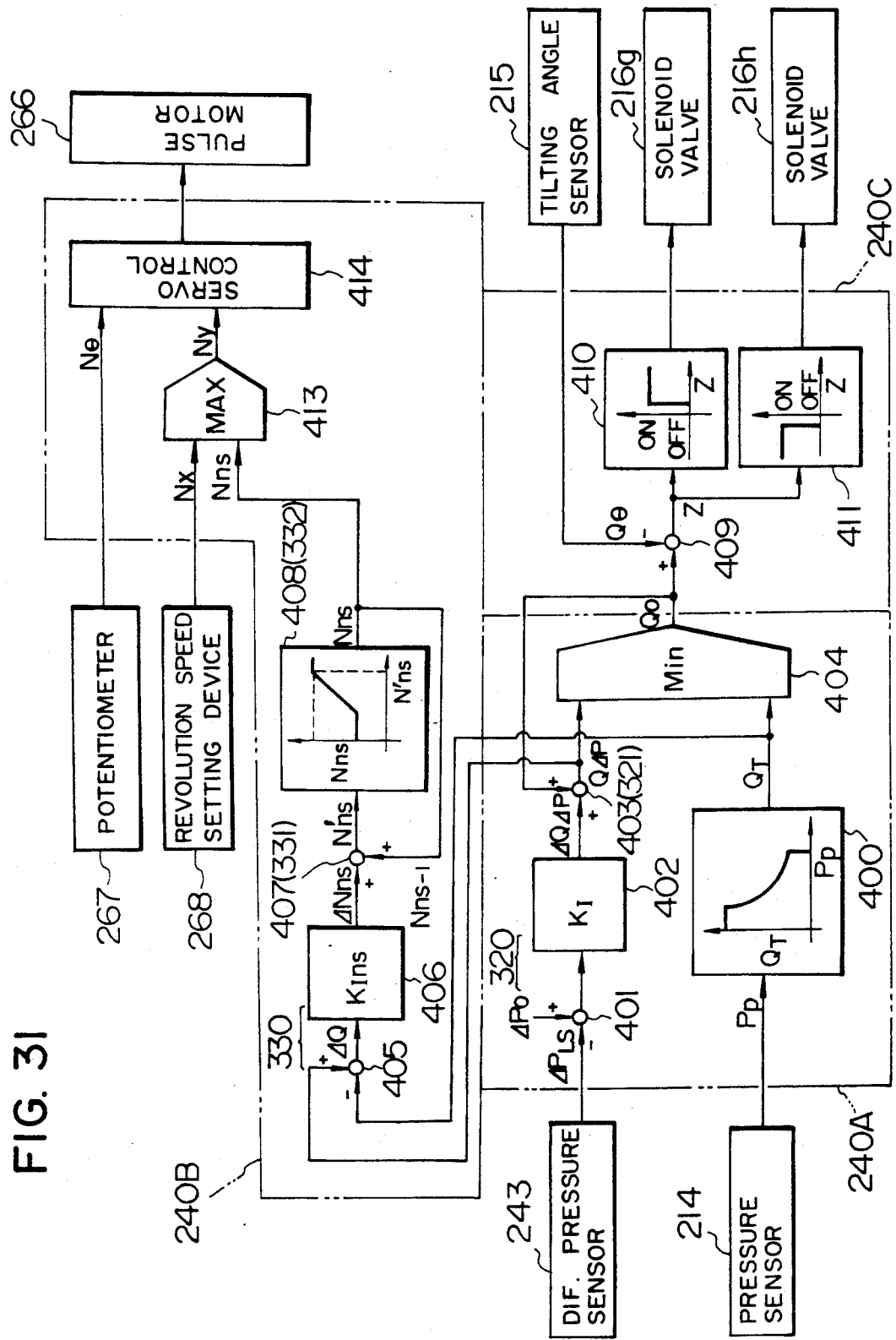
FIG. 31 is a block diagram showing a processing function of the controller.

Of the foregoing control procedure, those relating to both the control system for the hydraulic pump 201 and the control system for the engine 263 are shown together in a control block diagram of FIG. 31. In FIG. 31, designated by 204A is a control section common to the pump and the engine, 240B is an engine control section, and 240C is a pump control section. In the common control section 240A, a hydraulic pump block 400 corresponds to step S101 in FIG. 24 and calculates the limit target tilting angle QT from the input torque limiting function shown in FIG. 25. Blocks 401, 402 and 403 correspond to step S102. Among these blocks, the addition block 401 and the proportional operation block 402 correspond to the arithmetic block 401 in FIG. 26, and the addition block 403 corresponds to the adder 321, the three blocks cooperating to calculate the differential pressure target tilting angle QΔp. A block 404 corresponds to steps S104, S105, S106 in FIG. 24 and selects smaller one of the two target delivery rates QT and QΔp as the command value Qo.

Figure 24:
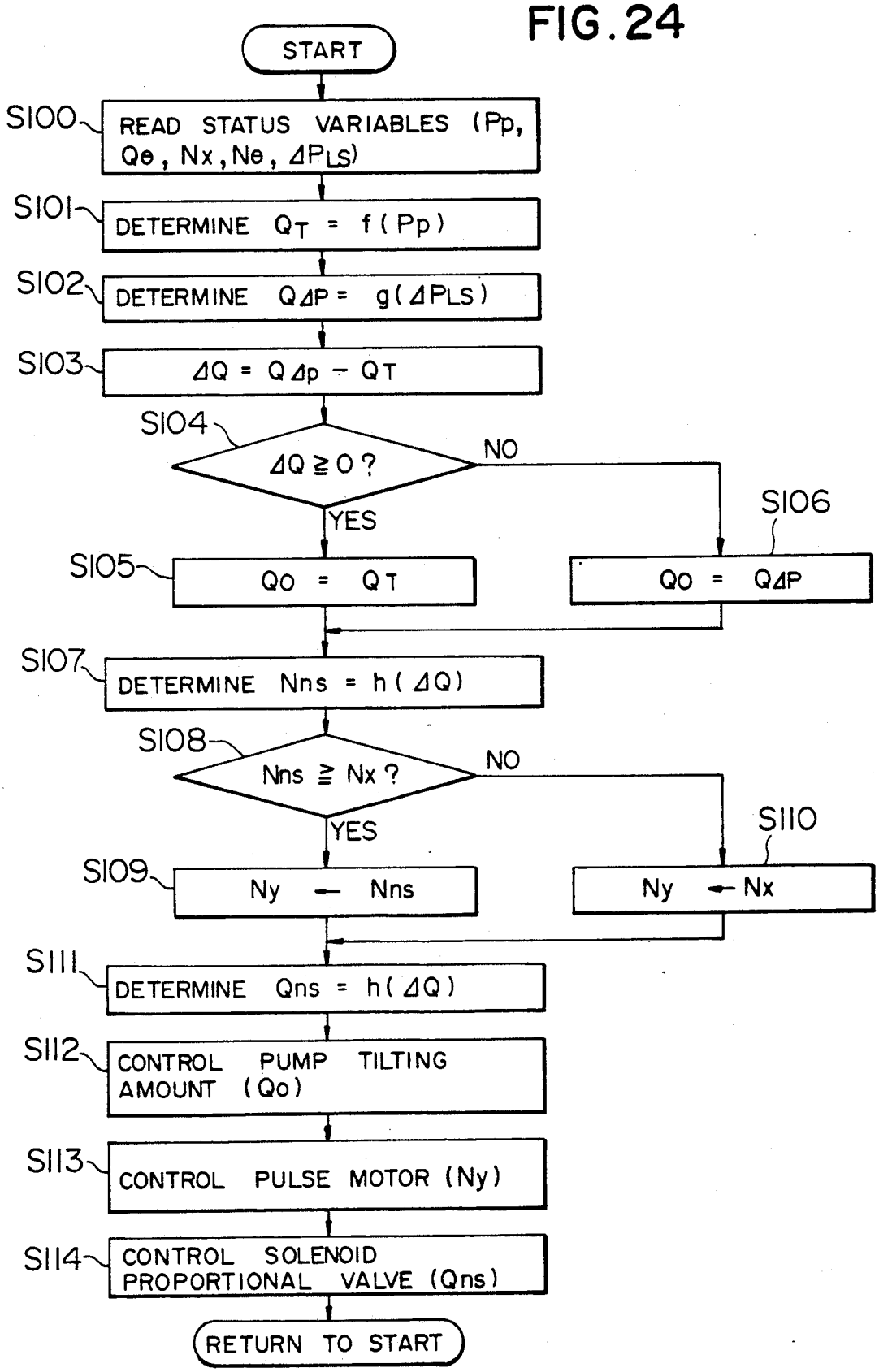
FIG. 24 is a flowchart showing a processing function of the controller.

In the engine control section 240B, blocks 405, 406, 407, 408 correspond to step S107 in FIG. 24. Among these blocks, the addition block 405 and the proportional operation block 406 corresponds to the arithmetic section 330 in FIG. 27, the addition block 407 corresponds to the adder 331, and the block 408 corresponds to the limiter 332, the four blocks cooperating to calculate the target revolution speed Nns. A block 413 corresponds to steps S108, S109, S110 in FIG. 24 and selects larger one of the two target revolution speeds Nx and Nns as the final target revolution speed, i.e., the revolution speed command value Ny. A block 414 is a servo control block corresponding to step S113 and controls the pulse motor 266 based on both the revolution speed command value Ny and the actual revolution speed Nθ.

In the pump control section 240C, blocks 409, 410, 411 correspond to step S112 in FIG. 24. Among these blocks, the addition block 409 corresponds to step S140, and the blocks 410, 411 correspond to step S141–S145 for outputting the control signals to the solenoid valves 216g, 216h, respectively.

Operation and Effect

Next, operation and effect of this embodiment thus arranged will be described.

During operation under the low load as encountered when traveling on a flat road at a constant speed or descending a sloped road, for instance, it is supposed that the revolution speed setting device 268 sets the target revolution speed Nx to a relatively low speed. The differential pressure target tilting angle QΔp is selected as the tilting angle command value Qo in the control section 240A of the controller 240, and the hydraulic pump 201 is subjected to the load sensing control so that the differential pressure between the pump delivery pressure and the load pressure while traveling is kept constant by the pump control section 240C. Meanwhile, since the difference ΔQ is a negative value in the engine control section 240B at this time, the target revolution speed Nns based on the difference ΔQ is not calculated and the target revolution speed Nx is selected as the revolution speed command value Ny of the engine 263. Therefore, the revolution speed of the engine 263 is controlled to be coincident with the target revolution speed Nx, so that the vehicle cruises on a flat road or descends a sloped road at that engine revolution speed.

When the operating condition is changed from the above one to another one that the load or the demanded flow rate of the actuator(s) is increased, e.g., when entering a sloped road to ascend or starting to travel at an accelerated speed, the differential pressure target tilting angle QΔp becomes larger than the limit target tilting angle QT and the limit target tilting angle QT is hence selected as the command value Qo in the control section 240A of the controller 240. Thus, the delivery rate of the hydraulic pump is about to saturate by being subjected to the input torque limiting control. At the same time, the difference ΔQ is calculated as a positive value and the target revolution speed Nns is calculated based on the positive value in the engine control section 240B. This target revolution speed Nns increases as long as the difference ΔQ is calculated as a positive value, and eventually becomes larger than the target revolution speed Nx. Therefore, the target revolution speed Nns is now selected as the revolution speed command value Ny of the engine 263 for raising up the engine revolution speed. As a result, saturation of the pump delivery rate can be resolved or avoided to provide the desired traveling speed dependent on the trod amount of the pilot reducing valve 58.

Accordingly, the intended traveling can be performed at a lower engine revolution speed by setting the target revolution speed Nx to a low value less than its maximum value Nxmax, making it possible to improve fuel consumption, achieve economic operation, and lower an engine sound for reduced noise.

Then, during sole traveling under the high load such as encountered when starting to travel or ascending a sloped road, or under the operating condition that the delivery pressure or delivery rate of the hydraulic pump 201 is increased frequently, such as encountered in the combined operation of traveling and boom-up where the actuators 202, 203 require the large flow rate, the revolution speed setting device 268 sets the target revolution speed to the maximum value Nxmax. At this time, the differential pressure target tilting angle Q$\Delta$p becomes larger than the limit target tilting angle QT and the limit target tilting angle QT is hence selected as the command value Qo in the control section 240A of the controller 240. While the pump delivery rate is about to saturate, the target revolution speed Nns is calculated based on the difference $\Delta$Q in the engine control section 240B in a like manner to the above case. Here, since Nnsmax>Nxmax holds as mentioned above, the target revolution speed Nns is selected as the target revolution speed Ny for raising up the engine revolution speed. As a result, saturation of the pump delivery rate can be resolved or avoided to provide the desired speeds of the actuators. In addition, during the combined operation, it is possible to maintain the speed ratio of the actuators constant and improve operability.

Afterward, when the load is so reduced as to cause transition into an operating condition that the differential pressure target tilting angle Q$\Delta$p becomes smaller than the limit target tilting angle QT, the target revolution speed Ny is given by Nx and the engine 263 is controlled to have the target revolution speed Nxmax set by the revolution speed setting device 268 and lower than Nxmax. This prevents excessive rotation of the engine, and hence achieves a reduction in both fuel consumption and noise. In addition, the target revolution speed Ny does not fall below Nxmax, whereby the engine revolution speed is not so frequently fluctuated, which also enables a reduction in both fuel consumption and noise incidental to frequent fluctuations in the engine revolution speed.

Thereafter, when the flow rate demanded by the actuators 202, 203 is further increased, or when the load pressure is further increased, the target revolution speed Nns reaches the maximum value Nnsmax and the engine 263 also reaches the highest revolution speed. At this time, the pump delivery rate has already been increased up to the available maximum delivery rate and can no longer be increased beyond it. Upon coming into such a condition, the modification value Qns for the total consumable flow modifying control is calculated based on the difference $\Delta$Q in the controller 240, so that the control pressure from the solenoid proportional valve 209 increases the control forces acting on the pressure compensating valves 206, 207 in the valve-closing direction, thereby to ensure the distribution ratio of the flow rates passing through the control valves 204, 205. This permits to maintain the speed ratio in spite of a reduction in the absolute speeds of the actuators, and to continue the smooth combined operation.

With this embodiment, as described above, since the revolution speed of the engine 263 is automatically raised up to increase the delivery rate of the hydraulic pump 201 when the pump delivery rate is about to saturate, the target revolution speed Nx determined by the target revolution speed 268 can be set to a lower value for reducing fuel consumption and noise, while improving durability of the equipment. It is also possible to prevent a decrease in the actuator speed and a deterioration in operability during the combined operation which would otherwise be caused by saturation of the pump delivery rate, and hence to ensure excellent operability at all times. Further, it becomes possible to suppress frequent fluctuations in the engine revolution speed and hence to achieve a reduction in both fuel consumption and noise, by setting the target revolution speed Nx to a higher value.

Modification of Sixth Embodiment

Figure 32:
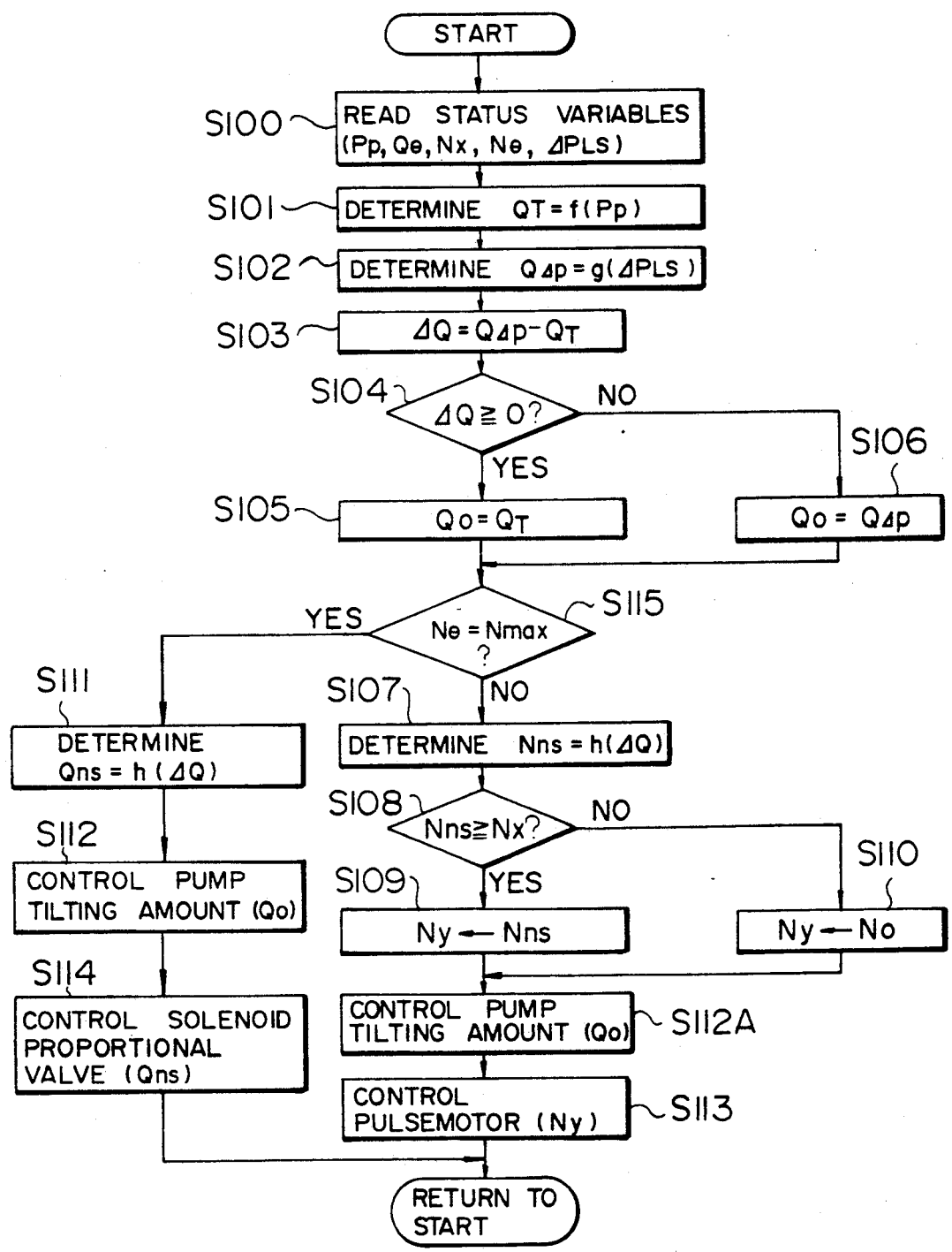
FIG. 32 is a flowchart similar to FIG. 24, showing a modification of the sixth embodiment.

A modification of the sixth embodiment will now be described with reference to a flowchart shown in FIG. 32. In FIG. 32, the same steps as those in the flowchart of FIG. 24 are designated by the same reference symbols. This embodiment is intended to perform the revolution speed raising control for the engine 263 and the total consumable flow modifying control for the pressure compensating valves 206, 207 separately with certainty.

In FIG. 32, the processing up to steps S105, S106 to determine the tilting angle command value Qo is the same as that in the sixth embodiment. Afterward, in this embodiment, step 115 judges whether or not the actual revolution speed of the engine 263 detected by the potentiometer 267 reaches the highest revolution speed Nmax. If the actual revolution speed is judged as not reaching the highest revolution speed Nmax, the control flow goes to the process consisted of steps S107, S108, S109, S110, S112A, S113 in the sixth embodiment shown in FIG. 24 excepting steps S111, S114. The load sensing control of the hydraulic pump 201 and the revolution speed raising control of the engine 263 are performed through that process, excepting the control of the pressure compensating valves 206, 207. If the actual revolution speed is judged as reaching the highest revolution speed Nmax, the control flow goes to the process consisted of steps S111, S112B, S114 in the sixth embodiment shown in FIG. 24 through which the load sensing control of the hydraulic pump 201 and the control of the pressure compensating valves 206, 207 are performed, excepting the control of the engine 263.

With this embodiment, the control of the pressure compensating valves 206, 207 is not performed before the engine 263 reaches the highest revolution speed, but started only upon the engine 263 reaching the highest revolution speed. Therefore, it is possible to prevent interference between the control of the engine 263 and the control of the pressure compensating valves 206, 207, and to achieve the steady control of the engine 263.

Although the above embodiment has been explained as starting the control of the pressure compensating valves 206, 207 after the engine revolution speed reaches the highest revolution speed Nmax, the control of the pressure compensating valves 206, 207 may be started at the time when the engine revolution speed reaches a predetermined value Nc lower than the highest revolution speed Nmax. This prevents the engine revolution speed from rising uselessly, and hence to reduce both noise and fuel consumption.

Another modification of the sixth embodiment will be described below with reference to FIG. 33. This modified embodiment is intended to change over the engine revolution speed raising control and the control of the pressure compensating valves based on an index other than the engine revolution speed.

Figure 33:
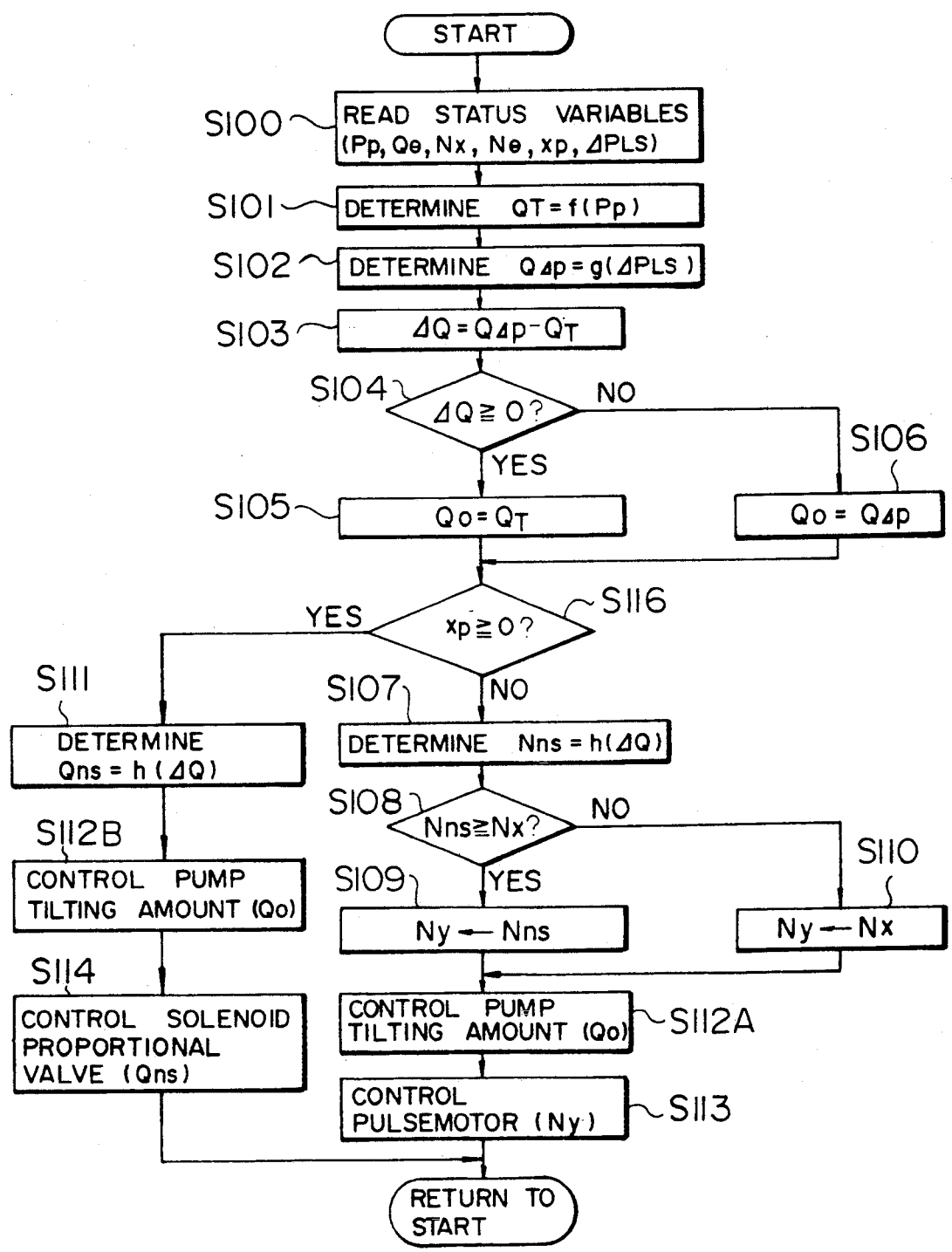
FIG. 33 is a similar flowchart showing another modification of the sixth embodiment.

In FIG. 33, step S100A reads a pilot pressure of the actuator operation device, e.g., a traveling pilot pressure Pt, in addition to the pressure signal Pp, the tilting angle signal Qθ, the differential pressure signal ΔPLS, the actual revolution speed signal Nθ and the target revolution speed signal Nx. In this case, the traveling pilot pressure Pt can be detected by installing a pressure sensor on the outlet side of the pilot reducing valve 58 as with an embodiment shown in FIG. 35 and described later. Step S116 judges whether or not Pt>0 holds, i.e., whether or not the traveling pilot pressure Pt is produced. If the traveling pilot pressure Pt is produced, the control flow goes to the process consisted of steps S107, S108, S109, S110, S112A, S113 for carrying out the control of the hydraulic pump 201 and the engine 263. If the traveling pilot pressure Pt is not produced, it goes to the process consisted of steps S111, S112A, S114 for carrying out the control of the hydraulic pump 201 and the pressure compensating valves 206, 207.

With this embodiment, when the delivery rate of the hydraulic pump 201 gets into saturation, the engine revolution raising control is selected for the operation of traveling and the control of the pressure compensating valves is selected for the actuator's operation other than traveling. Therefore, the hydraulic fluid can be supplied at the sufficient flow rate under the engine revolution speed raising speed for the operation of traveling in which the flow rate is relatively less fluctuated and a delay in response of the engine control is not so practically problematic. For the operation of the other actuators, the total consumable flow modifying control can be performed through the pressure compensating valves superior in response, rather than the engine revolution raising control, making it possible to achieve the optimum control fit for characteristics of the respective actuators.

Still Another Modification of Sixth Embodiment

Figure 34:
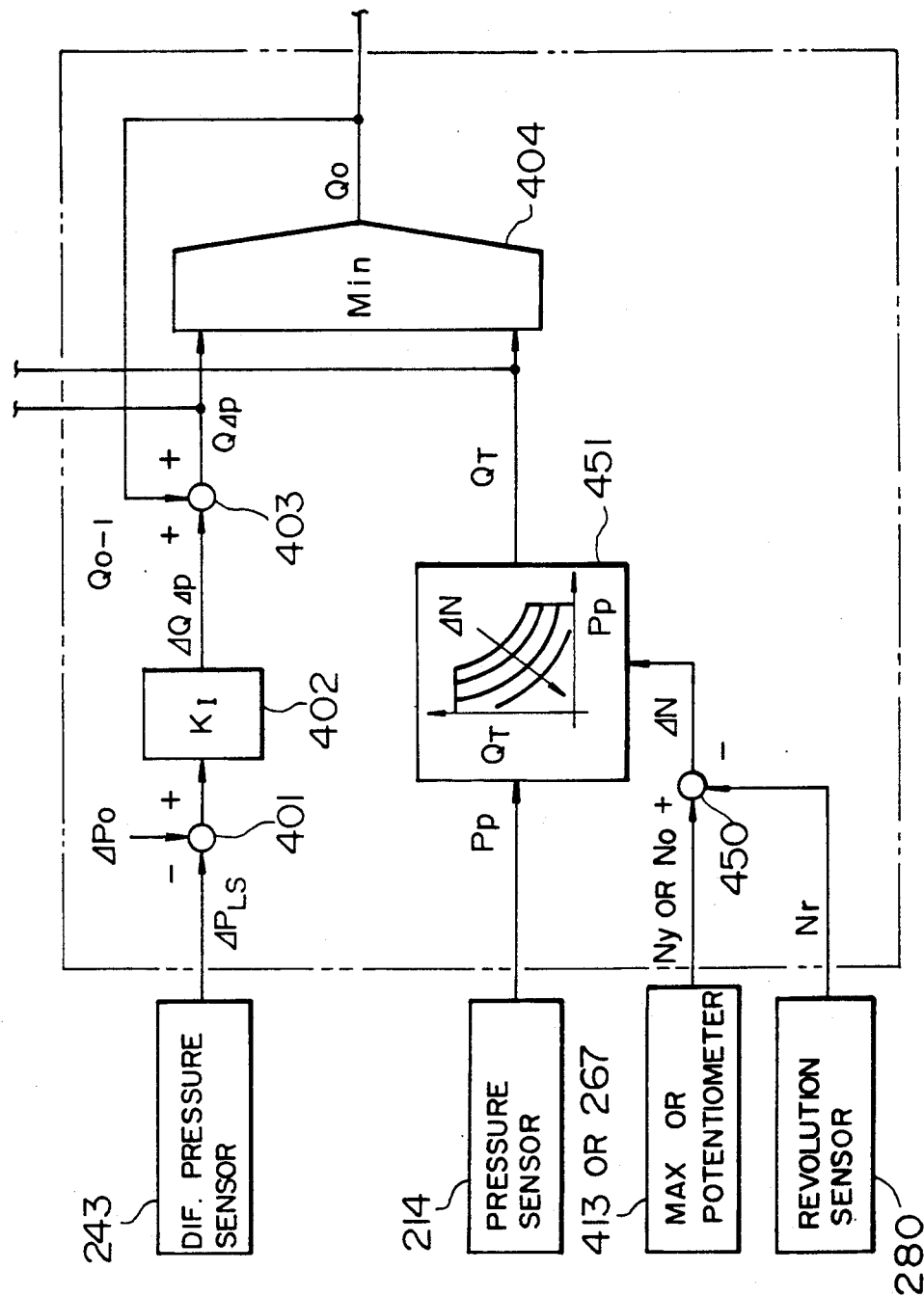
FIG. 34 is a block diagram showing part of a processing function of the controller according to still another modification of the sixth embodiment.

A still another modification of the sixth embodiment will now be described with reference to FIG. 34. In FIG. 34, the identical components to those in FIGS. 21 and 31 are designated by the same reference numerals. While the limit target tilting angle QT is determined in the sixth embodiment from the delivery pressure Pp and the input torque limiting function f(Pp) shown in FIG. 25, a deviation ΔN in revolution speed of the engine 263 is also used for determining the input torque limit target angle QT in this embodiment.

Referring to FIG. 34, a block 450 is an addition block for comparing the revolution speed Nθ detected by the potentiometer 267 or the revolution speed command value Ny determined in the block 413 with the actual revolution speed Nr detected by a revolution sensor 280 indicated by imaginary lines in FIG. 21, to calculate the revolution speed deviation ΔN. The pump pressure Pp detected by the pressure sensor 214 and the revolution speed deviation ΔN calculated in the addition block 450 are both input to a target tilting angle calculating block 451. The block 451 previously sets therein an input torque limiting function f1(Pp, ΔN) with the pump delivery pressure Pp and the revolution speed difference ΔN being variables, as shown. The input torque limiting function f1(Pp, ΔN) is set such that as the revolution speed difference ΔN increases, the product of the target delivery rate QT and the delivery pressure Pp becomes smaller. In the block 451, the control limit tilting angle QT is calculated from the input torque limiting function f1(Pp, ΔN). The remaining arrangement is the same as that of the control section 240A shown in FIG. 31.

With this embodiment, the input torque limiting control of the hydraulic pump 201 is performed such that the product of the target delivery rate QT and the delivery pressure Pp is reduced with an increase in the revolution speed deviation ΔN, so that the output horsepower of the engine 263 can be utilized at maximum.

Seventh Embodiment

A seventh embodiment of the present invention will be described with reference to FIGS. 35 through 37. In these drawings, the identical components or steps to those in FIGS. 21 through 31 are designated by the same reference numerals or symbols.

Figure 35:
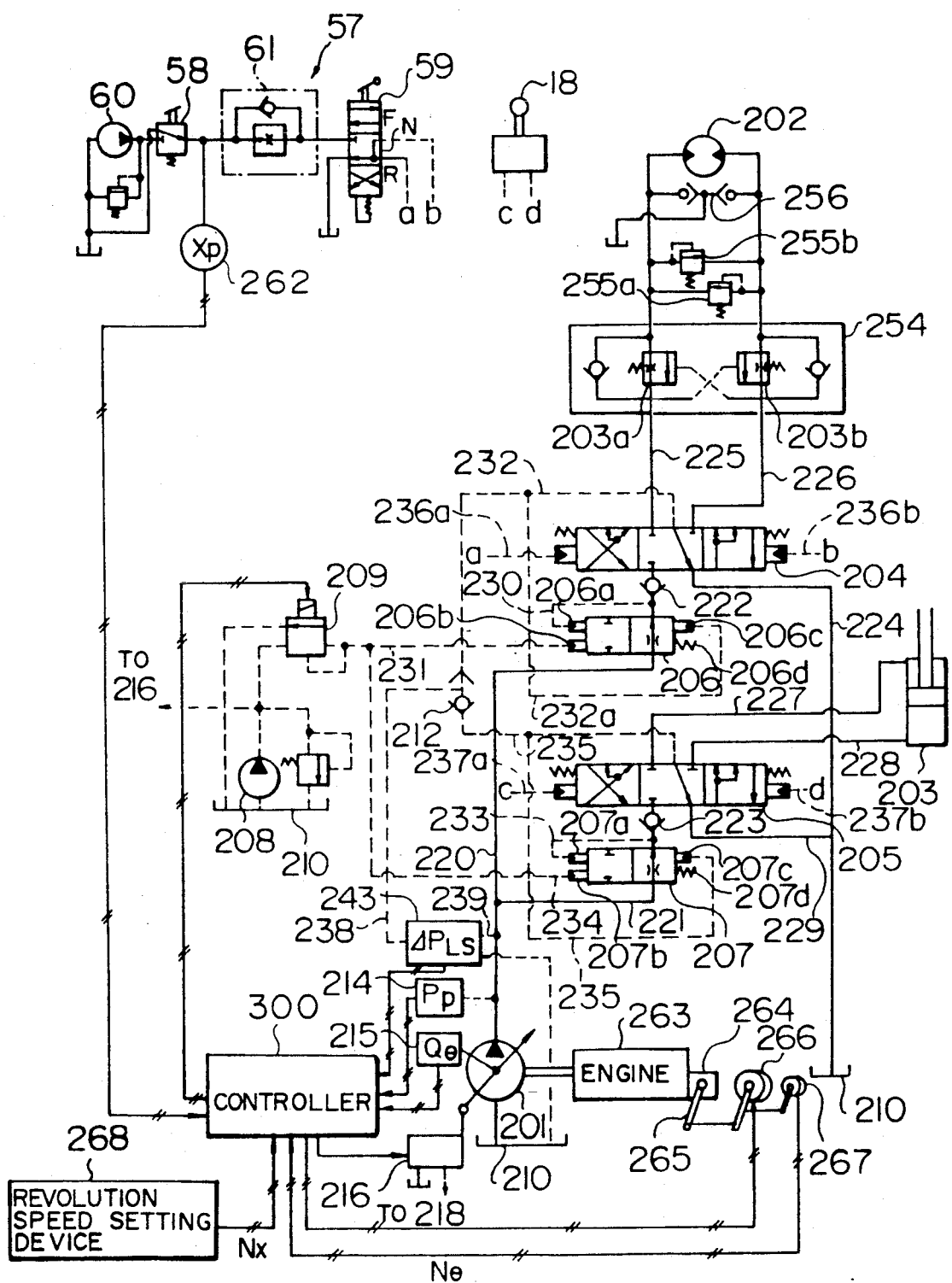
FIG. 35 is a diagrammatic view of a hydraulic drive system according to a seventh embodiment of the present invention.

Referring to FIG. 35, a pressure sensor 262 is disposed on the outlet side of the pilot reducing valve 58 to detect a pilot pressure for the traveling and hence an input amount xp of the pilot reducing valve 58. A detection signal of the pressure sensor 262 is applied to the A/D converter 240a (see FIG. 23) as an input section of the controller 300. The remaining hardware configuration is the same as that of the embodiment shown in FIG. 21.

Figure 36:
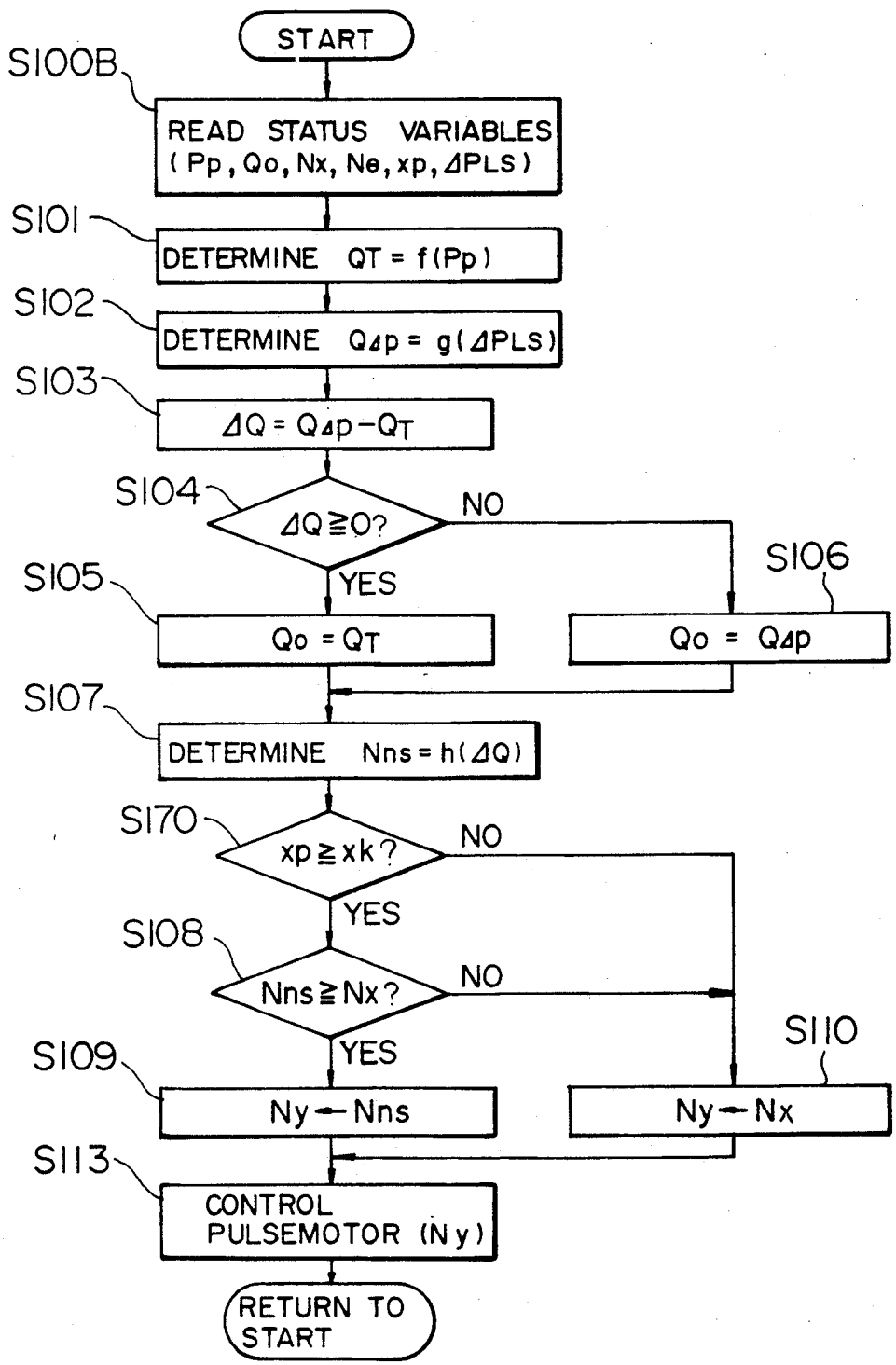
FIG. 36 is a flowchart showing a processing function of a controller in FIG. 35.

FIG. 36 is a flowchart showing the control program stored in the memory of the controller 300. For the sake of illustration, FIG. 36 includes only the sequence related to the engine control, excepting the sequence related to the load sensing control of the hydraulic pump 201 and the control of the pressure compensating valves 206, 207.

In FIG. 36, step S100B reads a signal indicating the input amount xp of the pilot reducing valve 58 detected by the pressure sensor 262, in addition to the pressure signal Pp, the tilting angle signal Qθ, the differential pressure signals ΔPLS, the actual revolution speed signal Nθ and the target revolution speed signal Nx. Thereafter, the process from steps S101 through S107 is the same as that of the sixth embodiment shown in FIG. 24. Specifically, step S103 calculates the tilting angle difference ΔQ, step S105 or S106 calculates the tilting angle command value Qo, and step S107 calculates the target revolution speed Nns.

Then, step S170 judges whether or not the input amount xp detected by the pressure sensor 262 is larger than a predetermined value xk. If the input amount xp is judged to be equal to or larger than the predetermined value xk, the control flow goes to steps S108, S109, S110 similarly to the sixth embodiment. Thus, when the target revolution speed Nns is equal to or larger than the target revolution speed Ns set by the revolution speed setting device 268, it is selected as the revolution speed command value Ny to carry out the revolution speed raising control. If the input amount xp is judged to be smaller than the predetermined value xk in step S170, the control flow goes to step S110 where the setting target revolution speed Nx is selected as the revolution speed command value Ny.

Figure 37:
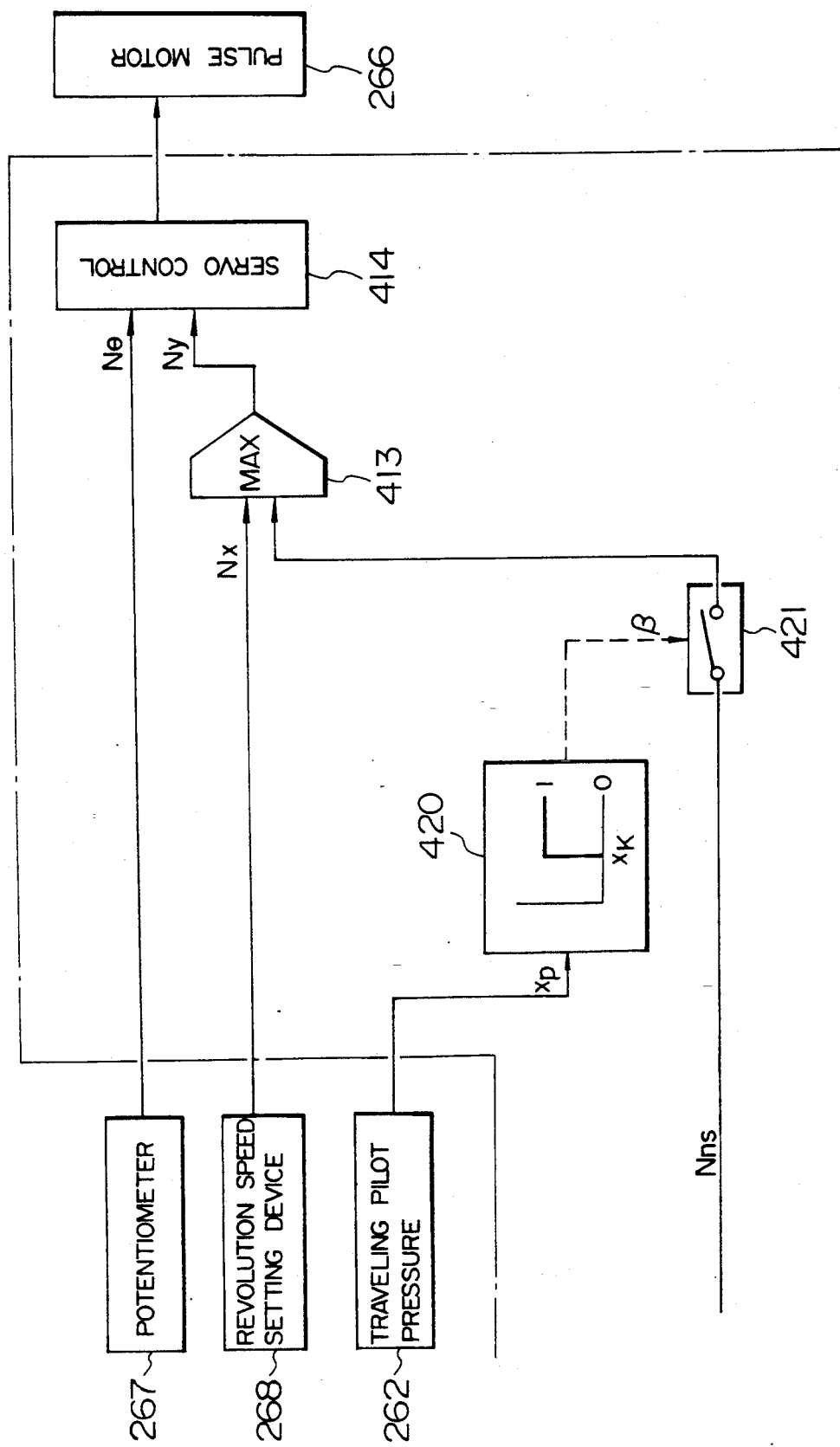
FIG. 37 is a block diagram showing the processing function of FIG. 36.

FIG. 37 is a control block diagram showing a function of the above flowchart to be effected in steps subsequent to S170. In FIG. 37, the identical blocks to those in FIG. 31 in their functions are designated by the same reference symbols. If the input amount xp detected by the pressure sensor 262 is equal to or larger than the predetermined value xk, a block 420 outputs a signal β of level 1 which is sent to a switch 421. In the absence of the signal β, the switch 421 is opened to interrupt transmission of the target revolution speed Nns to a maximum value select block 413. When the signal β is produced, the switch 421 is closed to transmit the target revolution speed Nns to the maximum value select block 413.

With this embodiment thus arranged, in a range where the pilot pressure, i.e., the input amount xp, of the pilot reducing valve 58 is not smaller than the predetermined value xk, the switch 421 is closed to provide the same block arrangement as that of the engine control section 340B shown in FIG. 31. When the input amount xp is smaller than the predetermined value xk, the switch 421 is opened to bring forth the block arrangement devoid of the function of calculating the target revolution speed Nns given by the engine control section shown in FIG. 31. Therefore, the revolution speed command value Ny is determined by only the target revolution speed Nx, and the revolution speed dependent on the value set by the revolution speed setting device 258 is obtained. In other words, the engine revolution speed will not fluctuate so long as the revolution speed setting device 268 is not operated.

Accordingly, in addition to obtain substantially the same advantageous effect as that in the sixth embodiment, this embodiment can prevent fluctuations in the engine revolution speed and improve operability when the vehicle is traveling at a very low speed with the pilot reducing pilot 58 kept at the small input amount, because the engine revolution speed will not be raised up even if the load is temporarily increased and hence the hydraulic pump 102 is temporarily subjected to the input torque limiting control. Also, since the engine revolution speed will not be fluctuated while traveling at a very low speed, the operation is not noisy or offensive to the ear and fuel consumption can be prevented from increasing due to frequent fluctuations in the engine revolution speed. Furthermore, when the input amount xp exceeds the predetermined value xk, the engine is subjected to the revolution speed raising control so that the driven state of the engine is matched with the intention of an operator, allowing the operator to have a good feeling in operation.

Eighth Embodiment

An eighth embodiment of the present invention will be described with reference to FIGS. 38 and 39. In these drawings, the identical components or steps to those in FIGS. 21 through 31 and FIGS. 35 through 37 are designated by the same reference numerals or symbols.

Figure 38:
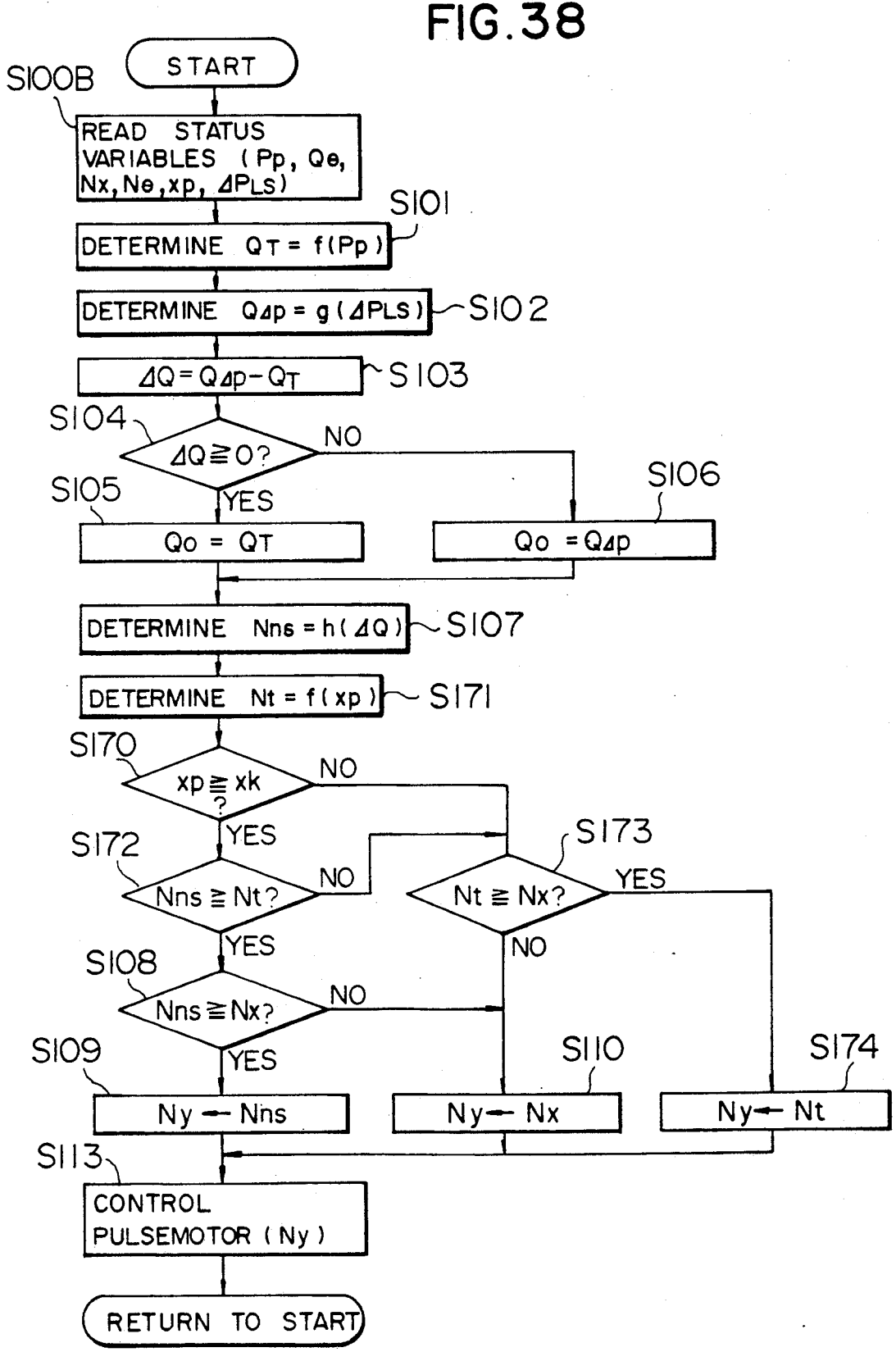
FIG. 38 is a flowchart showing a processing function of a controller according to an eighth embodiment of the present invention.

FIG. 38 is a flowchart showing the control program of this embodiment. As with FIG. 36, FIG. 38 shows only the sequence related to the engine control.

In FIG. 38, the process from steps S100B through S107 are the same as those in the seventh embodiment of FIG. 36. Then, based on the function $Nt = f(xp)$ between the input amount xp of the pilot reducing valve 58 and the third target revolution speed Nt that is stored in advance, step S171 calculates the target revolution speed Nt which increases dependent on the input amount xp. Here, a maximum value Ntmax of the target revolution speed Nt is set lower than the highest revolution speed available with the engine 263, as with the target revolution speed Nx. Consequently, the maximum value Nnsmax of the target revolution speed Nns is larger than both the maximum values Nxmax, Ntmax of the target revolution speeds Nx and Nt.

Then, the control flow goes to step S170 where judges whether or not the input amount xp of the pilot reducing valve 58 detected by the pressure sensor 262 is larger than the predetermined value xk. If the input amount xp is judged to be equal to or larger than the predetermined value xk, it goes to step S172 which judges whether or not the target revolution speed Nns is larger than the target revolution speed Nt calculated in step S171. If $Nns \geq Nt$ is judged to hold in step S172, it goes to steps S108, S109, S110 as with the sixth embodiment. If the target revolution speed Nns becomes larger than the target revolution speed Nx, the former is selected as the revolution command value Ny to perform the engine revolution raising control.

When the input amount xp is judged to be smaller than the predetermined value xk in step S170, or when the target revolution speed Nns is judged to be smaller than the target revolution speed Nt, the control flow goes to step S173 for judging whether or not the target revolution speed Nt is larger than the target revolution speed Nx. If $Nt < Nx$ is judged to hold, it goes to above-mentioned step S110 where the target revolution speed Nx is selected as the revolution speed command value Ny to perform the ordinary revolution speed control of the engine 263 based on Nx. If $Nt \geq Nx$ is judged to hold in step S173, it goes to step S174 where the second target revolution speed Nt is selected as the revolution speed command value Ny to perform the revolution raising speed control of the engine 263 based on Nt.

Figure 39:
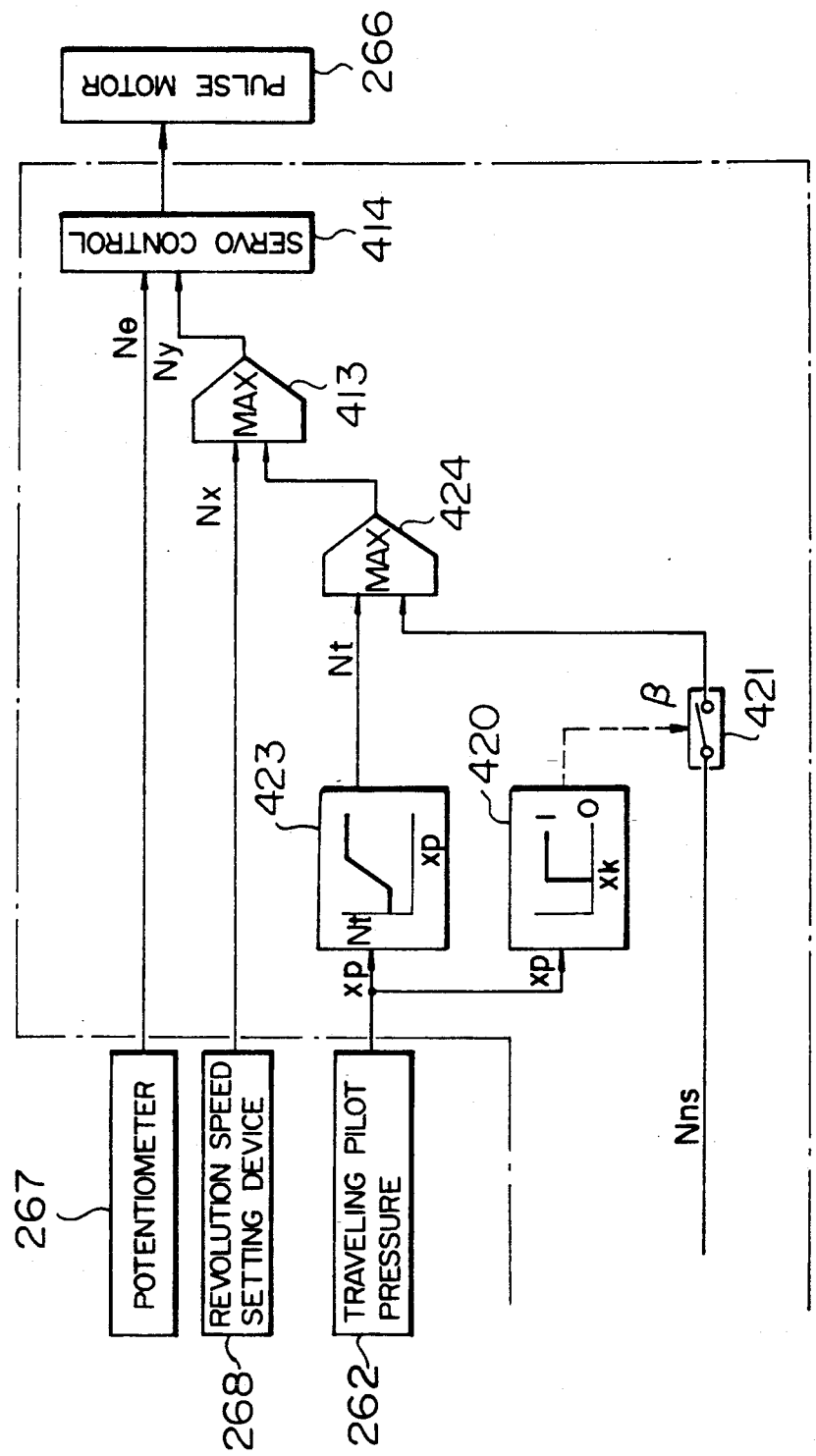
FIG. 39 is a block diagram showing the processing function of FIG. 38.

FIG. 39 is a control block diagram showing a function of the above flowchart to be effected in steps subsequent to S171. In FIG. 39, the identical blocks to those in FIGS. 31 and 37 in their functions are designated by the same reference symbols. A block 423 is a block for receiving the input amount xp of the pilot reducing valve 58 detected by the pressure sensor 262, and then calculating from the function $Nt = f(xp)$ the target revolution speed Nt which increases dependent on the input amount xp. The target revolution speed Nt calculated in the block 423 is sent to a maximum value select block 424 along with an output of the switch 421. A larger value therebetween is selected by the block 424 and output to the maximum value select block 413.

With this embodiment thus arranged, in a range where the pilot pressure, i.e., the input amount xp, of the pilot reducing valve 58 is not smaller than the predetermined value xk, the switch 421 is closed so that the maximum value among the target revolution speeds Nx, Nns, Nt is given as the revolution speed command value Ny. Accordingly, when the delivery rate of the hydraulic pump 2 is about to saturate, the target revolution speed Nns is selected as the revolution speed command value Ny, whereby the engine 263 is automatically subjected to the revolution speed raising control. The above process equally applies to the case where the target revolution speed Nx or Nt gives the maximum value because of the relationships Npmax > Nxmax and Npmax > Ntmax.

When the delivery rate of the hydraulic pump 201 is not saturated, a larger value between the target revolution speeds Nx and Nt is selected as the revolution speed command value Ny. Therefore, even if the target revolution speed Nx is set at a value lower than Nxmax, the engine revolution speed is raised up with an increase in the revolution speed command value Ny, when the trod amount, i.e., the input amount xp, of the pilot reducing valve 58 is so increased that the target revolution speed Nt becomes larger than the target revolution speed Nx. Stated otherwise, in a range where the target revolution speed Nt exceeds the target revolution speed Nx, the engine revolution speed is controlled dependent on the trod amount of the pilot reducing valve 58.

When the input amount xp is smaller than the predetermined value xk, the switch 421 is opened so that the target revolution speed Nns will not be output. Therefore, by setting the target revolution speed Nt to be smaller than the setting revolution speed Nx, the revolution speed command value Ny is now determined by only the target revolution speed Nx and hence the engine revolution speed will not fluctuate. As a result, it is possible to achieve the satisfactory traveling at a very low speed as with the seventh embodiment.

Accordingly, in addition to obtain substantially the same advantageous effect as that in the seventh embodiment, this embodiment can set the target revolution speed Nx to a lower value for reducing fuel consumption, give the operator a powerful operating feeling sensible in proportional relation to the input amount of the pilot reducing valve 58, and improve operability, as with the invention disclosed in JP, A, 63-239327 which has been previously filed by the applicant and made open to the public in Japan, under the operating condition that the input amount of the pilot reducing valve 58 is equal to or larger than the predetermined value xk and the delivery rate of the hydraulic pump 201 is not subjected to saturation, because the engine revolution speed is controlled dependent on the trod amount of the pilot reducing valve 58 in a range where the target revolution speed Nt is in excess of the target revolution speed Nx.

Ninth Embodiment

Figure 40:
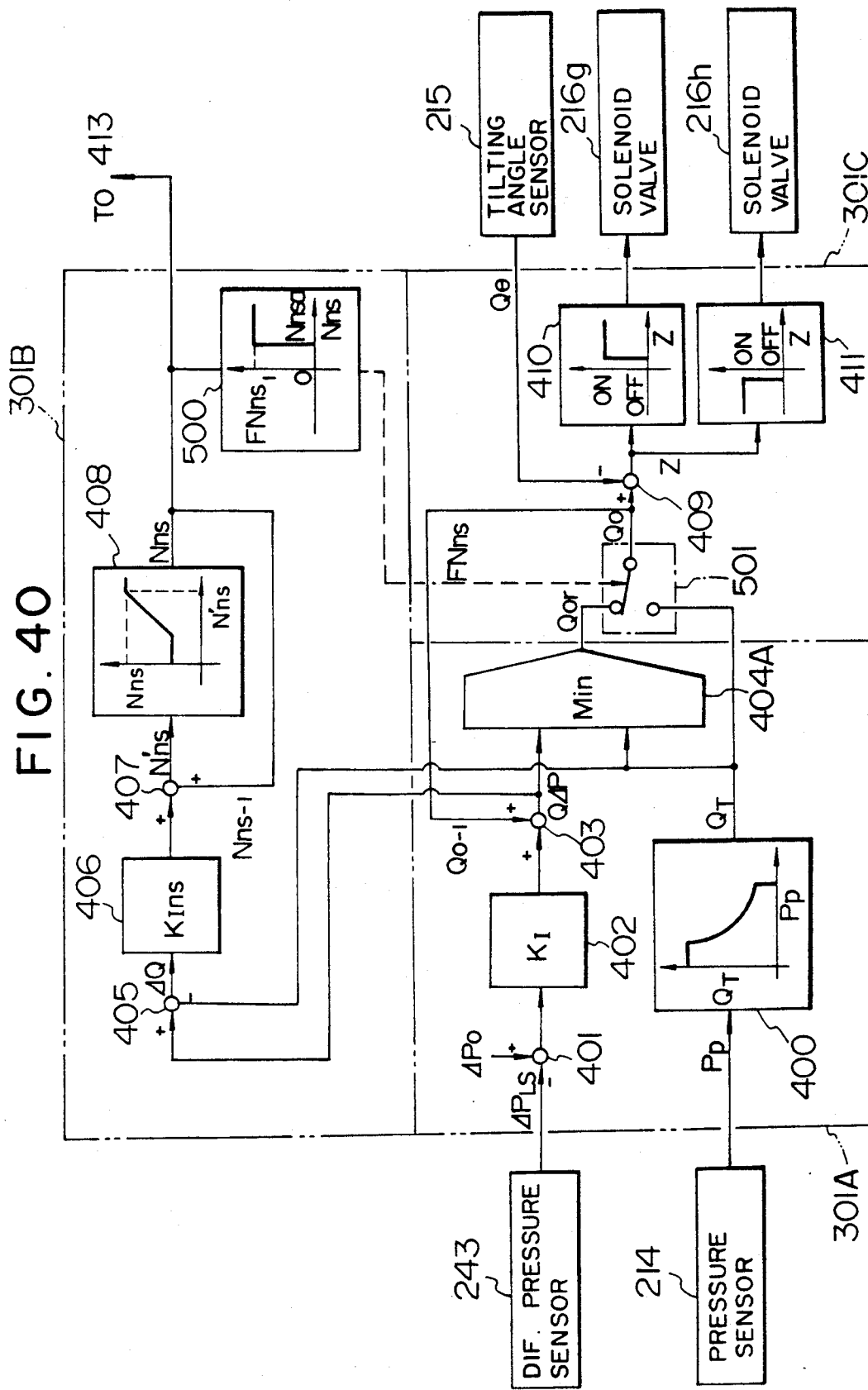
FIG. 40 is a block diagram showing a processing function of a controller according to a ninth embodiment of the present invention.

A ninth embodiment of the present invention will be described with reference to FIG. 40. In FIG. 40, the identical components to those in FIGS. 21 and 31, etc. are designated by the same reference numerals. This embodiment is intended to prevent interference between the load sensing control and the engine revolution speed raising control by holding the delivery rate of the hydraulic pump at the limit target tilting angle QT during the engine revolution speed raising control.

More specifically, in the embodiments of FIGS. 21 and 31, when the pump delivery rate gets into saturation and the differential pressure target tilting angle Q$\Delta$p is larger than the limit target tilting angle QT, the hydraulic pump 201 is held at the limit target tilting angle QT and the pump delivery rate is increased with the control of the engine 263 on the basis of the target revolution speed Nns, thereby resolving or avoiding the saturation.

On the other hand, when the tread pedal of the pilot reducing valve 58 is returned in its stroke to reduce the input amount xp under a condition of the engine revolution speed raising control on the basis of the target revolution speed Nns, the flow rate of the hydraulic fluid passing through the control valve 204 is so reduced that a value larger than the differential pressure target tilting angle Q$\Delta$p is calculated as the limit target tilting angle QT, whereby the delivery rate of the hydraulic pump 201 is controlled on the basis of the differential pressure target tilting angle Q$\Delta$p to lessen the pump delivery rate. In the arrangements of the foregoing embodiments, however, the target revolution speed Nns decreases in its value at the same time, so does the revolution speed of the engine 263. During that process, when the delivery rate of the hydraulic pump 201 is about to become smaller than the flow rate of the hydraulic fluid passing through the control valve 204, the differential pressure target tilting angle Q$\Delta$p is so increased again as to exceed the limit target tilting angle QT, whereby the hydraulic pump 201 is subjected to the input torque limiting control and the target revolution speed Nns is also increased again for raising up the engine revolution speed. As a result of repeating the above process, the load sensing control and the engine revolution speed raising control may interfere with each other to cause a hunting phenomenon.

This embodiment is intended to avoid the occurrence of such a hunting phenomenon.

Referring to FIG. 40, a block 500 in an engine control section 301B is a block for judging whether or not the engine revolution speed raising control is being performed, and then setting a flag FNns if that control is judged to be under working. This judgment is made on the basis of the target revolution number Qns. Specifically, the engine revolution speed raising control is judged as not being performed if Nns is smaller than a predetermined value Nnsa near 0, and as being performed if Nns is equal to or larger than the predetermined value Nnsa. The flag FNns is set to 1 under the engine revolution speed raising control and to 0 otherwise.

A block 404A in a common control section 301A is a block for judging which one of the differential pressure target tilting angle Q$\Delta$p and the limit target tilting angle QT is larger, and then selecting the smaller value therebetween to output it as the target tilting angle Qor, as with the block 404 in FIG. 31.

A block 501 in a pump control section 301C represents a tilting angle target value select switch for the hydraulic pump 201. Upon receiving the flag FNns for the target revolution speed Nns, the switch 501 selects the tilting angle target value Qor selected by the minimum value select block 404A when FNns is at 0, and the limit target tilting angle QT when FNns is at 1, followed by outputting the selected one as the tilting angle command value Qo.

The remaining blocks are the same as those in FIG. 31.

Operation of this embodiment will be explained below. Under the condition that the flow rate demanded by the control valves 204, 205 is less than the limit target tilting angle QT, the differential pressure target tilting angle Q$\Delta$p is smaller than QT and hence the block 404A selects the differential pressure target tilting angle Q$\Delta$p as the tilting angle target value Qor. Concurrently, the target revolution speed Nns becomes 0. Since the flag FNns is reset to 0 at this time, the tilting angle target value select switch 501 selects the tilting angle target value Qor as the tilting angle command value Qo. As a result, the hydraulic pump 201 is controlled on the basis of the differential pressure target tilting angle Q$\Delta$p.

When the flow rate demanded by the control valves 204, 205 exceeds the limit target tilting angle QT upon an increase in the trod amount of the pilot reducing valve 58, for example, the differential pressure target tilting angle Q$\Delta$p becomes larger than QT and hence the block 404A now selects QT as the tilting angle target value Qor. Concurrently, the difference $\Delta$Q becomes positive (+) and the target revolution speed is increased. At this time, when the target revolution speed Nns exceeds the predetermined value Nnsa, the flag FNns is set to 1, causing the tilting angle target value select switch 501 to select the limit target tilting angle QT as the tilting angle command value Qo. As a result, the hydraulic pump 201 is controlled on the bases of the limit target tilting angle QT. Further, the revolution speed of the engine 263 is controlled to be raised up on the basis of the target revolution speed Nns for resolving or avoiding the saturation.

So far, the system operates in a like manner to the embodiment of FIG. 31.

Afterward, when the flow rate demanded by the control valves 204, 205 is reduced upon a decrease in the trod amount of the pilot reducing valve 58, for example, the differential pressure target tilting angle Q∆p is reduced to become smaller than the limit target tilting angle QT. This causes the block 404A to select Q∆p as the tilting angle target value Qor. At this time, the difference ∆Q becomes negative (−). But, the target revolution speed Nns transiently remains positive (+) because it is gradually reduced, and the flag FNns is held at 1 as long as the target revolution speed Nns does not become smaller than the predetermined value Nnsa. Therefore, the tilting angle target value select switch 501 selects the limit target tilting angle QT as the tilting angle command value Qo, whereby the hydraulic pump 201 is held in the condition that it is controlled on the basis of QT. This condition continues until the target revolution speed Nns is reduced down to the predetermined value Nnsa and the revolution speed of the engine 263 is also reduced correspondingly so that the flow rate of the hydraulic fluid passing through the control valves 204, 205 is made coincident with QT. This permits to prevent a possibility that the hydraulic pump 201 may be controlled with the target tilting angle and the load sensing control may interfere with the engine revolution speed raising control as mentioned before.

When the target revolution speed Nns falls down to the predetermined value Nnsa and the flag FNns is turned to 0, the tilting angle target value select switch 501 now selects the differential pressure target tilting angle Q∆p as the tilting angle command value Qo. Afterward, the differential pressure target tilting angle Q∆p is controlled to be coincident with the flow rate demanded by the control valves 204, 205.

In addition to the advantageous effect of the sixth embodiment, this embodiment makes it possible to prevent interference between the engine revolution speed raising control and the load sensing control of the hydraulic pump and hence to achieve the stabler control even when the demanded flow rate is reduced by lessening the operation amount of the control means subsequent to the engine revolution speed raising control.

Tenth Embodiment

A tenth embodiment of the present invention will be described with reference to FIG. 41. In this embodiment, the manner of calculating the target tilting angle is changed from the proportional process in the embodiment shown in FIG. 40 to the integral process.

Figure 41:
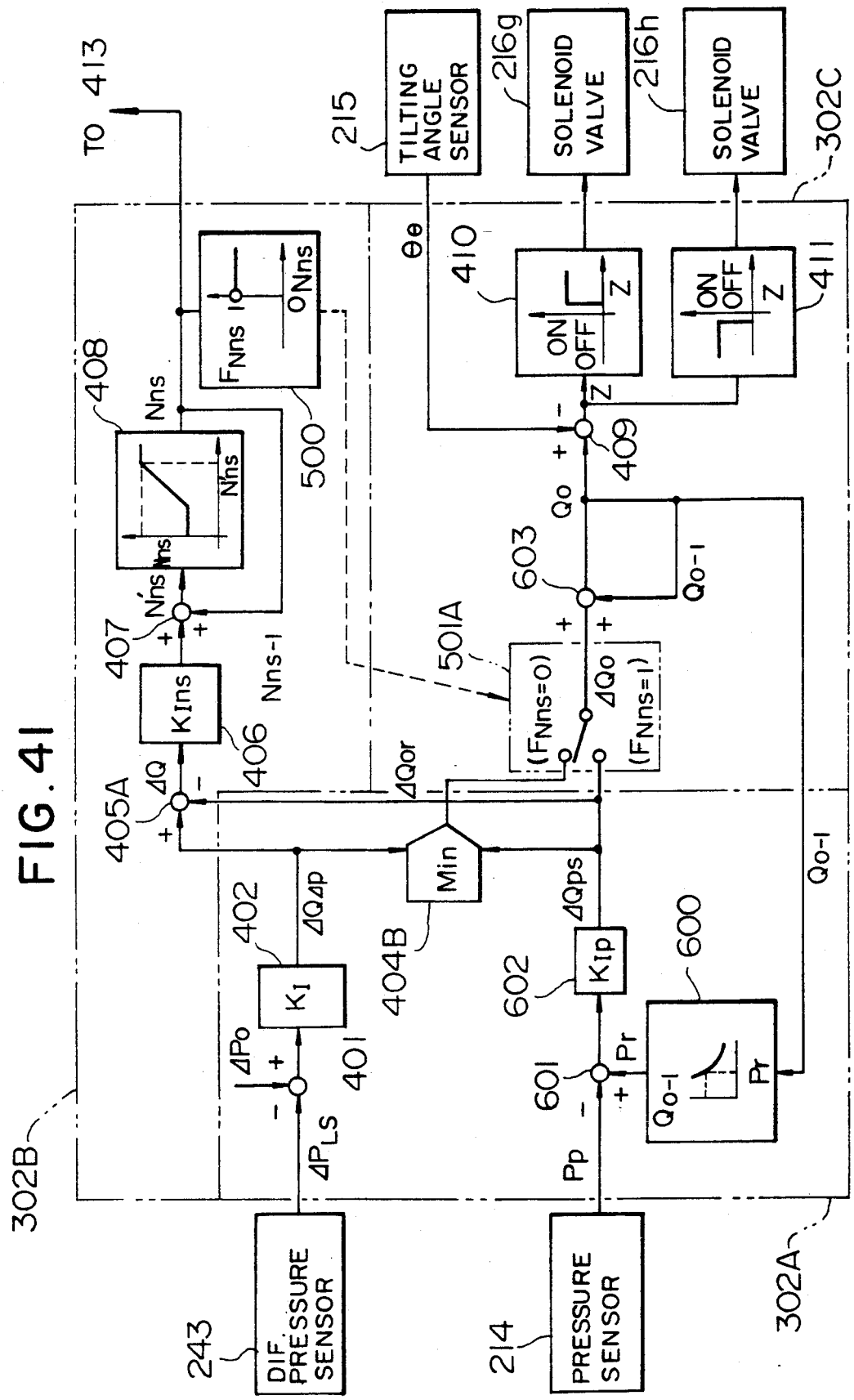
FIG. 41 is a block diagram showing a processing function of a controller according to a tenth embodiment of the present invention.

Referring to FIG. 41, a block 600 in the common control section 302A is a target delivery pressure calculating block which receives the tilting angle command value Qo-1 in the last or preceding control cycle and calculates the target delivery pressure Pr allowable at the current time from the input limit torque of the hydraulic pump 201 set in advance. The target delivery pressure Pr is sent to a differential pressure calculating block 601 where the target delivery pressure Pr is compared with the current delivery pressure Pp to calculate a differential pressure ∆PLS. The differential pressure ∆PLS is multiplied by an integral gain KIp in a target tilting angle increment calculating block 602 to calculate an increment ∆Qps of the target tilting angle per one control cycle time.

The increment ∆Qps is sent to a minimum value select block 404B along with the target tilting angle increment ∆Q∆p for comparison in their values. The block 404B outputs the smaller value as an increment ∆Qor.

A select switch 501A in the pump control section 302C receives the flag FNns issued from the block 500 in the engine control section 302B on the basis of the target revolution speed Nns, for selecting the increment ∆Qor selected by the minimum value select block 404B when FNns is at 0, and the increment ∆Qps when FNns is at 1, thereby to output the selected one as the increment ∆Qo.

The increment ∆Qo selected by the select switch 501A is added in a block 603 to the tilting angle command value Qo-1 calculated in the last control cycle, for calculating a current tilting angle command value Qo.

The two increments ∆Qps, ∆Q∆p are also sent to a block 405A in the engine control section 302B to calculate a difference ∆Q therebetween for producing a difference signal.

The remaining arrangement is the same as that in FIG. 31.

In FIG. 41, the flow through the blocks 401, 402, 404B, 501A, 603 is identical to the flow through the blocks 401, 402, 403, 404A, 501 in FIG. 40 for calculating the target tilting angle under the load sensing control. On the other hand, the flow through the blocks 600, 601, 602, 404B, 501A, 603 is substituted for the flow through the blocks 400, 404A, 501 in FIG. 40 for calculating the limit target tilting angle.

More specifically, while the embodiment of FIG. 40 implements the proportional type control of directly calculating the limit target tilting angle QT from the delivery pressure Pp of the hydraulic pump 201, this embodiment of FIG. 41 implements the integral type control of calculating the increment ∆Qps necessary for being controlled to the target delivery pressure Pr computed from input limit torque of the hydraulic pump 201, and adding the increment to the tilting angle target value in the last control cycle, thereby to calculate the input limit target value. It is to be noted that the minimum value select block 404B and the select switch 501A in the block diagram of FIG. 41 are arranged to work on the tilting angle increment. The reason is as follows.

Supposing now that the target delivery amount is calculated in this embodiment in a like manner to the embodiment of FIG. 40, the following two equations hold:

$$QT = Qo-1 + \Delta Qps \tag{5}$$

$$Q\Delta p = Qo-1 + \Delta Q\Delta p \tag{6}$$

Here, since Qo=Select(Min(QT, Q∆p), QT), putting Equations (5), (6) into this equation result in:

$$Qo = Qo - 1 + \text{Select}(\text{Min}(\Delta Qps, \Delta Q\Delta p), \Delta Qps)$$

Thus, both the embodiments of FIGS. 40 and 41 implement the same function. Specifically, in the load sensing control of FIG. 41, the increment of the target tilting angle calculated through the differential pressure control is always compared with the increment of the target tilting angle calculated from the limit torque, and the minimum value between the two increments is added to the current pump delivery rate, thereby for judging at all times that the pump delivery rate should be controlled with which one of the two increments.

Further, supposing that the target tilting angles used in the difference calculating block 405A are replaced with those used in the block 405 of FIG. 40, the following equation holds:

$$\Delta Q = Q\Delta p - QT$$

Here, putting above Equations (5), (6) into this equation results in:

$$\Delta Q = (Qo - 1 + \Delta Q\Delta p) - (Qo - 1 + \Delta Qps) = \Delta Q\Delta p - \Delta Qps$$

Thus, the block 405A of FIG. 41 is equivalent to the block 405 of FIG. 40. The process subsequent to the block 406 operates in exactly the same manner as that in FIG. 40.

This embodiment is identical to the embodiment of FIG. 40 in the basic function of determining the target revolution speed Nns from the difference $\Delta Q$ between the limit target tilting angle of the hydraulic pump and the differential pressure target tilting angle, and making the control to raise up the engine revolution speed on the basis of Nns, thereby to resolve or avoid the saturation of the hydraulic pump. They are also similar in preventing a possibility that the hydraulic pump 201 may be controlled with the differential pressure target tilting angle under the condition where the engine 263 is controlled to be raised up in the revolution speed, and the load sensing control may interfere with the engine revolution speed raising control.

In this embodiment, however, since the target tilting angle is calculated through the integral process and the new target delivery value Qo is always calculated from the last tilting angle command value Qo−1, it becomes possible to smooth transition from one condition where the hydraulic pump is controlled on the basis of the differential pressure target tilting angle to another condition where it is controlled on the basis of the limit target tilting angle, or vice versa. Therefore, the hydraulic pump is less susceptible to abrupt movement upon changing-over of the control mode, resulting in the stabler control.

Eleventh Embodiment

Figure 42:
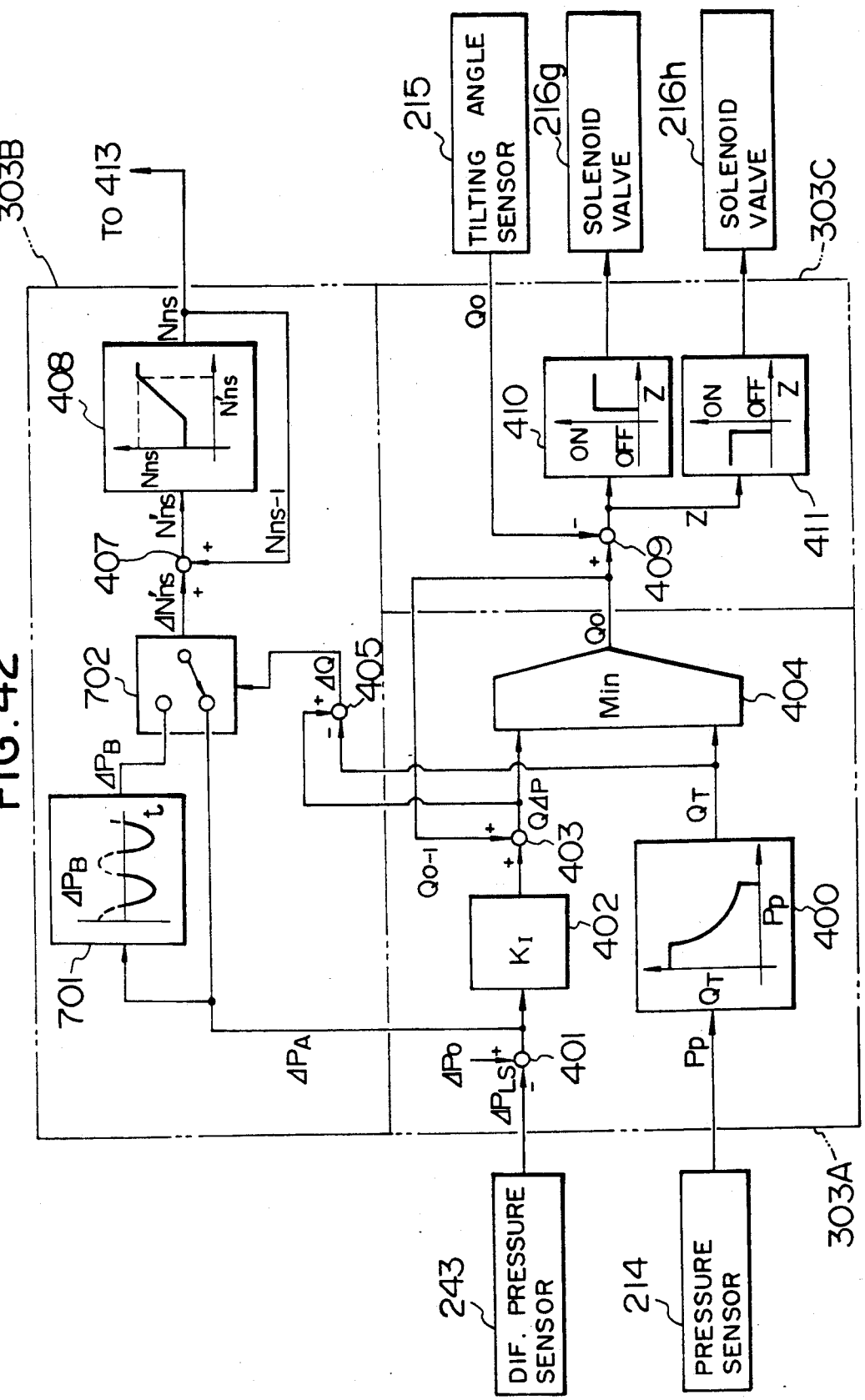
FIG. 42 is a block diagram showing a processing function of a controller according to an eleventh embodiment of the present invention.

An eleventh embodiment of the present invention will be described with reference to FIG. 42. In FIG. 42, the same components as those in FIG. 31 are designated by the same reference numerals. This embodiment is different from the foregoing embodiments in the arrangement of calculating the target revolution speed Nns.

More specifically, a block 701 in the engine control section 303B is a half-wave rectifier which receives the differential pressure deviation $\Delta PA = \Delta Po - \Delta PLS$ calculated by the adder 401 in the common control section 303A, for outputting $\Delta PB = 0$ if $\Delta PA > 0$ holds and $\Delta PB = \Delta PA$ if $\Delta PA > 0$ holds. The output $\Delta PB$ of the half-wave rectifier 701 and the differential pressure deviation $\Delta PA$ are input to a select switch 702. The select switch 702 receives the output $\Delta Q$ of an adder 405 to select the value $\Delta PA$ if $\Delta Q$ is positive, i.e., if the differential pressure target tilting angle $Q\Delta p \geq$ the limit target tilting angle QT, and select the value $\Delta PB$ if $\Delta Q$ is negative, i.e., if $Q\Delta p < QT$ holds, followed by outputting the selected one as an increment $\Delta N'ns$. This increment $\Delta N'ns$ is added in the adder 407 to the output Nns−1 in the last control cycle to obtain an intermediate value N'ns. This value N'ns is sent to a limiter 408. The limiter 408 outputs the value N'ns as the target revolution speed Nns, while limiting the value N'ns such that it will not exceed the maximum value.

With such arrangement, when the differential pressure target tilting $Q\Delta p$ is larger than the limit target tilting angle QT and the engine revolution speed raising control is required, the select switch 702 selects $\Delta PA$ ($>0$) as the intermediate value N'ns, and the engine 263 is controlled to be raised up in the revolution speed on the basis of the target revolution speed Nns derived from the positive $\Delta PA$. On the contrary, when $Q\Delta p < QT$ and the revolution speed raising control is required, $\Delta PB$ having been cut in its positive region by the half-wave rectifier 701 is selected as the increment $\Delta N'ns$ by the select switch 702, even if the differential pressure $\Delta PLS$ is reduced due to a delay in response of the load sensing control for the hydraulic pump. Accordingly, the engine 263 is not controlled to be raised up in the revolution speed because of $N'ns = Nns = 0$. Meanwhile, when the hydraulic pump 201 is brought into control on the basis of the differential pressure target tilting angle $Q\Delta p$ by returning or reducing the trod stroke or amount of the pilot reducing valve 58 in the condition that the engine 263 is under the revolution speed raising control, for example, the differential pressure $\Delta PLS$ is increased and hence the differential pressure deviation $\Delta PA$ becomes negative. Therefore, the value of $\Delta PA$ is not cut by the half-wave rectifier 701, whereby the engine 263 is controlled with the reduced target revolution speed Nns resulted from the negative $\Delta PA$ in the direction of resolving the revolution speed raising control.

Thus, this embodiment can also provide the similar function to that of the sixth embodiment.

It is to be noted that although the target revolution speed is calculated through the integral control process using the adder 407 and the limiter 408 in this embodiment, it may be calculated through the proportional control process.

Others

In the foregoing sixth through eleventh embodiments, the target revolution speed Nns is calculated using the difference $\Delta Q$, and Nns is selected as the revolution speed command value Ny in place of the target revolution speed Nx set by the revolution speed setting device 268 if $Nns \geq Nx$ holds. As with the modification of the first embodiment shown in FIG. 5, however, it can alternatively be modified such that the modifying revolution speed $\alpha$ is calculated using the difference $\Delta Q$ and then added to the target revolution speed Nx to create the revolution speed command value Ny for performing the revolution speed raising control.

Although all of the foregoing embodiments have been explained as using the variable displacement hydraulic pump of swash plate type, the hydraulic pump may be any other suitable type such as swash shaft type. Furthermore, it should be understood that although the swing motor and the boom cylinder have been illustrated as the actuators 202, 203, respectively, any other suitable actuators may also be used.

INDUSTRIAL APPLICABILITY

According to the present invention, since the revolution speed of the prime mover is automatically raised up to increase the pump delivery rate when the delivery rate of the hydraulic pump gets into saturation, the target revolution speed determined by the conventional fuel lever can be set to a lower value, which can reduce both fuel and noise and hence improve durability of the equipment. It is also possible to prevent a decrease in the actuator speed and a deterioration in operability during the combined operation which would otherwise be caused by saturation of the pump delivery rate, thereby ensuring superior operability. Furthermore, by setting the target revolution speed determined by the fuel lever to a higher value, frequent fluctuations in the revolution speed of the prime mover can be suppressed, which also contributes to reduce both fuel consumption and noise.

What is claimed is:

1. A hydraulic drive system for a construction machine comprising a prime mover, a hydraulic pump of variable displacement type driven by said prime mover, at least one hydraulic actuator driven by a hydraulic fluid delivered from said hydraulic pump, control valve means connected between said hydraulic pump and said actuator for controlling a flow rate of the hydraulic fluid supplied to said actuator dependent on the input amount of operating means, first pump control means for controlling a displacement volume of said hydraulic pump dependent on the input amount of said operating means such that the delivery rate of said hydraulic pump is increased with an increase in said input amount, second pump control means for limiting an available maximum value of the pump displacement volume such that an input torque of the hydraulic pump does not exceed an output torque of said prime mover, and prime mover control means for controlling a revolution speed of said prime mover, said available maximum value of the pump limited by said second pump control means being variable set in accordance with a delivery pressure of the hydraulic pump; wherein said prime mover control means includes:

first control means for monitoring saturation of the delivery rate of said hydraulic pump provided by said second pump control means, and for controlling the revolution speed of said prime mover to be maintained at a predetermined speed before said hydraulic pump reaches a predetermined state at which said saturation occurs while further controlling the revolution speed of said prime mover to increase to avoid said saturation of the pump when said hydraulic pump reaches said predetermined state, wherein said first control means includes means for detecting a displacement volume of said hydraulic pump means for calculating a limit value of said displacement volume, and means for calculating a difference between said displacement volume and said limit value, whereby said first control means judges that said hydraulic pump has reached said predetermined state and increases the revolution speed of said prime mover when said difference reaches a predetermined value.

2. A hydraulic drive system for a construction machine according to claim 1, wherein said means for calculating the limit value of said displacement volume comprises means for calculating a target displacement volume for the input torque limiting control from at least the delivery pressure of said hydraulic pump based on a predetermined input torque limiting function, and employs said target displacement volume as said limit value.

3. A hydraulic drive system for a construction machine according to claim 1, wherein said means for calculating the difference between said displacement volume and said limit value comprises means for calculating the difference by deducting the displacement volume from the limit value, whereby said first control means judges that said hydraulic pump has reached said predetermined state and increases the revolution speed of said prime mover when said difference become smaller than said predetermined value.

4. A hydraulic drive system for a construction machine according to claim 3, wherein said means for detecting the displacement volume of said hydraulic pump comprises means for detecting an actual displacement volume of said hydraulic pump and said means for calculating the difference comprises means for calculating a difference of the actual displacement volume from said limit value.

5. A hydraulic drive system for a construction machine according to claim 3, wherein said first control means further includes means for calculating a target displacement volume of said hydraulic pump, said means for detecting the displacement volume of said hydraulic pump comprises means for detecting the target displacement volume of said hydraulic pump, and said means for calculating the difference comprises means for calculating a difference of said target displacement volume from said limit value.

6. A hydraulic drive system for a construction machine according to claim 1, wherein said first control means further includes means for calculating a target displacement volume from a differential pressure constant, said means for detecting the displacement volume of said hydraulic pump comprises means for calculating said target displacement volume, said means for calculating the limit value of said displacement volume comprises means for calculating a target displacement volume for the input torque limiting control from at least the delivery pressure of said hydraulic pump based on a predetermined input torque limiting function, said means for calculating the difference between said displacement volume and said limit value comprises means for calculating the difference by deducting the displacement volume from the limit value, whereby said first control means judges that said hydraulic pump is in said predetermined state and increases the revolution speed of said prime mover when said difference becomes larger than said predetermined value.

7. A hydraulic drive system for a construction machine according to claim 6 wherein said predetermined value is 0 (zero).

8. A hydraulic drive system for a construction machine comprising a prime mover, a hydraulic pump of variable displacement type driven by said prime mover, at least one hydraulic actuator driven by a hydraulic fluid delivered from said hydraulic pump, control valve means connected between said hydraulic pump and said actuator for controlling a flow rate of the hydraulic fluid supplied to said actuator dependent on the input amount of operating means, first pump control means for controlling a displacement volume of said hydraulic pump dependent on the input amount of said operating means such that the delivery rate of said hydraulic pump is increased with an increase in said input amount, second pump control means for limiting an available maximum value of the pump displacement volume such that an input torque of the hydraulic pump does not exceed an output torque of said prime mover, and prime mover control means for controlling a revolution speed of said prime mover, said available maximum value of the pump limited by said second pump control means being variable set in accordance with a delivery pressure of the hydraulic pump; wherein said prime mover control means includes:

first control means for monitoring saturation of the delivery rate of said hydraulic pump provided by said second pump control means, and for controlling the revolution speed of said prime mover to be maintained at a predetermined speed before said hydraulic pump reaches a predetermined state at which said saturation occurs while further controlling the revolution speed of said prime mover to increase to avoid said saturation of the pump when said hydraulic pump reaches said predetermined state, wherein said first control means includes means for detecting the input amount of said operating means and increases the revolution speed of said prime mover when said hydraulic pump reaches said predetermined state and the input amount of said operating means exceeds a predetermined value.

9. A hydraulic drive system for a construction machine comprising a prime mover, a hydraulic pump of variable displacement type driven by said prime mover, at least one hydraulic actuator driven by a hydraulic fluid delivered from said hydraulic pump, control valve means connected between said hydraulic pump for said actuator for controlling a flow rate of the hydraulic fluid supplied to said actuator dependent on the input amount of operating means, first pump control means for controlling a displacement volume of said hydraulic pump dependent on the input amount of said operating means such that the delivery rate of said hydraulic pump is increased with an increase in said input amount, second pump control means for limiting an available maximum value of the pump displacement volume such that an input torque of the hydraulic pump does not exceed an output torque of said prime mover, and prime mover control means for controlling a revolution speed of said prime mover, said available maximum value of the pump limited by said second pump control means being variable set in accordance with a delivery pressure of the hydraulic pump; wherein said prime mover control means includes:

first control means for monitoring saturation of the delivery rate of said hydraulic pump provided by said second pump control means, and for controlling the revolution speed of said prime mover to be maintained at a predetermined speed before said hydraulic pump reaches a predetermined state at which said saturation occurs while further controlling the revolution speed of said prime mover to increase to avoid said saturation of the pump when said hydraulic pump reaches said predetermined state, wherein said prime mover control means further includes second control means for detecting the input amount of said operating means and increases the revolution speed of said prime mover when said input amount exceeds a predetermined value.

10. A hydraulic drive system for a construction machine comprising a prime mover, a hydraulic pump of variable displacement type driven by said prime mover, at least one hydraulic actuator driven by a hydraulic fluid delivered from said hydraulic pump, control valve means connected between said hydraulic pump and said actuator for controlling a flow rate of the hydraulic fluid supplied to said actuator dependent on the input amount of operating means, first pump control means for controlling a displacement volume of said hydraulic pump dependent on the input amount of said operating means such that the delivery rate of said hydraulic pump is increased with an increase in said input amount, second pump control means for limiting an available maximum value of the pump displacement volume such that an input torque of the hydraulic pump does not exceed an output torque of said prime mover, and prime mover control means for controlling a revolution speed of said prime mover, said available maximum value of the pump limited by said second pump control means being variable set in accordance with a delivery pressure of the hydraulic pump; wherein said prime mover control means includes:

first control means for monitoring saturation of the delivery rate of said hydraulic pump provided by said second pump control means, and for controlling the revolution speed of said prime mover to be maintained at a predetermined speed before said hydraulic pump reaches a predetermined state at which said saturation occurs while further controlling the revolution speed of said prime mover to increase to avoid said saturation of the pump when said hydraulic pump reaches said predetermined state, wherein said first control means includes means for providing a first target revolution speed of said prime mover and means for providing a second target revolution speed of said prime mover that is higher than said first target revolution speed, whereby said first control means outputs said first target revolution speed before said hydraulic pump reaches said predetermined state, and outputs said second target revolution speed when said hydraulic pump reaches said predetermined state.

11. A hydraulic drive system for a construction machine according to claim 10, wherein a maximum value of said second target revolution speed is set higher than a maximum value of said first target revolution speed.

12. A hydraulic drive system for a construction machine according to claim 10, wherein said first control means further includes means for selecting the value of a larger one of said first and second target revolution speeds.

13. A hydraulic drive system for a construction machine according to claim 10, wherein said first control means further includes means for calculating a modifying revolution speed of said prime mover when said hydraulic pump reaches said predetermined state, and said means for providing a second target revolution speed includes means for adding said modifying revolution speed to said first target revolution speed.

14. A hydraulic drive system for a construction machine according to claim 10, wherein said first control means further includes means for detecting the input amount of said operating means whereby said first control means outputs said first target revolution speed before said hydraulic pump reaches said predetermined state or when the input amount of said operating means is less than a predetermined value and outputs said second target revolution speed when said hydraulic pump reaches said predetermined state and the input amount of said operating means exceeds said predetermined value.

15. A hydraulic drive system for a construction machine according to claim 10, wherein said prime mover control means further includes second control means which comprises means for detecting the input amount of said operating means and means for providing a third target revolution speed of said prime mover dependent on the input amount of said operating means, whereby said first control means outputs the value of a larger one of said first and third target revolution speeds before said hydraulic pump reaches said predetermined state, and outputs said second target revolution speed when said hydraulic pump reaches said predetermined state.

16. A hydraulic drive system for a construction machine according to claim 15, wherein said first control means outputs the value of a larger one of said first and third target revolution speeds before said hydraulic pump reaches said predetermined state or the input amount of said control means is less than a predetermined value and outputs said second target revolution speed when said hydraulic pump reaches said predetermined state and the input amount of said control means exceeds said predetermined value.

17. A hydraulic drive system for a construction machine according to claim 15 wherein a maximum value of said second target revolution speed is set higher than maximum values of said first and third target revolution speeds.

18. A hydraulic drive system for a construction machine according to claim 10, wherein said first control means further includes means for detecting a differential pressure between the delivery pressure of said hydraulic pump and the load pressure of said actuator and said means for providing the second target revolution speed comprises means for calculating the second target revolution speed based on said differential pressure.

19. A hydraulic drive system for a construction machine according to claim 13, wherein said first control means further includes means for detecting a differential pressure between the delivery pressure of said hydraulic pump and the load pressure of said actuator and said means for calculating the modifying revolution speed comprises means for calculating the modifying revolution speed based on said differential pressure.

20. A hydraulic drive system for a construction machine according to claim 10, wherein said first control means further includes means for detecting a displacement volume of said hydraulic pump, means for calculating a limit value of said displacement volume, and means for calculating a difference between said displacement volume and said limit value, and said means for providing the second target revolution speed comprises means for calculating the second target revolution speed based on the difference between said displacement volume and said limit value.

21. A hydraulic drive system for a construction machine according to claim 13, wherein said first control means further includes means for detecting a displacement volume of said hydraulic pump, means for calculating a limit value of said displacement volume, and means for calculating a difference between said displacement volume and said limit value, and said means for calculating the modifying revolution speed comprises means for calculating the modifying revolution speed based on the difference between said displacement volume and said limit value.

22. A hydraulic drive system for a construction machine according to claim 20, wherein said means for calculating the limit value of said displacement volume comprises means for calculating a target displacement volume for the input torque limiting control from at least the delivery pressure of said hydraulic pump based on a predetermined input torque limiting function, and employs said target displacement volume as said limit value.

23. A hydraulic drive system for a construction machine according to claim 20, wherein said means for detecting the displacement volume of said hydraulic pump comprises means for detecting an actual displacement volume of said hydraulic pump, and said means for calculating the difference comprises means for calculating a difference of said actual displacement volume from said limit value.

24. A hydraulic drive system for a construction machine according to claim 20, wherein said first control means further includes means for calculating a target displacement volume of the hydraulic pump, said means for detecting the displacement volume of said hydraulic pump comprises means for detecting the target displacement volume of said hydraulic pump, and said means for calculating the difference comprises means for calculating a difference of said target displacement volume from said limit value.

25. A hydraulic drive system for a construction machine comprising a prime mover, a hydraulic pump of variable displacement type driven by said prime mover, at least one hydraulic actuator driven by a hydraulic fluid delivered from said hydraulic pump, control valve means connected between said hydraulic pump and said actuator for controlling a flow rate of the hydraulic fluid supplied to said actuator dependent on the input amount of operating means, first pump control means for controlling a displacement volume of said hydraulic pump dependent on the input amount of said operating means such that the delivery rate of said hydraulic pump is increased with an increase in said input amount, second pump control means for limiting an available maximum value of the pump displacement volume such that an input torque of the hydraulic pump does not exceed an output torque of said prime mover, and prime mover control means for controlling a revolution speed of said prime mover, said available maximum value of the pump limited by said second pump control means being variable set in accordance with a delivery pressure of the hydraulic pump; wherein said prime mover control means includes:
  first control means for monitoring saturation of the delivery rate of said hydraulic pump provided by said second pump control means, and for controlling the revolution speed of said prime mover to be maintained at a predetermined speed before said hydraulic pump reaches a predetermined state at which said saturation occurs while further controlling the revolution speed of said prime mover to increase to avoid said saturation of the pump when said hydraulic pump reaches said predetermined state, wherein said first control means includes:
    first detection means for detecting a differential pressure between the delivery pressure of said hydraulic pump and the load pressure of said actuator,
    second detection means for detecting the delivery pressure of said hydraulic pump, first means for setting a first target revolution speed of said prime mover, second means for calculating a first target displacement volume from the differential pressure detected by said first detection means to hold that differential pressure constant, third means for calculating a second target displacement volume for the input torque limiting control by the use of at least the pump delivery pressure detected by said second detection means and a predetermined input torque limiting function, fourth means for calculating a second target revolution speed of said prime mover higher than said first target revolution speed based on said first and second target displacement volumes, fifth means for calculating a difference between said first target displacement volume and said second target displacement volume, and sixth means for outputting said first target revolution speed when said difference is less than a predetermined value, said second target revolution speed when said difference becomes larger than the predetermined value.

26. A hydraulic drive system for a construction machine according to claim 25, wherein said fourth means comprises means for calculating said second target revolution speed from the difference between said target displacement volumes calculated by said fifth means.

27. A hydraulic drive system for a construction machine according to claim 25, wherein said fourth means comprises means for calculating an increment value of the revolution speed from the difference between said target displacement volumes calculated by said fifth means to make that difference zero, and means for adding said increment value to the second target revolution speed calculated last time to calculate a new second target revolution speed.

28. A hydraulic drive system for a construction machine according to claim 25, wherein said first control means further includes seventh means for calculating a deviation between the differential pressure detected by said first detection means and a predetermined target differential pressure and said fourth means comprises filter means for preventing issuance of a value of said differential pressure deviation when the value is positive, means for selecting an output of said filter means when the difference between said target displacement volumes calculated by said fifth means is negative, and the value of said differential pressure deviation when the difference is positive, and means for calculating said second target revolution speed from said selected value.

29. A hydraulic drive system for a construction machine, according to claim 25, wherein said input torque limiting function is a function of two values given by the delivery pressure of said hydraulic pump and said second target displacement volume and said third means comprises means for calculating said second target displacement volume from said function.

30. A hydraulic drive system for a construction machine according to claim 25, wherein said first control means further includes seventh means for calculating a deviation between one of the first and second target revolution speeds selected by said sixth means and the actual revolution speed, said input torque limiting function is a function of three values given by the delivery pressure of said hydraulic pump, said second target displacement volume and said revolution speed deviation, and said third means comprises means for calculating said second target displacement volume from said function.

31. A hydraulic drive system for a construction machine according to claim 25, wherein said pump control means further includes seventh means for selecting one of said first and second target displacement volumes and controlling the displacement volume of said hydraulic pump to be coincident with said selected target displacement volume.

32. A hydraulic drive system for a construction machine according to claim 31, wherein said seventh means comprises means for selecting a smaller one of said first and second target displacement volumes.

33. A hydraulic drive system for a construction machine according to claim 31, wherein said sixth means comprises means for outputting said first target revolution speed when said first target displacement volume is selected by said seventh means and selecting said second target revolution speed when said second target displacement volume is selected by said seventh means.

34. A hydraulic drive system for a construction machine according to claim 31, wherein said seventh means comprises means for selecting said first target displacement volume when said target revolution speed calculated by said third means is smaller than a predetermined value and selecting said second target displacement volume when said second revolution speed exceeds the predetermined value.

35. A hydraulic drive system for a construction machine according to claim 31, wherein:

said second means comprises means for calculating an increment value of the target displacement volume from the differential pressure detected by said first detection means to hold that differential pressure constant, and means for adding said increment value to the first target displacement volume calculated last time to calculate a new first target displacement volume, said third means comprises means for calculating a target delivery pressure based on said input torque limiting function, means for calculating an increment value of the target displacement volume from both the pump delivery pressure detected by said second detection means and said target delivery pressure to hold the pump delivery pressure coincident with said target delivery pressure and means for adding said increment value to the second target displacement volume, calculated last time to calculate a new second target displacement volume and said seventh means comprises means for selecting one of the increment value of said first target displacement volume and the increment value of said second target displacement volume.

36. A hydraulic drive system for a construction machine according to claim 21, wherein said means for calculating the limit value of said displacement volume comprises means for calculating a target displacement volume for the input torque limiting control from at least the delivery pressure of said hydraulic pump based on a predetermined input torque limiting function, and employs said target displacement volume as said limit value.

37. A hydraulic drive system for a construction machine according to claim 21, wherein said means for detecting the displacement volume of said hydraulic pump comprises means for detecting an actual displacement volume of said hydraulic pump, and said means for calculating the difference comprises means for calculating a difference of said actual displacement volume from said limit value.

38. A hydraulic drive system for a construction machine according to claim 21, wherein said first control means further includes means for calculating a target displacement volume of the hydraulic pump, said means for detecting the displacement volume of said hydraulic pump comprises means for detecting the target displacement volume of said hydraulic pump, and said means for calculating the difference comprises means for calculating a difference of said target displacement volume from said limit value.

* * * * *